US009665435B2

(12) United States Patent
Fujita et al.

(10) Patent No.: US 9,665,435 B2
(45) Date of Patent: May 30, 2017

(54) STORAGE CONTROL APPARATUS, COMPUTER READABLE MEDIUM AND METHOD INCLUDING CREATING SNAPSHOTS AND DIFFERENCE STORAGE AREAS FOR RESPECTIVE VOLUMES IN A CONSISTENCY GROUP

(71) Applicant: FUJITSU LIMITED, Kawasaki-shi, Kanagawa (JP)

(72) Inventors: Kenichi Fujita, Nagoya (JP); Takashi Kuwayama, Nagoya (JP); Noboru Oguri, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/462,823

(22) Filed: Aug. 19, 2014

(65) Prior Publication Data
US 2015/0089171 A1   Mar. 26, 2015

(30) Foreign Application Priority Data

Sep. 25, 2013 (JP) ................................. 2013-199041

(51) Int. Cl.
*G06F 11/14* (2006.01)
*G06F 3/06* (2006.01)

(52) U.S. Cl.
CPC .......... *G06F 11/1451* (2013.01); *G06F 3/061* (2013.01); *G06F 3/065* (2013.01); *G06F 3/067* (2013.01); *G06F 2201/84* (2013.01)

(58) Field of Classification Search
CPC ...... G06F 11/1451; G06F 3/061; G06F 3/065; G06F 3/067; G06F 2201/84
See application file for complete search history.

(56) References Cited

U.S. PATENT DOCUMENTS

| | | | |
|---|---|---|---|
| 8,805,786 B1* | 8/2014 | Natanzon | G06F 11/2064 707/639 |
| 2006/0069865 A1* | 3/2006 | Kawamura | G06F 11/2064 711/114 |

(Continued)

FOREIGN PATENT DOCUMENTS

| | | |
|---|---|---|
| JP | 2005-293469 | 10/2005 |
| JP | 2007-115007 | 5/2007 |
| JP | 2007-188267 | 7/2007 |

OTHER PUBLICATIONS

Extended European Search Report mailed Jan. 29, 2015 for corresponding European Patent Application No. 14182092.8.

(Continued)

*Primary Examiner* — Tuan Thai
*Assistant Examiner* — Glenn Gossage
(74) *Attorney, Agent, or Firm* — Staas & Halsey LLP

(57) ABSTRACT

A storage control apparatus controls storage units in a storage apparatus and includes a memory unit that stores group information identifying a copy-source volume group belonging to a consistency group; and a control unit that creates based on the group information, snapshots of respective volumes of the volume group for a given time point; creates respective difference storage areas to store, as difference data, update data for the respective volumes after the given time point; and transfers to a copy-destination storage apparatus, data of the snapshots of the respective volumes. The control unit further creates snapshots of the respective volumes at an arbitrary time point after the given time point; creates respective difference storage areas to store, as difference data, update data for the respective volumes after the arbitrary time point; and transfers to the copy-destination storage apparatus, the difference data of the respective volumes for the arbitrary time point.

9 Claims, 39 Drawing Sheets

(56) References Cited

U.S. PATENT DOCUMENTS

| | | | |
|---|---|---|---|
| 2007/0094467 A1 | 4/2007 | Yamasaki | |
| 2007/0162716 A1* | 7/2007 | Yagisawa | G06F 11/1435 |
| | | | 711/162 |
| 2007/0168404 A1 | 7/2007 | Nakamura et al. | 707/204 |
| 2008/0016300 A1* | 1/2008 | Yim | G06F 11/2064 |
| | | | 711/162 |
| 2008/0201391 A1* | 8/2008 | Arakawa | G06F 11/1471 |
| 2008/0301386 A1* | 12/2008 | Matsui | G06F 11/2064 |
| | | | 711/162 |
| 2009/0132779 A1* | 5/2009 | Amaki | G06F 11/2064 |
| | | | 711/167 |
| 2009/0193206 A1 | 7/2009 | Ishii et al. | 711/162 |
| 2012/0030440 A1* | 2/2012 | Miwa | G06F 3/0617 |
| | | | 711/162 |
| 2013/0086344 A1* | 4/2013 | Kawada | G06F 11/2074 |
| | | | 711/162 |
| 2014/0281337 A1* | 9/2014 | Fujita | G06F 12/023 |
| | | | 711/170 |
| 2015/0074348 A1* | 3/2015 | Nagashima | G06F 3/0607 |
| | | | 711/114 |

OTHER PUBLICATIONS

Office Action issued be the Patent Office of Japan on Mar. 21, 2017 in Japanese patent application No. 2013-199041.

* cited by examiner

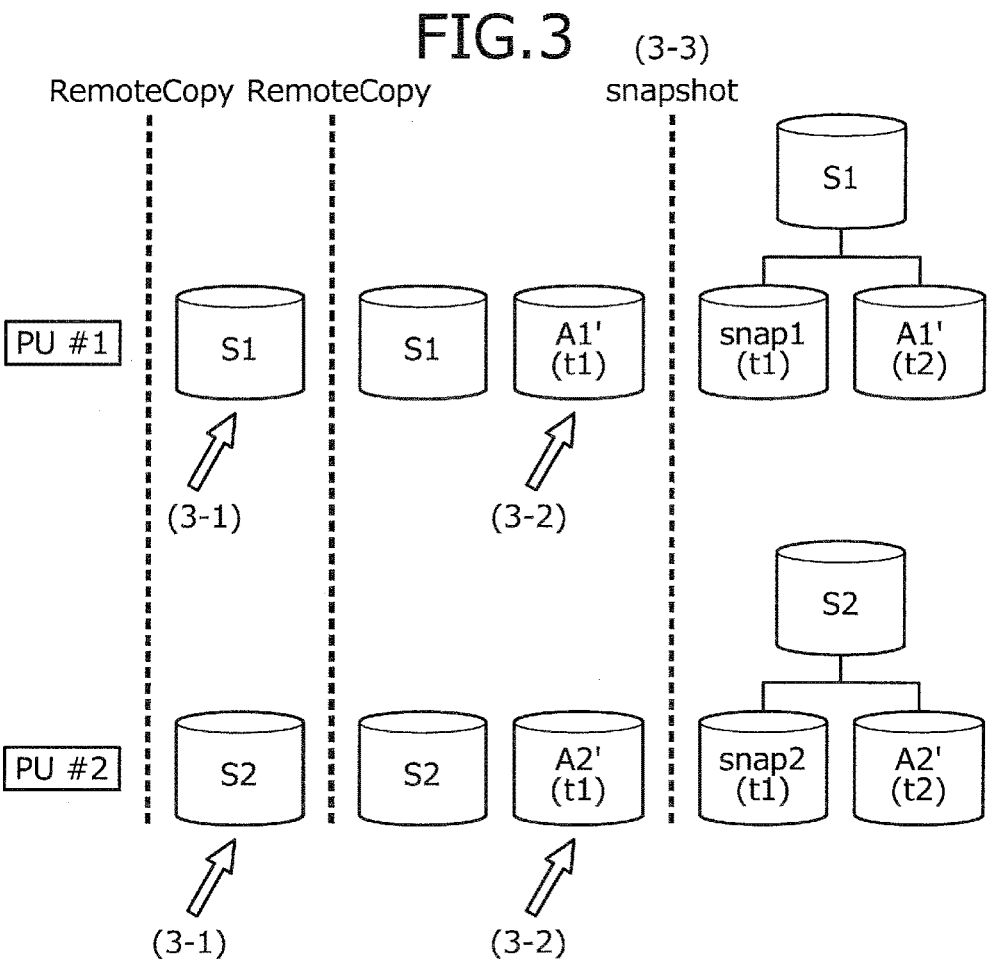
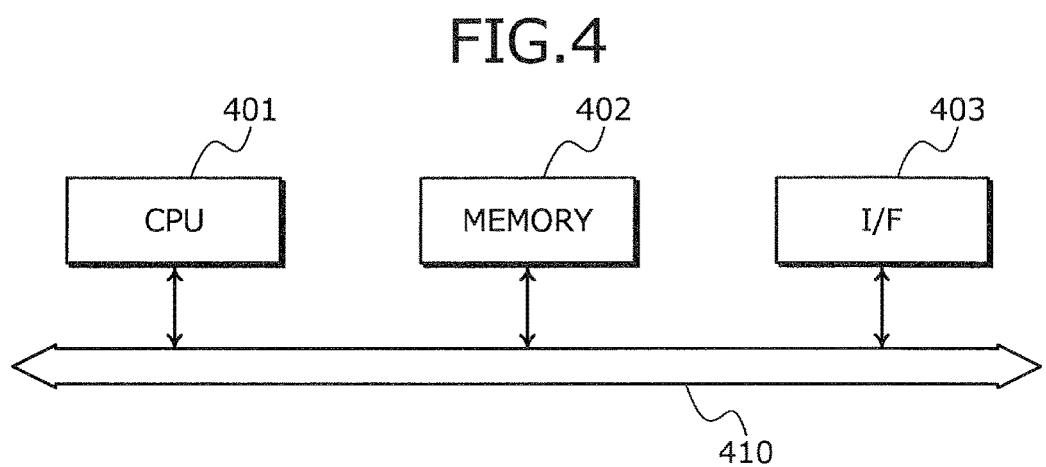

| ENTRY NUMBER | | | |
|---|---|---|---|
| GROUP NAME | | | |
| PAIR COUNT | | | |
| REPRESENTATIVE ADDRESS | | | |
| COPY-SOURCE VOLUME NUMBER | COPY-DESTINATION VOLUME NUMBER | CHUNK COUNT | STATUS |
| | | | |

⇩

(ii) 700

| ENTRY NUMBER | | | |
|---|---|---|---|
| 1 | | | |
| GROUP NAME | | | |
| Kaikei-1 | | | |
| PAIR COUNT | | | |
| 0 | | | |
| REPRESENTATIVE ADDRESS | | | |
| xxxx | | | |
| COPY-SOURCE VOLUME NUMBER | COPY-DESTINATION VOLUME NUMBER | CHUNK COUNT | STATUS |
| | | | |

⇩

(iii) 700

| ENTRY NUMBER | | | |
|---|---|---|---|
| 1 | | | |
| GROUP NAME | | | |
| Kaikei-1 | | | |
| PAIR COUNT | | | |
| 1 | | | |
| REPRESENTATIVE ADDRESS | | | |
| xxxx | | | |
| COPY-SOURCE VOLUME NUMBER | COPY-DESTINATION VOLUME NUMBER | CHUNK COUNT | STATUS |
| Primary Volume No.#1 | Secondary Volume No.#1 | 0 | Reserved |

| ENTRY NUMBER | | | |
|---|---|---|---|
| 1 | | | |
| GROUP NAME | | | |
| Kaikei-1 | | | |
| PAIR COUNT | | | |
| 2 | | | |
| REPRESENTATIVE ADDRESS | | | |
| xxxx | | | |
| COPY-SOURCE VOLUME NUMBER | COPY-DESTINATION VOLUME NUMBER | CHUNK COUNT | STATUS |
| Primary Volume No.#1 | Secondary Volume No.#1 | 0 | Reserved |
| Primary Volume No.#2 | Secondary Volume No.#2 | 0 | Reserved |

⇩

(v)

700

| ENTRY NUMBER | | | |
|---|---|---|---|
| 1 | | | |
| GROUP NAME | | | |
| Kaikei-1 | | | |
| PAIR COUNT | | | |
| 2 | | | |
| REPRESENTATIVE ADDRESS | | | |
| xxxx | | | |
| COPY-SOURCE VOLUME NUMBER | COPY-DESTINATION VOLUME NUMBER | CHUNK COUNT | STATUS |
| Primary Volume No.#1 | Secondary Volume No.#1 | 0 | Active |
| Primary Volume No.#2 | Secondary Volume No.#2 | 0 | Active |

⇩

(vi)

700

| ENTRY NUMBER | | | |
|---|---|---|---|
| 1 | | | |
| GROUP NAME | | | |
| Kaikei-1 | | | |
| PAIR COUNT | | | |
| 2 | | | |
| REPRESENTATIVE ADDRESS | | | |
| xxxx | | | |
| COPY-SOURCE VOLUME NUMBER | COPY-DESTINATION VOLUME NUMBER | CHUNK COUNT | STATUS |
| Primary Volume No.#1 | Secondary Volume No.#1 | 20 | Active |
| Primary Volume No.#2 | Secondary Volume No.#2 | 17 | Active |

FIG.15

VOLUME INDEX TABLE 1500

| VOLUME NUMBER | VOLUME NAME | OPERATING PU NUMBER | VOLUME ATTRIBUTE | VOLUME SIZE | VOLUME STATE | REARRANGEMENT STATUS |
|---|---|---|---|---|---|---|
| 1 | Vdisk1 | 1 | THIN PROVISIONING VOLUME | 500 | NORMAL | UNDER REARRANGEMENT |
| 2 | Vdisk2 | 2 | THIN PROVISIONING VOLUME | 700 | NORMAL | UNDER REARRANGEMENT |
| 3 | 8k-volume | 1 | STANDARD VOLUME | 530 | NORMAL | AWAITING REARRANGEMENT |
| 4 | Dev001 | 2 | THIN PROVISIONING VOLUME | 1024 | NORMAL | AWAITING REARRANGEMENT |
| 5 | Mirror002 | 1 | MIRROR VOLUME | 580 | NORMAL | AWAITING REARRANGEMENT |
| .. | .. | .. | .. | .. | .. | .. |
| 127 | #mir-001 | 5 | MIRROR VOLUME | 750 | NORMAL | AWAITING REARRANGEMENT |
| 128 | #mir-002 | 5 | MIRROR VOLUME | 750 | ABNORMAL | AWAITING REARRANGEMENT |
| .. | .. | .. | .. | .. | .. | .. |
| n | NULL (0) | -1 | UNDEFINED | 0 | UNDEFINED | NOT TO BE REARRANGED |

VOLUME SEGMENT TABLE 1700

| VOLUME NUMBER | SEGMENT SET NUMBER | SEGMENT NUMBER | STORAGE APPARATUS | LUN NUMBER | SEGMENT STATE | REARRANGE-MENT STATUS |
|---|---|---|---|---|---|---|
| 1 | 1 | 1 | 1 | 1 | VALID | |
| 1 | 1 | 2 | 1 | 2 | VALID | |
| : | : | : | : | : | : | : |
| 1 | 1 | 8 | 1 | 8 | VALID | |
| 1 | 2 | 1 | 2 | 1 | VALID | |
| 1 | 2 | 2 | 2 | 2 | VALID | |
| : | : | : | : | : | : | : |
| 1 | 2 | 8 | 2 | 8 | VALID | |
| 1 | 3 | 1 | 1 | 1 | VALID | |
| 1 | 3 | 1 | 1 | 2 | VALID | |
| : | : | : | : | : | : | : |

REARRANGEMENT PLAN TABLE ~720

| VOLUME NUMBER | SEGMENT SET NUMBER | SEGMENT NUMBER | CURRENT STORAGE APPARATUS | CURRENT LUN NUMBER | REARRANGED STORAGE APPARATUS | REARRANGED LUN NUMBER | REARRANGEMENT STATUS |
|---|---|---|---|---|---|---|---|
| 1 | 1 | 1 | 1 | 1 | 1 | 1 | REARRANGEMENT NOT REQUIRED |
| 1 | 1 | 2 | 1 | 2 | 1 | 2 | REARRANGEMENT NOT REQUIRED |
| 1 | 1 | 3 | 1 | 3 | 1 | 3 | REARRANGEMENT NOT REQUIRED |
| 1 | 1 | 4 | 1 | 4 | 1 | 4 | REARRANGEMENT NOT REQUIRED |
| 1 | 1 | 5 | 1 | 5 | 1 | 5 | REARRANGEMENT NOT REQUIRED |
| .. | .. | .. | .. | .. | .. | .. | .. |
| 1 | 1 | 8 | 1 | 8 | 1 | 8 | REARRANGEMENT NOT REQUIRED |
| 1 | 2 | 1 | 1 | 1 | 2 | 1 | REARRANGEMENT NOT REQUIRED |
| 1 | 2 | 2 | 1 | 2 | 2 | 2 | REARRANGEMENT NOT REQUIRED |
| .. | .. | .. | .. | .. | .. | .. | .. |
| 1 | 2 | 8 | 1 | 8 | 2 | 8 | REARRANGEMENT NOT REQUIRED |
| .. | .. | .. | .. | .. | .. | .. | .. |

1800-1, 1800-2, ....., 1800-5

"REARRANGEMENT NOT REQUIRED", "AWAITING REARRANGEMENT", "REARRANGEMENT COMPLETED"

FIG.19

| ITEM | CONDITION | BEFORE REARRANGEMENT | AFTER REARRANGEMENT | SUPPLEMENT |
|---|---|---|---|---|
| 1 | ADD 8.4 TB TO BASIC SET 8.4 TB | 8.4 TB SU #1 | 4.2 TB SU #1 / 4.2 TB SU #2 | DISTRIBUTE ARRANGEMENT TO EQUALIZE PHYSICAL USAGE QUANTITIES |
| 2 | ADD 16.8 TB TO BASIC SET 8.4 TB | 8.4 TB SU #1 | 4.2 TB SU #1 / 4.2 TB SU #2 | DISTRIBUTE ARRANGEMENT TO EQUALIZE PHYSICAL USAGE QUANTITIES |
| 3 | ADD 16.8 TB TO BASIC+ONE EXPANSION (TOTAL 16.8 TB) | 8.4 TB SU #1 / 8.4 TB SU #2 | 5.6 TB SU #1 / 5.6 TB SU #2 / 5.6 TB SU #3 | DISTRIBUTE ARRANGEMENT TO EQUALIZE PHYSICAL USAGE QUANTITIES |

FIG.20

BEFORE REARRANGEMENT

SU #1

| A0  | A1  | A2  | A3  | A4  | A5  | A6  | A7  |
|-----|-----|-----|-----|-----|-----|-----|-----|
| A8  | A9  | A10 | A11 | A12 | A13 | A14 | A15 |
| A16 | A17 | A18 | A19 | A20 | A21 | A22 | A23 |
| A24 | A25 | A26 | A27 | A28 | A29 | A30 | A31 |
| B0  | B1  | B2  | B3  | B4  | B5  | B6  | B7  |
| B8  | B9  | B10 | B11 | B12 | B13 | B14 | B15 |

SU #2

(empty)

⇩

REARRANGEMENT DRAFT

SU #1

| A0  | A1  | A2  | A3  | A4  | A5  | A6  | A7  |
|-----|-----|-----|-----|-----|-----|-----|-----|
| A16 | A17 | A18 | A19 | A20 | A21 | A22 | A23 |
| B0  | B1  | B2  | B3  | B4  | B5  | B6  | B7  |

SU #2

| A8  | A9  | A10 | A11 | A12 | A13 | A14 | A15 |
|-----|-----|-----|-----|-----|-----|-----|-----|
| A24 | A25 | A26 | A27 | A28 | A29 | A30 | A31 |
| B8  | B9  | B10 | B11 | B12 | B13 | B14 | B15 |

⇩

UNDER REARRANGEMENT

SU #1

| A0  | A1  | A2  | A3  | A4  | A5  | A6  | A7  |
|-----|-----|-----|-----|-----|-----|-----|-----|
| A16 | A17 | A18 | A19 | A20 | A21 | A22 | A23 |
| B0  | B1  | B2  | B3  | B4  | B5  | B6  | B7  |
| B8  | B9  | B10 | B11 | B12 | B13 | B14 | B15 |

SU #2

| A8  | A9  | A10 | A11 | A12 | A13 | A14 | A15 |
|-----|-----|-----|-----|-----|-----|-----|-----|
| A24 | A25 | A26 | A27 | A28 | A29 | A30 | A31 |

⇩

AFTER REARRANGEMENT

SU #1

| A0  | A1  | A2  | A3  | A4  | A5  | A6  | A7  |
|-----|-----|-----|-----|-----|-----|-----|-----|
| A16 | A17 | A18 | A19 | A20 | A21 | A22 | A23 |
| B0  | B1  | B2  | B3  | B4  | B5  | B6  | B7  |

SU #2

| A8  | A9  | A10 | A11 | A12 | A13 | A14 | A15 |
|-----|-----|-----|-----|-----|-----|-----|-----|
| A24 | A25 | A26 | A27 | A28 | A29 | A30 | A31 |
| B8  | B9  | B10 | B11 | B12 | B13 | B14 | B15 |

FIG.22

| VOLUME NUMBER | VOLUME NAME | OPERATING PU NUMBER | VOLUME ATTRIBUTE | VOLUME SIZE | VOLUME STATE | REARRANGEMENT STATUS |
|---|---|---|---|---|---|---|
| 1 | Vdisk1 | 1 | THIN PROVISIONING VOLUME | 500 | NORMAL | UNDER REARRANGEMENT |
| -1 | NULL (0) | -1 | UNDEFINED | 0 | UNDEFINED | NOT TO BE REARRANGED |
| -1 | NULL (0) | -1 | UNDEFINED | 0 | UNDEFINED | NOT TO BE REARRANGED |
| -1 | NULL (0) | -1 | UNDEFINED | 0 | UNDEFINED | NOT TO BE REARRANGED |
| .. | .. | .. | .. | .. | .. | .. |
| -1 | NULL (0) | -1 | UNDEFINED | 0 | UNDEFINED | NOT TO BE REARRANGED |

FIG.23

| VOLUME NUMBER | SEGMENT SET NUMBER | SEGMENT NUMBER | STORAGE APPARATUS | LUN NUMBER | SEGMENT STATE | REARRANGE-MENT STATUS |
|---|---|---|---|---|---|---|
| 1 | 1 | 1 | 1 | 1 | VALID | |
| 1 | 1 | 2 | 1 | 2 | VALID | |
| : | : | : | : | : | : | : |
| 1 | 1 | 8 | 1 | 8 | VALID | |
| 1 | 2 | 1 | 2 | 1 | VALID | |
| 1 | 2 | 2 | 2 | 2 | VALID | |
| : | : | : | : | : | : | : |
| 1 | 2 | 8 | 2 | 8 | VALID | |
| 1 | 3 | 1 | 1 | 3 | VALID | |
| 1 | 3 | 1 | 1 | 3 | VALID | |
| 1 | 3 | 1 | 1 | 6 | VALID | |
| : | : | : | : | : | : | : |

(23-1) 1700

| VOLUME NUMBER | SEGMENT SET NUMBER | SEGMENT NUMBER | STORAGE APPARATUS | LUN NUMBER | SEGMENT STATE | REARRANGE-MENT STATUS |
|---|---|---|---|---|---|---|
| 1 | 1 | 1 | 1 | 1 | VALID | |
| 1 | 1 | 2 | 1 | 2 | VALID | |
| : | : | : | : | : | : | : |
| 1 | 1 | 8 | 1 | 8 | VALID | |
| 1 | 2 | 1 | 2 | 1 | VALID | |
| 1 | 2 | 2 | 2 | 2 | VALID | |
| : | : | : | : | : | : | : |
| 1 | 2 | 8 | 2 | 8 | VALID | |
| 1 | 3 | 1 | 1 | 3 | VALID | UNDER REARRANGEMENT |
| 1 | 3 | 1 | 1 | 3 | VALID | UNDER REARRANGEMENT |
| 1 | 3 | 1 | 1 | 6 | VALID | UNDER REARRANGEMENT |
| : | : | : | : | : | : | : |

STORAGE CONTROL APPARATUS, COMPUTER READABLE MEDIUM AND METHOD INCLUDING CREATING SNAPSHOTS AND DIFFERENCE STORAGE AREAS FOR RESPECTIVE VOLUMES IN A CONSISTENCY GROUP

CROSS REFERENCE TO RELATED APPLICATIONS

This application is based upon and claims the benefit of priority of the prior Japanese Patent Application No. 2013-199041, filed on Sep. 25, 2013, the entire contents of which are incorporated herein by reference.

FIELD

The embodiments discussed herein are related to a storage control apparatus, a control method, and a computer product.

BACKGROUND

As a storage apparatus for virtual environments, one conventional storage system is present that is capable of realizing a memory device having free volume configuration and storage capacity without being restricted by volume configuration and storage capacity of a physical memory device. This storage apparatus for virtual environments has a real internal storage apparatus controlling access to a physical memory device and creates a virtual volume by a processor that manages the real storage apparatus.

As a measure in the case of disasters, etc., remote copying may be performed by transferring data of a given storage apparatus (local site) to a storage apparatus (remote site) at a remote location. The transfer of data from a copy source (volume) to a copy destination (volume) periodically during the remote copying follows a procedure of first transferring the data from the copy source at a start time to the copy destination and sequentially transferring data updates for the copy source to the copy destination.

The mode by which the data is sequentially transferred is dependent on a requirement concerning a time point when data arrives at the remote site. For example, data may be transferred in synchronization with input/output (I/O) such that the data is transferred each time the data of the copy source is updated, or data may be transferred at regular time intervals asynchronous with I/O, or data may be transferred at arbitrary time intervals asynchronous with I/O.

Assuming that data is transferred to the copy destination as a measure in the case of disasters, the data of the copy source must arrive at the copy destination with the integrity intact. Although the I/O synchronization mode is ideal, when the remote site is farther away, the effect of delay becomes greater at the time of data transfer and therefore, it is difficult to transfer data in synchronization with I/O from a business server, etc.

Thus, in actuality, data transfer to a remote site is an asynchronous transfer. In this case, although the real-time integrity cannot be maintained as in the case of a synchronous transfer, a consistency group is utilized in some cases to group volumes having data desired to be transferred with integrity such that the consistency of the writing order between volumes is ensured at constant time intervals.

To utilize the concept of the consistency group for transferring difference data, a rest point must be obtained for the volumes belonging to the same group. To ensure data used as the rest point, data update requests from a business server to the relevant volumes, etc. are inhibited.

Related technologies include, for example, a data copy system for recovering data in another memory device system even if the data is damaged in one memory device system when remote copying is performed in an unguaranteed order mode. The data copy system checks the integrity at the time of completion of the writing of data from a host computer to a main logical volume of a primary memory device system. The data copy system creates a snapshot recording a state of the main logical volume when the integrity is assured and uses the snapshot to perform remote copying between the primary memory device system and a sub-memory device system. For an example, refer to Japanese Laid-Open Patent Publication No. 2005-293469.

Nonetheless, the conventional technology has a problem of causing delay in I/O from a business server, etc., at the time of remote copying of volumes belonging to a consistency group because a process for maintaining the consistency of the writing order between volumes becomes a bottleneck. For example, if update data for the volumes is stored in one storage area so as to keep the consistency of the writing order between volumes belonging to the consistency group, concentration of access to the storage area forms a bottleneck.

SUMMARY

According to an aspect of an embodiment, a storage control apparatus is configured to control storage units in a storage apparatus. The storage control apparatus includes a memory unit configured to store group information identifying a copy-source volume group belonging to a consistency group; and a control unit configured to create based on the group information, snapshots of respective volumes of the volume group for a given time point; create respective difference storage areas to store, as difference data, update data for the respective volumes after the given time point; and transfer to a copy-destination storage apparatus, data of the snapshots of the respective volumes. The control unit is further configured to create snapshots of the respective volumes at an arbitrary time point after the given time point; create respective difference storage areas to store, as difference data, update data for the respective volumes after the arbitrary time point; and transfer to the copy-destination storage apparatus, the difference data of the respective volumes for the arbitrary time point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view of the operation example of a copy-destination storage apparatus 102;

FIG. 4 is a block diagram of an example of a hardware configuration of a processor unit (PU), etc.;

FIGS. 13 and 14 are explanatory views of an update example of the consistency group management table 700;

FIG. 15 is an explanatory view of an example of the contents of a volume index table 1500;

FIG. 17 is an explanatory view of an example of the contents of a volume segment table 1700;

FIG. 18 is an explanatory view of an example of the contents of a rearrangement plan table 720;

FIG. 19 is an explanatory view of an example of a volume rearrangement plan;

FIG. 20 is an explanatory view (part one) of a rearrangement example of volumes;

FIG. 22 is an explanatory view of an update example of the volume index table 1500;

FIG. 23 is an explanatory view of an update example of the volume segment table 1700;

FIG. 24 is an explanatory view of an update example of the rearrangement plan table 720;

DESCRIPTION OF EMBODIMENTS

Embodiments of a storage control apparatus, a control method, and a control program will be described with reference to the drawings. In this description, a storage control apparatus, a storage unit, and a switch may be referred to as a "PU (Processor Unit)", an "SU (storage unit)", and an "SW (switch)", respectively.

Figure 1:
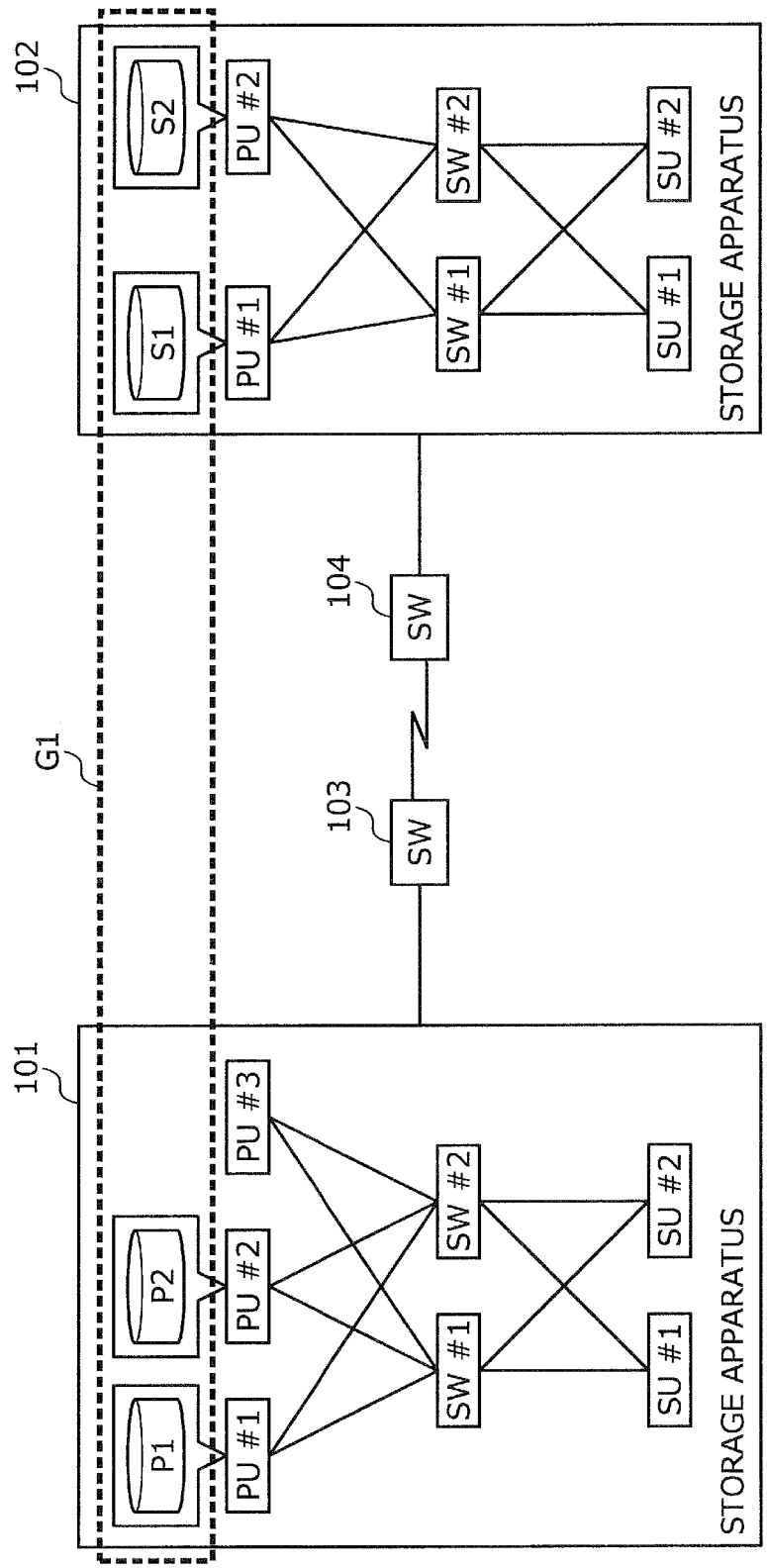
FIG. 1 is an explanatory view of an example of a control method according to an embodiment.

FIG. 1 is an explanatory view of an example of a control method according to an embodiment. In FIG. 1, a storage apparatus 101 includes PUs #1 to #3, SUs #1, #2, and SWs #1, #2. The PU #1 acts as a master control unit managing the other PUs (e.g., the PUs #2, #3) in the storage apparatus 101 to control the entire storage apparatus.

The PUs #1 to #3 are computers controlling the SUs #1, #2 under the control thereof. The PUs #1 to #3 accept access (I/O) to the SUs #1, #2 under the control thereof from a higher-level apparatus such as a business server and process the accepted access.

The SUs #1, #2 are computers having respective storages and controlling I/O to the respective storages. Each of the storages includes one or more memory devices D. The memory device D may be, for example, a physical memory device such as a hard disk, an optical disk, a flash memory, and a magnetic tape or may be a logical unit number (LUN) that is a logical memory device.

The SWs #1, #2 are computers having a switching function. The SWs #1, #2 select a route (port) corresponding to a destination of received data to relay the data. In the storage apparatus 101, the PUs #1 to #3 and the SUs #1, #2 are connected in full mesh via the redundant SWs #1, #2, for example.

This enables all the PUs in the storage apparatus 101 to access all the SUs and enables fallback at the occurrence of a failure such as a failure of a PU. The fallback is to continue operation with performance or functions partially stopped when a failure occurs in a system.

Similarly, a storage apparatus 102 includes PUs #1, #2, SUs #1, #2, and SWs #1, #2. The PUs in the storage apparatus 101 and the PUs in the storage apparatus 102 are connected via the SWs 103, 104 through a data transfer line for remote copying.

Although a case of the storage apparatus 101 including three PUs is taken as an example in the description of FIG. 1, the storage apparatus 101 may include any number of PUs greater than or equal to one. Although a case of the storage apparatus 101 including two SUs is taken as an example in the description, the storage apparatus 101 may include any number of SUs greater than or equal to one. The same applies to the storage apparatus 102.

Volumes P1, P2 in the storage apparatus 101 and volumes S1, S2 in the storage apparatus 102 are volumes belonging to a consistency group G1. In the storage apparatuses 101, 102, memory is managed in units of memory areas called volumes. For example, a volume may be a logical volume acquired by grouping multiple physical memory devices or partitions in a memory device (e.g., a hard disk) to virtually form one volume.

The consistency group is an aggregate of replication sets grouped to ensure the consistency of the writing order between primary volumes of all the replication sets. A replication set is a pair of volumes having a replication relationship and is made up of physically-separated primary and secondary volumes.

In the example of FIG. 1, the volumes P1, P2 are the primary volumes and the volumes S1, S2 are the secondary volumes. A pair of the volume P1 and the volume S1 and a pair of the volume P2 and the volume S2 are pairs of volumes having respective replication relationships.

When multiple PUs utilize multiple SUs to configure virtual volumes, this may give rise to a situation in which volumes with consistency (consistency of writing order) desirably maintained are distributed to the multiple PUs or a situation in which actual data of the volumes are distributed to the multiple SUs. When remote copying of volumes belonging to a consistency group is performed, difference data for data transfer must be ensured, i.e., a rest point of the volumes must be acquired, while a data update request from a business server is inhibited.

Therefore, when remote copying is performed, it is important not only how communication overhead required for cooperation between PUs is suppressed but also how the data with the rest point ensured is saved without affecting I/O from the business server as far as possible.

To maintain the consistency of data of the volumes belonging to the consistency group, for example, it is conceivable that update data information (e.g., update data, update position) to the volumes for all the PUs or each PU is stored in one storage area. However, if the update data information is retained only on volatile memory of a PU, the update data information is lost when the PU goes down and therefore, the update data information must be stored in nonvolatile memory of a PU or storage of an SU.

However, when the update data information from a business server is stored in one storage area with the order maintained, if the time required for a storage process becomes long, this causes I/O from the business server to wait. In the case of a PU without a cache, the update data information is written into an SU each time a volume is updated and this storage process becomes a bottleneck.

Therefore, in this embodiment, the storage apparatus 101 concurrently creates snapshots of the volumes belonging to the consistency group and creates storage areas storing update data for the volumes as difference data. The storage apparatus 101 transfers the data of the snapshots of the volumes to a copy destination. In this way, the remote copying is efficiently performed while the consistency of data is maintained between volumes belonging to the consistency group.

Figure 2:
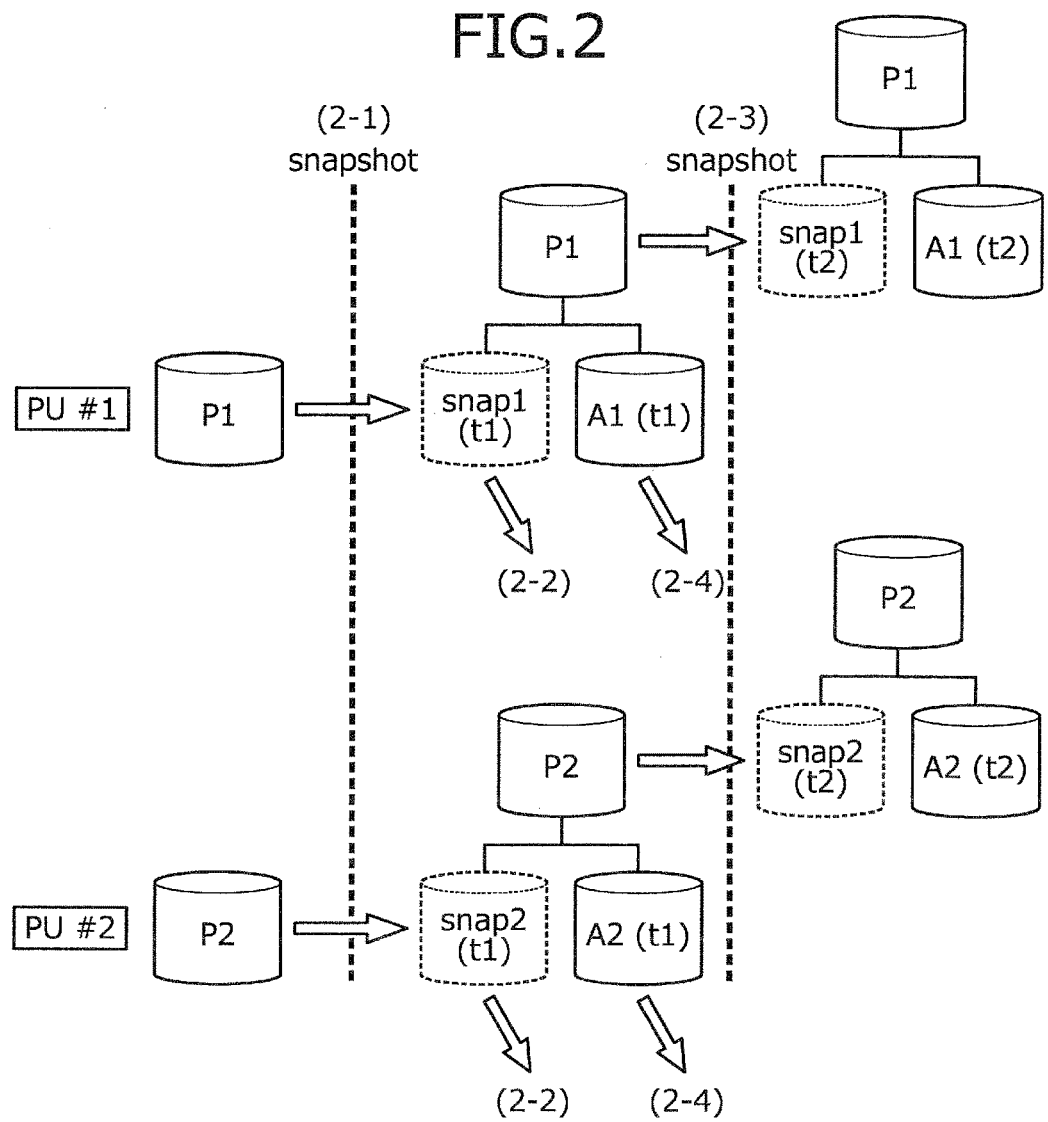
FIG. 2 is an explanatory view of an operation example of a copy-source storage apparatus 101.

With reference to FIGS. 2 and 3, description will hereinafter be made of operation examples of the storage apparatuses 101, 102 in a case of performing remote copying (between the storage apparatuses 101 and 102) of volumes belonging to a consistency group G1.

First, an operation example of the copy-source storage apparatus 101 will be described with reference to FIG. 2. FIG. 2 is an explanatory view of an operation example of the copy-source storage apparatus 101.

(2-1) The PU #1 of the storage apparatus 101 creates snapshots of the volumes P1, P2 at time t1 based on group information and creates difference storage areas A1(t1), A2(t1) of the volumes P1, P2. The group information is information identifying copy-source volumes belonging to a consistency group.

The group information represents, for example, correspondence relationships between a copy-source volume and a copy-destination volume belonging to a consistency group. In the example of FIG. 1, the group information represents respective correspondence relationships between the copy-source volumes P1, P2 and the copy-destination volumes S1, S2 belonging to the consistency group G1.

The group information is stored in the SUs #1, #2 of the storage apparatuses 101, 102, for example. Creating a snapshot means that data on a volume is ensured at a given time t. Difference storage areas A1(t), A2(t) are storage areas storing, as difference data, update data for the volumes P1, P2 after time t.

In the example of FIG. 1, among the copy-source volumes P1, P2 belonging to the consistency group G1, the volume P1 resides in the PU #1 of the storage apparatus 101 and the volume P2 resides in the PU #2 of the storage apparatus 101. In this case, the PU #1 of the storage apparatus 101 notifies the PU #2 of a creation instruction for the snapshot of the volume P2 at time t1. The PU #1 of the storage apparatus 101 creates the snapshot of the volume P1 at time t1 and creates the difference storage area A1(t1) of the volume P1.

For example, the PU #1 renames the volume P1 to create a volume snap1(t1), which is a master volume of the volume P1. The volume snap1(t1) is a volume having a read-only attribute. The PU #1 creates, as the difference storage area A1(t1), an empty volume storing, as difference data, the update data for the volume P1 after time t1.

As a result, the logical volume P1 coordinating the volume snap1(t1) and the difference storage area A1(t1) can be generated. For example, if object data for a read request to the volume P1 does not reside in the difference storage area A1(t1), the storage apparatus 101 reads the data from the volume snap1(t1). On the other hand, if the data resides in the difference storage area A1(t1), the storage apparatus 101 reads the data from the difference storage area A1(t1).

The storage apparatus 101 writes data into the difference storage area A1(t1) for a write request to the volume P1. As a result, the new logical volume P1 appears as a volume in the form obtained by merging the data before creation of the snapshot and the update data after creation of the snapshot.

On the other hand, in response to the receipt of the creation instruction for the snapshot of the volume P2 at time t1, the PU #2 of the storage apparatus 101 creates the snapshot of the volume P2 at time t1 and creates the difference storage area A2(t1) of the volume P2.

For example, the PU #2 renames the volume P2 to create a volume snap2(t1), which is a master volume of the volume P2. The volume snap2(t1) is a volume having a read-only attribute. The PU #2 creates, as the difference storage area A2(t1), an empty volume storing, as difference data, the update data for the volume P2 after time t1.

At time t1, the PUs #1, #2 inhibit I/O for the volumes P1, P2 from a higher-level apparatus such as a business server. The I/O from a higher-level apparatus such as a business server is resumed when the PUs #1, #2 create the snapshots of the volumes P1, P2 at time t1 and create the difference storage areas A1(t1), A2(t1) of the volumes P1, P2. Time t1 can be set arbitrarily.

(2-2) The PU #1 of the storage apparatus 101 transfers the data of the snapshots of the volumes P1, P2 to the copy-destination storage apparatus 102. In the example of FIG. 1, the PU #1 of the storage apparatus 101 transfers the data of the created snapshot of the volume P1 to the PU #1 of the storage apparatus 102 having the copy-destination volume S1. The PU #2 of the storage apparatus 101 transfers the data of the created snapshot of the volume P2 to the PU #2 of the storage apparatus 102 having the copy-destination volume S2.

(2-3) the PU #1 of the storage apparatus 101 creates snapshots of the volumes P1, P2 at time t2 after time t1 and creates difference storage areas A1(t2), A2(t2) of the volumes P1, P2. Time t2 is any time point after time t1 and can be set arbitrarily.

In the example of FIG. 1, the PU #1 of the storage apparatus 101 notifies the PU #2 of a creation instruction for the snapshot of the volume P2 at time t2. The PU #1 of the storage apparatus 101 creates the snapshot of the volume P1 at time t2 and creates the difference storage area A1(t2) of the volume P1.

Also, in response to the receipt of the creation instruction for the snapshot of the volume P2 at time t2, the PU #2 of the storage apparatus 101 creates the snapshot of the volume P2 at time t2 and creates the difference storage area A2(t2) of the volume P2. As a result, the logical volume P1 coordinating the volume snap1(t2) and the difference storage area A1(t2) is created, and the logical volume P2 coordinating the volume snap2(t2) and the difference storage area A2(t2) is created.

I/O from a higher-level apparatus such as a business server is inhibited at time t2. The I/O from a higher-level apparatus such as a business server is resumed when the creation of the snapshots of the volumes P1, P2 at time t2 is completed and the creation of the difference storage areas A1(t2), A2(t2) of the volumes P1, P2 is completed.

(2-4) The PU #1 of the storage apparatus 101 transfers the difference data of the volumes P1, P2 at time t2 to the copy-destination storage apparatus 102. In the example of FIG. 1, the PU #1 of the storage apparatus 101 transfers the difference data of the volume P1 at time t2 to the PU #1 of the copy-destination storage apparatus 102. The difference data of the volume P1 at time t2 is the update data for the volume P1 from time t1 to time t2 and is the difference data stored in the difference storage area A1(t1).

The PU #2 of the storage apparatus 101 transfers the difference data of the volume P2 at time t2 to the PU #2 of the copy-destination storage apparatus 102. The difference data of the volume P2 at time t2 is the update data for the volume P2 from time t1 to time t2 and is the difference data stored in the difference storage area A2(t1).

An operation example of the copy-destination storage apparatus 102 will be described with reference to FIG. 3. FIG. 3 is an explanatory view of the operation example of the copy-destination storage apparatus 102.

(3-1) In response to receipt of the data of the snapshot of the copy-source volume P1 at time t1 from the PU #1 of the storage apparatus 101, the PU #1 of the storage apparatus 102 stores the received data into the copy-destination volume S1.

In response to receipt of the data of the snapshot of the copy-source volume P2 at time t1 from the PU #2 of the storage apparatus 101, the PU #2 of the storage apparatus 102 stores the received data into the copy-destination volume S2.

(3-2) In response to receipt of the difference data of the copy-source volume P1 at time t2 from the PU #1 of the storage apparatus 101, the PU #1 of the storage apparatus 102 creates a difference storage area A1'(t1). A difference storage area A1'(t) is a storage area storing, as difference data, update data for the volume S1 after time t. The PU #1 of the storage apparatus 102 stores the received difference data into the created difference storage area A1'(t1).

In response to receipt of the difference data of the copy-source volume P2 at time t2 from the PU #2 of the storage apparatus 101, the PU #2 of the storage apparatus 102 creates a difference storage area A2'(t1). A difference storage area A2'(t) is a storage area storing, as difference data, update data for the volume S2 after time t. The PU #2 of the storage apparatus 102 stores the received difference data into the created difference storage area A2'(t1).

(3-3) The PU #1 of the storage apparatus 102 creates a snapshot of the copy-destination volume S1. For example, the PU #1 renames the volume S1 to create a volume snap1(t1) that is a master volume of the volume S1.

The PU #2 of the storage apparatus 102 creates a snapshot of the copy-destination volume S2. For example, the PU #2 renames the volume S2 to create a volume snap2(t1) that is a master volume of the volume S2.

Thus, the PU #1 can take concurrent snapshots of the volumes P1, P2 belonging to the consistency group G1 and can maintain the consistency of writing order of data between volumes belonging to the consistency group G1. The PU #1 can avoid heavy concentration of access by distributing the access for maintaining the consistency of writing order of data between volumes to the difference storage areas A1(t1), A2(t1) and can prevent a delay in I/O from a higher-level apparatus such as a business server. The data transferred from the local site can be referred to in the form of a snapshot on the remote site.

A hardware configuration example of computers such as PUs, SUs, SWs (simply referred to as "PU, etc." in this description) of the storage apparatuses 101, 102 depicted in FIG. 1 will be described.

FIG. 4 is a block diagram of an example of a hardware configuration of the PU, etc. In FIG. 4, the PU, etc. include a central processing unit (CPU) 401, memory 402, and an interface (I/F) 403, respectively connected by a bus 410.

The CPU 401 governs overall control of the PU, etc. The memory 402 includes, for example, read-only memory (ROM), random access memory (RAM), and flash ROM. More specifically, for example, the flash ROM stores programs such as an operating system (OS) and firmware; the ROM stores application programs; and the RAM is used as a work area of the CPU 401. Programs stored in the memory 402 are loaded onto the CPU 401, whereby encoded processes are executed by the CPU 401.

The I/F 403 controls the input and output of data with respect to other computers. More specifically, for example, the I/F 403 is connected, via a communication line, to a network such as a local area network (LAN), a wide area network (WAN), and the Internet; and is connected to other computers through the network. The I/F 403 administers an internal interface with the network and controls the input and output of data with respect to other computers.

In the description hereinafter, one or more PUs in the storage apparatuses 101, 102 may be referred to as "PUs #1 to #n" (n is a natural number of one or more), and an arbitrary PU of the PUs #1 to #n may be referred to as a "PU #i" (i=1, 2, . . . , n).

A functional configuration example of a PU #i acting as the master control unit of the storage apparatus 101 will be described. It is noted that if the PU #i goes down in the storage apparatus 101, another PU #j (j≠i, j=1, 2, . . . , n) takes over the function of the PU #i.

Figure 5:
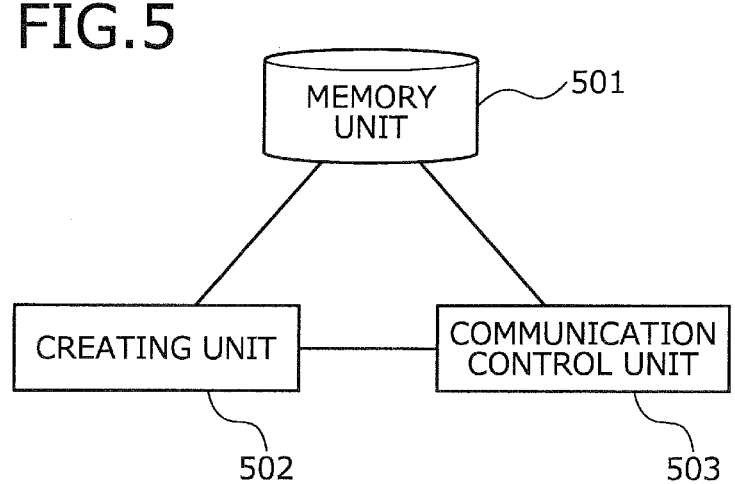
FIG. 5 is a block diagram of a functional configuration example of a PU #i.

FIG. 5 is a block diagram of a functional configuration example of a PU #i. In FIG. 5, the PU #i includes a memory unit 501, a creating unit 502, and a communication control unit 503. For example, the functions of the creating unit 502 and the communication control unit 503 are implemented by causing the CPU 401 to execute programs stored in the memory 402 depicted in FIG. 4 or by the I/F 403. The process results of the functional units are stored in the memory 402, for example.

Description will be made of the functional units when the storage apparatus 101 is the copy-source storage apparatus. It is assumed that the storage apparatus 102 is the copy-destination storage apparatus.

The memory unit 501 stores configuration information indicating the configuration of memory areas of the storage apparatus 101. The configuration information includes group information of the consistency group G. The group information is information identifying the copy-source volumes belonging to the consistency group G and indicates, for example, correspondence relationships between a copy-source volume P and a copy-destination volume S belonging to the consistency group G.

For example, the group information may include information identifying a PU #i in the storage apparatus 101 having the copy-source volume P and may include information identifying a PU #i in the storage apparatus 102 having the copy-destination volume S. The information identifying a PU #i is the Internet Protocol (IP) address of the PU #i, for example.

For example, the configuration information may include assignment information indicating assignment states of memory areas of SUs in the storage apparatus 101. For example, the assignment information is information indicating to which memory device D of which SU in the storage apparatus 101, a volume is assigned. The configuration information is stored in an SU in the storage apparatus 101, for example. For example, the PU #i reads out and stores the configuration information from the SU in the storage apparatus 101 into the memory unit 501.

In the following description, the copy-source volumes belonging to the consistency group G may be referred to as "volumes P1 to PK" (K is a natural number of two or more), and an arbitrary volume of the volumes P1 to PK may be referred to as a "volume Pk" (k=1, 2, . . . , K). The copy-destination volumes belonging to the consistency group G may be referred to as "volumes S1 to SK", and an arbitrary volume of the volumes S1 to SK may be referred to as a "volume Sk".

The creating unit 502 creates a snapshot of each volume Pk of the copy-source volumes P1 to PK at time t1, based on the group information and creates a difference storage area Ak(t1) for each volume Pk. A difference storage area Ak(t) is a storage area storing, as difference data, update data for the volume Pk after time t. The difference storage area Ak(t) is implemented by a thin provisioning volume, for example.

For example, the creating unit 502 determines whether the volumes P1 to PK include a volume Pk residing in another PU #j different from the PU #i of the creating unit 502. The creating unit 502 may identify the PU having the volume Pk from the group information or by making an inquiry to the PUs #1 to #n.

If no volume Pk residing in another PU #j is present, the creating unit 502 creates snapshots of the volumes P1 to PK residing in the PU #i thereof at time t1 and creates the difference storage areas A1(t1) to AK(t1) of the volumes P1 to PK. The data of the snapshot of the volume Pk at time t1 is the data of the volume Pk itself at time t1.

On the other hand, if a volume Pk residing in another PU #j is present, the creating unit 502 notifies the other PU #j of a creation instruction for a snapshot of the volume Pk at time t1. The creating unit 502 creates a snapshot of each volume Pk residing in the PU #i thereof at time t1 and creates a difference storage area Ak(t1) for each volume Pk.

At time t1, each PU having the volume Pk inhibits I/O for the volume Pk from a higher-level apparatus such as a business server. Each PU resumes the I/O from the higher-level apparatus such as a business server when the PU creates the snapshot of each volume Pk at time t1 and creates the difference storage area Ak(t1) of each volume Pk. I/O during inhibition may be saved to a cache, etc. of each PU, for example.

The communication control unit 503 transfers to the copy-destination storage apparatus 102, the data of the snapshot of each volume Pk of the copy-source volumes P1 to PK for time t1. For example, the communication control unit 503 refers to the assignment information and reads out from an SU, the data of the snapshot of a volume Pk residing in the PU #i and created at time t1 by the creating unit 502.

The communication control unit 503 transfers the read data to the PU in the storage apparatus 102 having the copy-destination volume Sk. The communication control unit 503 may identify the PU having the copy-destination volume Sk from the group information or by making an inquiry to the PUs #1 to #n in the copy-destination storage apparatus 102.

The creating unit 502 creates a snapshot of each volume Pk of the copy-source volumes P1 to PK for time t2 after time t1 and creates a difference storage area Ak(t2) for each volume Pk. For example, first, the creating unit 502 determines whether the volumes P1 to PK include a volume Pk residing in another PU #j different from the PU #i of the creating unit 502.

If no volume Pk residing in another PU #j is present, the creating unit 502 creates snapshots of the volumes P1 to PK residing in the PU #i thereof at time t2 and creates the difference storage areas A1(t2) to AK(t2) of the volumes P1 to PK. In this case, the creating unit 502 creates a snapshot of the volume Pk for time t2, based on the data of the snapshot of the volume Pk at time t1 and the difference data stored in the difference storage area Ak(t1).

On the other hand, if a volume Pk residing in another PU #j is present, the creating unit 502 notifies the other PU #j of a creation instruction for a snapshot of the volume Pk at time t2. The creating unit 502 creates a snapshot of each volume Pk residing in the PU #i thereof at time t2 and creates the difference storage area Ak(t2) for each volume Pk.

The communication control unit 503 transfers to the copy-destination storage apparatus 102, the difference data of each volume Pk of the copy-source volumes P1 to PK for time t2. For example, the communication control unit 503 refers to the assignment information and reads out from an SU, the data of the difference storage area Ak(t1) of the volume Pk residing in the PU #i. The communication control unit 503 transfers the read data to the PU in the storage apparatus 102 having the copy-destination volume Sk.

The creating unit 502 may regularly or arbitrarily create a snapshot of each copy-source volume Pk at any time tp after time t1 and create a difference storage area Ak(tp) for each volume Pk (p is a natural number of two or more). In this case, the communication control unit 503 transfers the difference data of each copy-source volume Pk at time tp to the copy-destination storage apparatus 102.

Time tp can be set arbitrarily. For example, time tp may be time points at constant time intervals after time t1. The constant time interval can be set arbitrarily and is set to several minutes, several hours, or several days, for example.

If the PU #i is not the master control unit, the PU #i accepts from another PU #j acting as the master control unit of the storage apparatus 101, a creation instruction for a snapshot of a volume Pk residing in the PU #i at time t1. In this case, the creating unit 502 creates a snapshot of the volume Pk residing in the PU #i at time t1 and creates the difference storage area Ak(t1) of the volume Pk. The communication control unit 503 transfers to the copy-destination storage apparatus 102, the data of the snapshot of the volume Pk for time t1.

In this case, in response to acceptance of the creation instruction for the snapshot from the other PU #j, the PU #i inhibits I/O for the volume Pk from a higher-level apparatus such as a business server. The PU #i resumes the I/O from the higher-level apparatus such as a business server when the PU #i creates the snapshot of the volume Pk for time t1 and creates the difference storage area Ak(t1) of the volume Pk.

If the PU #i is not the master control unit, the PU #i accepts from another PU #j acting as the master control unit of the storage apparatus 101, a creation instruction for a snapshot of a volume Pk residing in the PU #i at time tp. In this case, in response to acceptance of the creation instruction for the snapshot, the creating unit 502 creates a snapshot of the volume Pk residing in the PU #i at time tp and creates the difference storage area Ak(tp) of the volume Pk. The communication control unit 503 transfers to the copy-destination storage apparatus 102, data of a difference storage area Ak(t(p−1)) of the volume Pk.

In this case, in response to acceptance of the creation instruction for the snapshot from the other PU #j, the PU #i inhibits I/O for the volume Pk from a higher-level apparatus such as a business server. The PU #i resumes the I/O from the higher-level apparatus such as a business server when the PU #i creates the snapshot of the volume Pk for time tp and creates the difference storage area Ak(tp) of the volume Pk.

When each of the storage apparatuses 101, 102 includes multiple PUs, even if the storage apparatuses 101, 102 have the same PU configurations, the relationship between a PU having the copy-source volume PK and a PU having the copy-destination volume SK may not necessarily be one-to-one.

For example, when it is assumed that two volumes reside on the PU #1 of the storage apparatus 101 and that both are subject to remote copying, the counterparts (copy-destination volumes) of these volumes may not necessarily reside on a single PU in the storage apparatus 102. Alternatively, the storage apparatuses 101, 102 may have different PU configurations.

Therefore, to establish the copy-source/copy-destination remote copying relationship (hereinafter referred to as a "session"), it is desirable that the storage apparatus 101 efficiently comprehend which PU in the storage apparatus 102 has a copy-destination volume Sk.

Furthermore, in an established session relationship, some sort of trouble such as PU failure and line abnormalities may disable communication with a PU in the storage apparatus 102 having the copy-destination volume Sk. In this case, failover of the volume Sk on the abnormal PU is performed by another properly operating PU. The failover is a function that, for example, if an abnormality occurs in a given PU, another PU takes over a process and data in place of the abnormal PU.

Therefore, the communication control unit 503 may make an inquiry about the PU having the copy-destination volume Sk to any PU (hereinafter referred to as a "representative PU") among the PUs #1 to #n in the copy-destination storage apparatus 102. If communication with the PU having the copy-destination volume Sk is disabled, the communication control unit 503 may make an inquiry about a PU (failover-destination PU) that is the migration destination of the copy-destination volume Sk.

In this case, the representative PU is a specific PU among the PUs #1 to #n in the copy-destination storage apparatus 102 and is, for example, a PU acting as the master control unit of the storage apparatus 102. The representative PU is assigned a representative address. The representative address is a logical IP address for remote copying assigned to the representative PU in the copy-destination storage apparatus 102. The representative address is included in the group information of the consistency group G.

For example, when remote copying is started, the representative PU collects information of a copy-destination volume S through communication with another PU to comprehend which PU the copy-destination volume S resides on. The representative PU and the representative address of the copy-destination storage apparatus 102 can be set arbitrarily. If the representative PU goes down, another PU in the copy-destination storage apparatus 102 takes over the function of the representative PU.

The communication control unit 503 can use the representative address to communicate with the representative PU in the copy-destination storage apparatus 102, thereby making an inquiry about the PU having the copy-destination volume Sk or the PU that is the migration destination of the copy-destination volume Sk. As a result, when the copy-source/copy-destination session relationship is established or when the session relationship is lost, the need for making an inquiry to individual PUs in the copy-destination storage apparatus 102 is eliminated, enabling an efficient search for the PU to be connected.

Description will be made of the functional units when the storage apparatus 101 is the copy-destination storage apparatus. It is assumed that the storage apparatus 102 is the copy-source storage apparatus.

Consequent to receiving the data of the snapshot of the copy-source volume Pk for time t1 from the storage apparatus 102, the creating unit 502 stores the received data into the copy-destination volume Sk.

Consequent to receiving the difference data of the copy-source volume Pk for time tp after time t1, the creating unit 502 creates a difference storage area Ak'(t(p−1)) of the volume Sk and stores the received difference data into the difference storage area Ak'(t(p−1)). The creating unit 502 creates the snapshot of the copy-destination volume Sk for time t(p−1).

While the remote copying is performed, access to the copy-destination volume Sk is prohibited. A write request is not permitted since if data is changed in a snapshot used as a master, copy-source data is lost because the snapshot mode is employed.

On the other hand, a read request is not permitted since trouble occurs if an OS of a business server is a particular OS. A particular OS is an OS issuing a write request even to a volume that can only be read. In the case of a particular OS, even if only a read request is permitted, a write request is issued, causing trouble in that a large volume of error logs indicating a failure of write is recorded in event logs on the business server.

However, setting of this access limitation causes a problem in that data cannot be referred to even though the initial transfer of the data to a copy destination has been completed. The data becomes referable after the next difference transfer is performed and the copy-destination volume Sk is handled as a snapshot.

Therefore, consequent to receiving the data of the snapshot of the copy-source volume Pk for time t1, the creating unit 502 may store the received data into the copy-destination volume Sk and create a difference storage area Ak'(t1) of the volume Sk to create a snapshot of the copy-destination volume Sk for time t1. An example of creating a snapshot of the copy-destination volume Sk will be described with reference to FIG. 6.

Figure 6:
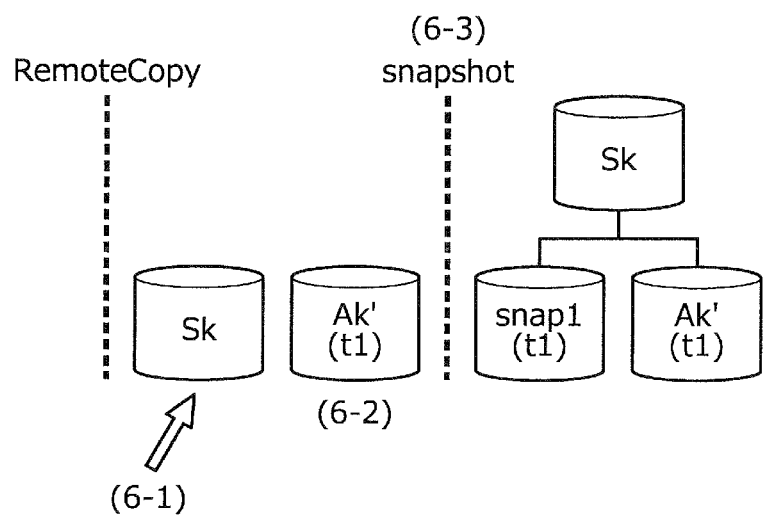
FIG. 6 is an explanatory view of an example of creating a snapshot of a copy-destination volume Sk.

FIG. 6 is an explanatory view of an example of creating a snapshot of the copy-destination volume Sk. (6-1) Consequent to receiving the data of the snapshot of the copy-source volume Pk for time t1, the creating unit 502 stores the received data into the copy-destination volume Sk.

(6-2) The creating unit 502 creates the difference storage area Ak'(t1) of the volume Sk. This difference storage area Ak'(t1) is a dummy (empty) storage area.

(6-3) The creating unit 502 creates the snapshot of the copy-destination volume Sk for time t1. For example, the creating unit 502 renames the volume Sk to create a volume snap1(t1) that is a master volume of the volume Sk. As a result, the data of the volume SK (volume snap1(t1)) becomes referable.

As described, when the initial data transfer from the copy source is completed, the creating unit 502 additionally creates the dummy (empty) difference storage area Ak'(t1) and immediately handles the volume Sk of the completed transfer as a snapshot. As a result, the volume Sk is handled as a snapshot when the initial data transfer is completed, and the transferred data can be referred to at the copy destination after completion of the initial data transfer.

However, a snapshot is originally a volume having the read-only attribute so as not to allow data update. Therefore, a write request is prohibited to the volume Sk with a snapshot formed as a result of the second data transfer. Nonetheless, as described, the volume Sk must be a writable volume so as to mount the volume Sk to the business server in which the particular OS installed.

Therefore, the PU #i creates a readable/writable difference clone of the snapshot such that it appears to the business server as if the snapshot is assigned, thereby enabling read/write from/to the (pseudo) snapshot. Even if data is written into the difference clone, the PU #i discards the data without writing back to the original snapshot.

After time t1, for example, if the creating unit 502 receives difference data of the copy-source volume Pk for time tp, the creating unit 502 stores the received difference data into the difference storage area Ak'(t(p−1)). The creating unit 502 then creates the difference storage area Ak(tp) of the volume Sk. The creating unit 502 creates the snapshot of the copy-destination volume Sk for time tp, based on the data of the snapshot of the copy-destination volume Sk at time t(p−1) and the difference data stored in the difference storage area Ak'(t(p−1)).

Control process procedures of the storage apparatus 101 will be described. First, description will be made of the control process procedure when the storage apparatus 101 is the copy-source storage apparatus. It is assumed that the storage apparatus 102 is the copy-destination storage apparatus.

Figure 7:
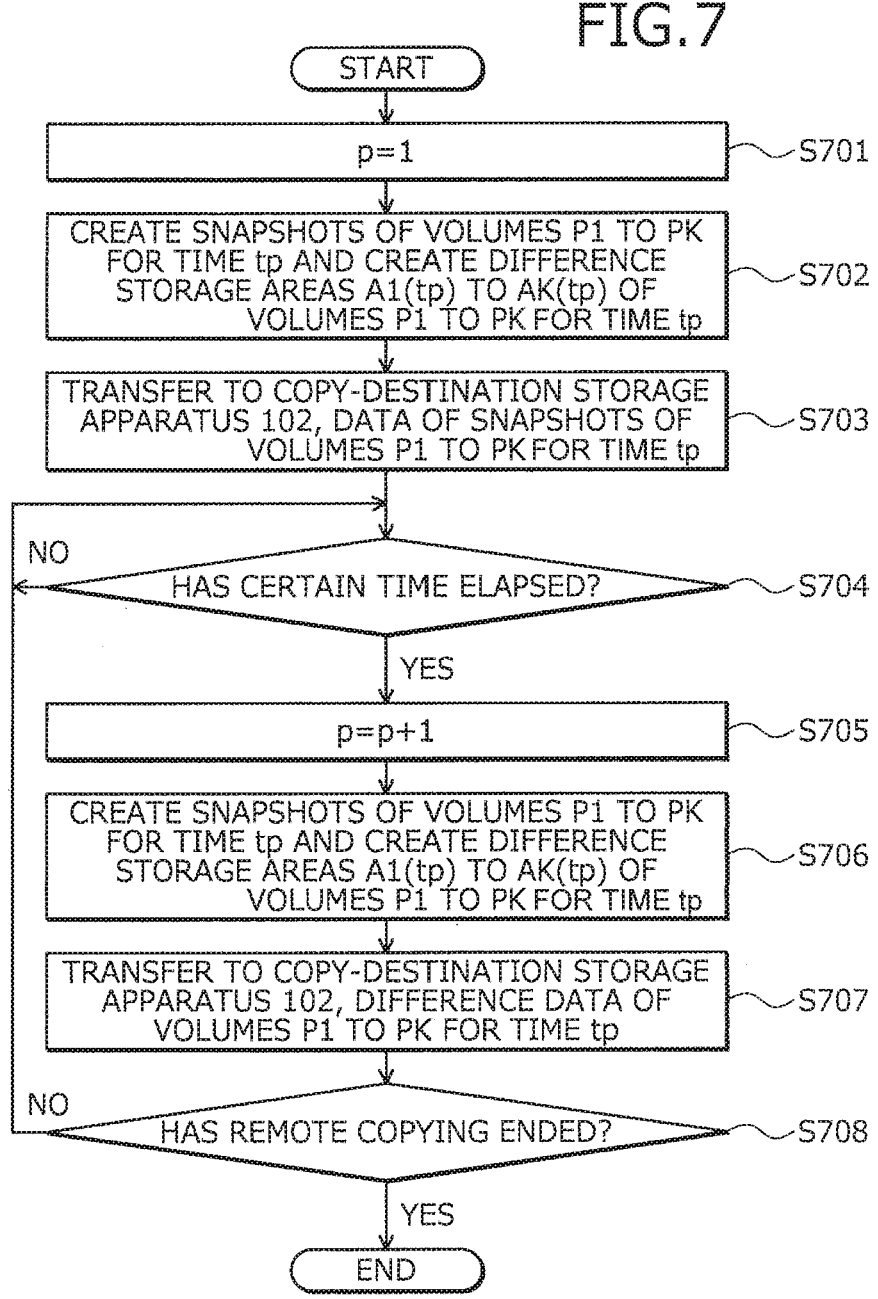
FIG. 7 is a flowchart of an example of a control process procedure of the copy-source storage apparatus 101.

FIG. 7 is a flowchart of an example of the control process procedure of the copy-source storage apparatus 101. In the flowchart of FIG. 7, first, the storage apparatus 101 sets "p" of time tp to "p=1" (step S701).

The storage apparatus 101 creates snapshots of the volumes P1 to PK at time tp based on the group information and creates difference storage areas A1(tp) to AK(tp) of the volumes P1 to PK (step S702). The storage apparatus 101 transfers to the copy-destination storage apparatus 102, the data of the snapshots of the volumes P1 to PK for time tp (step S703).

The storage apparatus 101 determines whether a certain time has elapsed since time tp (step S704). The storage apparatus 101 waits until the certain time has elapsed (step S704: NO), and when the certain time has elapsed (step S704: YES), the storage apparatus 101 increments "p" of time tp (step S705).

The storage apparatus 101 creates the snapshots of the volumes P1 to PK for time tp and creates the difference storage areas A1(tp) to AK(tp) of the volumes P1 to PK (step S706). The storage apparatus 101 transfers to the copy-destination storage apparatus 102, the difference data of the volumes P1 to PK for time tp (step S707).

The storage apparatus 101 then determines whether remote copying between the storage apparatuses 101, 102 has ended (step S708). If the remote copying has not ended (step S708: NO), the storage apparatus 101 returns to step S704.

On the other hand, if the remote copying has ended (step S708: YES), the storage apparatus 101 terminates a series of operations of this flowchart.

As a result, the snapshots of the volumes P1 to PK can be periodically taken concurrently and the consistency of writing order of data can be maintained between volumes belonging to the consistency group G at constant time intervals.

Description will be made of the control process procedure when the storage apparatus 101 is the copy-destination storage apparatus. It is assumed that the storage apparatus 102 is the copy-source storage apparatus.

Figure 8:
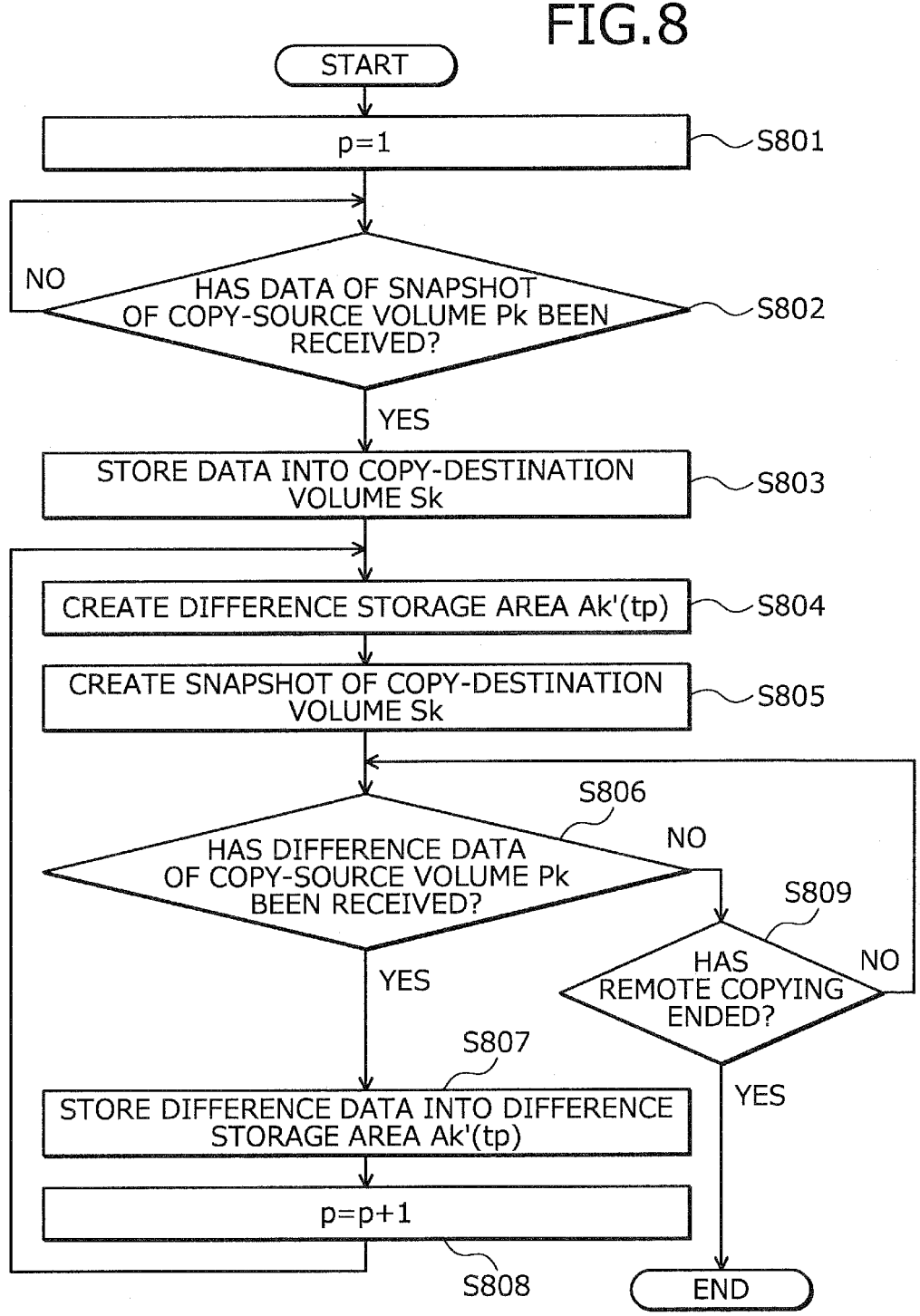
FIG. 8 is a flowchart of an example of the control process procedure of the copy-destination storage apparatus 101.

FIG. 8 is a flowchart of an example of the control process procedure of the copy-destination storage apparatus 101. In the flowchart of FIG. 8, first, the storage apparatus 101 sets "p" of time tp to "p=1" (step S801).

The storage apparatus 101 determines whether the data of the snapshot of the copy-source volume Pk has been received from the copy-source storage apparatus 102 (step S802). The storage apparatus 101 waits until the data of the snapshot of the copy-source volume Pk is received (step S802: NO).

When the data of the snapshot of the copy-source volume Pk is received (step S802: YES), the storage apparatus 101 stores the received data into the copy-destination volume Sk (step S803). The storage apparatus 101 creates a difference storage area Ak'(tp) of the volume Sk (step S804).

The storage apparatus 101 creates the snapshot of the copy-destination volume Sk for time tp (step S805). The storage apparatus 101 determines whether difference data of the copy-source volume Pk has been received from the storage apparatus 102 (step S806).

If the difference data of the copy-source volume Pk has been received (step S806: YES), the storage apparatus 101 stores the received difference data into the difference storage area Ak'(tp) (step S807). The storage apparatus 101 increments "p" of time tp (step S808) and returns to step S804.

At step S806, if the difference data of the copy-source volume Pk has not been received (step S806: NO), the storage apparatus 101 determines whether remote copying between the storage apparatuses 101, 102 has ended (step S809). If the remote copying has not ended (step S809: NO), the storage apparatus 101 returns to step S806.

On the other hand, if the remote copying has ended (step S809: YES), the storage apparatus 101 terminates a series of operations of this flowchart.

As a result, the data of the copy-source volume Pk can be transferred to the copy-destination volume Sk. The volume Sk is handled as a snapshot when the initial data transfer is completed, and the transferred data can be referred to at the copy destination after completion of the initial data transfer.

As described, the storage apparatus 101 according to the embodiment can create snapshots of the copy-source volumes P1 to PK at time t1 and can create the difference storage areas A1(t1) to AK(t1) of the volumes P1 to PK. The storage apparatus 101 can transfer the data of the snapshots of the volumes P1 to PK at time t1 to the copy-destination storage apparatus 102.

As a result, the snapshots of the volumes P1 to PK belonging to the consistency group G can be taken concurrently and the consistency of writing order of data can be maintained between volumes belonging to the consistency group G. The heavy concentration of access can be prevented by distributing the access to the difference storage areas A1($t$1) to AK(t1) when update data for the volumes P1 to PK are stored as difference data, and a delay in I/O from a higher-level apparatus such as a business server can be prevented.

The storage apparatus 101 can periodically or arbitrarily create the snapshots of the volumes P1 to PK at time tp after time t1 and can create the difference storage areas A1($tp$) to AK(tp) of the volumes P1 to PK. The storage apparatus 101 can transfer to the copy-destination storage apparatus 102, the difference data of the volumes P1 to PK for time tp.

As a result, the update data with the consistency maintained between volumes belonging to the consistency group G can be secured at arbitrary time intervals.

In response to receipt of the data of the snapshot of the copy-source volume Pk from the storage apparatus 102, the storage apparatus 101 can store the received data into the copy-destination volume Sk. In response to receipt of the difference data of the copy-source volume Pk from the storage apparatus 102, the storage apparatus 101 can create the difference storage area Ak'(t(p−1)) and can store the received difference data into the difference storage area Ak'(t(p−1)). The storage apparatus 101 can create the snapshot of the copy-destination volume Sk.

As a result, when the difference data of the copy-source volume Pk is transferred from the storage apparatus 102, the copy-destination volume Sk is handled as a snapshot and the data of the copy-destination volume Sk can be made referable.

In response to receipt of the data of the snapshot of the copy-source volume Pk at time tp, the storage apparatus 101 can create the difference storage area Ak'(tp) of the copy-destination volume Sk to create a snapshot of the copy-destination volume Sk. As result, when the initial data transfer is completed, the volume Sk is handled as a snapshot, and the transferred data can be referred to at the copy destination after completion of the initial data transfer.

The storage apparatus 101 can use the representative address to communicate with the representative PU in the copy-destination storage apparatus 102, thereby making an inquiry about the PU having the copy-destination volume Sk or the PU that is the migration destination of the copy-destination volume Sk. As a result, when the copy-source/copy-destination session relationship is established or when the session relationship is lost, the need for making an inquiry to individual PUs in the copy-destination storage apparatus 102 is eliminated, enabling an efficient search for the PU to be connected.

Thus, the storage apparatus 101 according to the embodiment can efficiently perform remote copying while the consistency of writing order of data is maintained between volumes belonging to the consistency group G.

An example of the storage apparatus 101 according to an embodiment will be described. This example will be described by taking a case of applying the storage apparatus 101 to a scale-out type storage system SM for a virtual environment.

Figure 9:
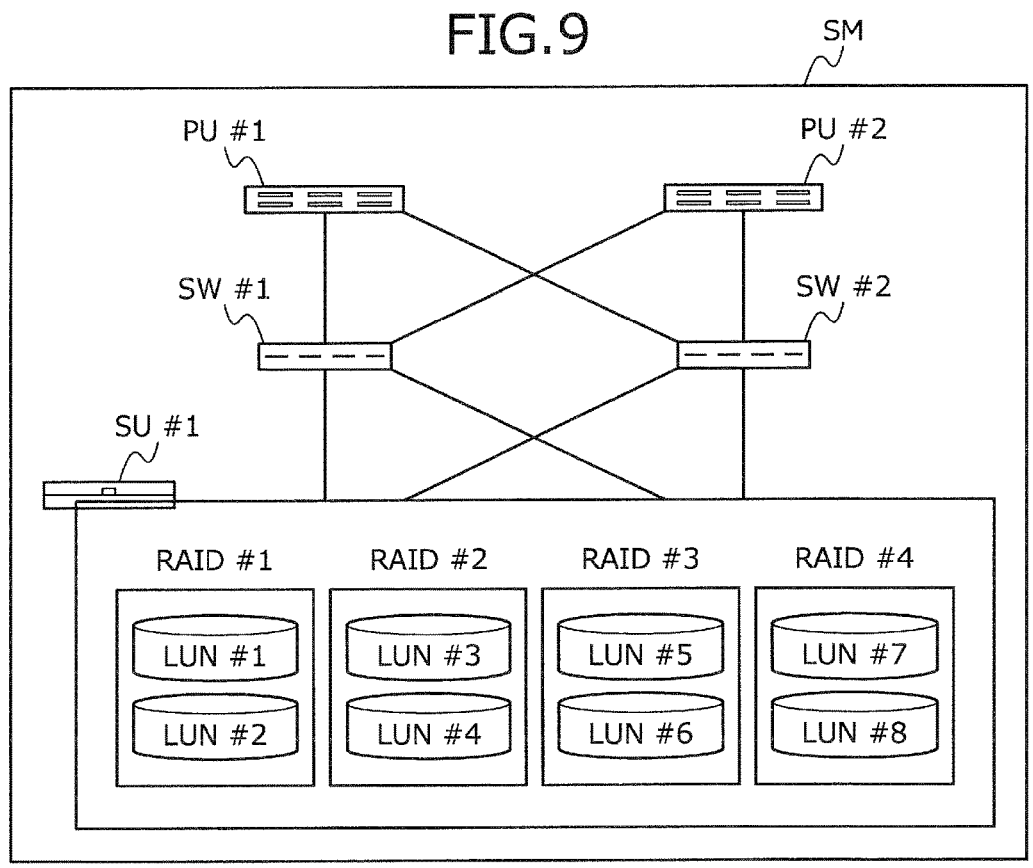
FIG. 9 is an explanatory view of a system configuration example of a storage system SM.

FIG. 9 is an explanatory view of a system configuration example of a storage system SM. In FIG. 9, the storage system SM includes the PUs #1, #2, the SWs #1, #2, and the SU #1. The PUs #1, #2 are computers controlling the SU #1 and are accessible from a business server BS and a management server MS described later, for example.

The SWs #1, #2 are computers having a switching function. The SU #1 is a computer having redundant arrays of independent disks (RAIDs) #1 to #4 and controlling access to the RAIDs #1 to #4. Each of the RAIDs #1 to #4 is a RAID group acquired by gathering multiple memory devices (e.g., hard disks) to form one memory device. For example, each of the RAIDs #1 to #4 is made up of two LUNs.

The storage system SM performs data access through wide striping. The wide striping can suppress performance deterioration due to access concentration and secure stable performance without complicated performance design in consideration of an access amount from a higher-level apparatus such as a server to the storage system SM and the physical position of a volume.

As the memory capacity required for the storage system SM increases, the storage system SM can be expanded in the overall memory area of the apparatus. For example, in the storage system SM, the overall memory area of the apparatus can be expanded by using a PU and an SU as a set.

In the following description, addition of an expansion set (PU+SU) defined as a set of a PU and an SU to the storage system SM may be referred to as "scale-out". The PUs #1, #2, the SW #1, #2, and the SU #1 included in the storage system SM may be referred to as a "basic node", and an expansion set added to the storage system SM may be referred to as an "expansion node". A virtual volume provided by the storage system SM may be referred to as a "VDISK".

Figure 10:
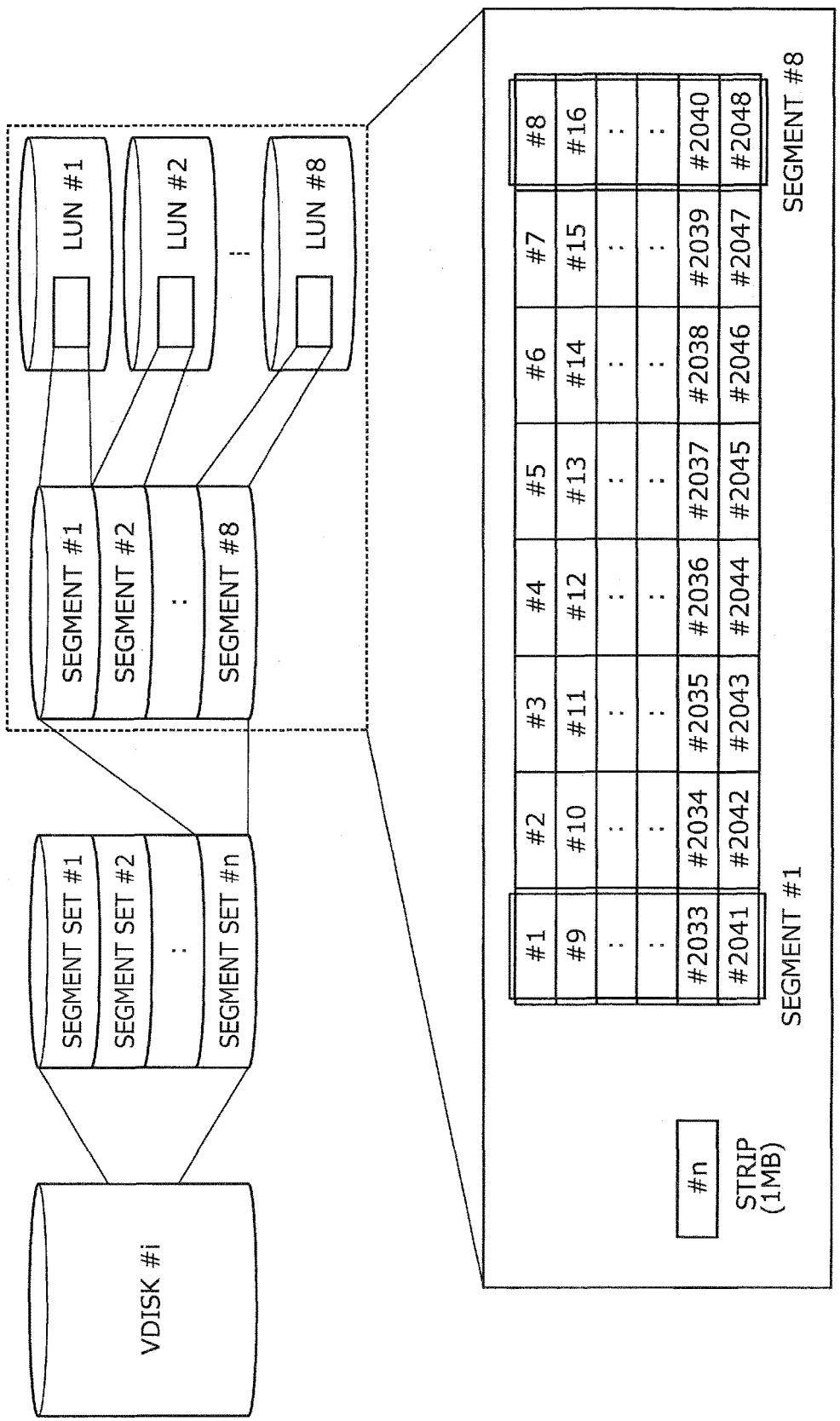
FIG. 10 is an explanatory view of a configuration example of a VDISK.

FIG. 10 is an explanatory view of a configuration example of a VDISK. In FIG. 10, a VDISK #i is an aggregate of segment sets #1 to #n (i: natural number, n: natural number of two or more). Each of the segment sets #1 to #n is an aggregate of eight segments #1 to #8. The capacity of each of the segment sets #1 to #n is 2 gigabyte (GB), for example. The capacity of each of the segments #1 to #8 is 256 megabyte (MB), for example.

Taking the storage system SM depicted in FIG. 9 as an example, the segments #1 to #8 are assigned to the respective LUNs #1 to #8 in the SU #1. User data is recorded in terms of a strip having a fixed length (1 (MB)). This strip is striped by sequentially utilizing the segments #1 to #8.

Figure 11:
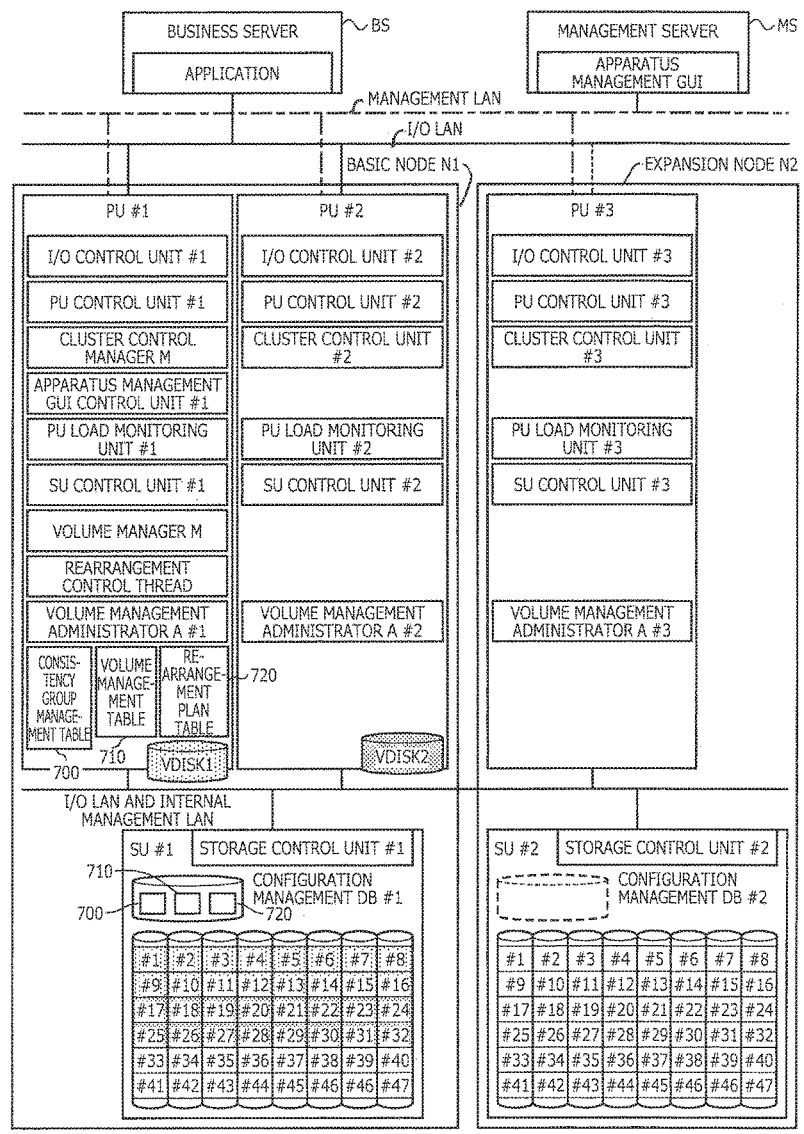
FIG. 11 is an explanatory view of a functional configuration example of a PU according to the example.

FIG. 11 is an explanatory view of a functional configuration example of a PU according to the example. In FIG. 11, the storage system SM includes a basic node N1 and an expansion node N2. FIG. 11 depicts a state immediately after addition of the expansion node N2 to the storage system SM, i.e., a state of the storage system SM immediately after scale-out. The basic node N1 includes the PU #1, the PU #2, and the SU #1. The expansion node N2 includes the PU #3 and the SU #2.

The PUs #1 and #2 of the basic node N1, the PU #3 of the expansion node N2, and the management server MS are connected via a management LAN. The management server MS is a computer used by an administrator of the storage system SM and has an apparatus management graphical user interface (GUI).

The PUs #1 and #2 in the basic node N1, the PU #3 in the expansion node N2, and the business server BS are connected via an I/O LAN. The business server BS is a computer with business applications installed.

The PUs #1, #2, #3 and the SUs #1, #2 are connected via the I/O LAN and an internal management LAN. The SUs #1, #2 have configuration management DBs #1, #2, and storage control units #1, #2. The storage control units #1, #2 are implemented by the execution of a storage control program on the CPU. The storage control program is a program controlling access to STs (storage) in the SUs #1, #2.

The configuration management DBs #1, #2 include a consistency group management table 700, a volume management table 710, and a rearrangement plan table 720. The consistency group management table 700 is information managing the consistency group G (see FIG. 12). The group information described above corresponds to the consistency group management table 700, for example.

The volume management table 710 includes a volume index table 1500 (see FIG. 15), a mirror volume index table 1600 (see FIG. 16), and a volume segment table 1700 (see FIG. 17). The assignment information described above corresponds to the volume management table 710, for example.

The volume index table 1500 is a table managing volumes (VDISKs). The mirror volume index table 1600 is a table managing mirror volumes. The volume segment table 1700 is a table managing segments of volumes. The tables 700, 1500, 1600, and 1700 are correlated by using the volume number as an index.

The rearrangement plan table 720 is a table managing storage apparatuses (SUs), LUN numbers, and rearrangement statuses of planned arrangement destinations after planning where the segments making up a VDISK are arranged. The rearrangement status of a segment already rearranged (or without the need for rearrangement) is set to "rearrangement completed" (or "rearrangement not required"). The rearrangement status of a segment currently being rearranged is set to "under rearrangement", and the rearrangement status of a segment to be rearranged is set to "awaiting rearrangement".

During suspension of rearrangement, the PU #1 retains the rearrangement plan table 720 without deletion thereof. If the rearrangement is terminated, the PU #1 discards the rearrangement plan table 720. If a volume (VDISK) is deleted during the suspension of the rearrangement, the PU #1 deletes a corresponding record from the volume index table 1500 of the volume management table 710 and deletes a corresponding record from the rearrangement plan table 720. The volume management table 710 and the rearrangement plan table 720 will be described in detail with reference to FIGS. 15 to 18.

The PU #1 includes an I/O control unit #1, a PU control unit #1, a cluster control manager M, an apparatus management GUI control unit #1, a PU load monitoring unit #1, an SU control unit #1, a volume manager M, and a volume management administrator A #1. The PU #1 also has the consistency group management table 700, the volume management table 710, and the rearrangement plan table 720.

The PU #1 reads out and uses the consistency group management table 700, the volume management table 710, and the rearrangement plan table 720 from the configuration management DB #1 (or the configuration management DB #2), for example. The creating unit 502 and the communication control unit 503 depicted in FIG. 5 are implemented by the I/O control unit #1, the cluster control manager M, the SU control unit #1, the volume manager M, and the volume management administrator A #1, for example.

The PU #2 includes an I/O control unit #2, a PU control unit #2, a cluster control unit #2, a PU load monitoring unit #2, an SU control unit #2, and a volume management administrator A #2. The PU #3 includes an I/O control unit #3, a PU control unit #3, a cluster control unit #3, a PU load monitoring unit #3, an SU control unit #3, and a volume management administrator A #3.

The I/O control units #1 to #3 receive and process an I/O request from the business server BS. The PU control units #1 to #3 control the PUs #1 to #3. The cluster control manager M clusters PUs with each other. In this example, a cluster is formed by the PU #1, the PU #2, and the PU #3. The cluster control units #2 and #3 recognize the PUs #1 to #3 clustered by the cluster control manager M. Further, the cluster control manager M controls remote copying between storage apparatuses.

The apparatus management GUI control unit #1 determines the state of the storage system SM and creates a new volume according to an instruction from the management server MS. The PU load monitoring units #1 to #3 monitor loads applied to the PUs #1 to #3. The SU control units #1 to #3 control the SUs #1, #2.

The volume manager M controls the volume management administrators A #1 to #3. For example, the volume manager M activates a rearrangement control thread and causes the volume management administrators A #1 to #3 to execute the thread. The volume management administrators A #1 to #3 manage volumes according to the control of the volume manager M.

If the PU #1 goes down in the storage system SM, for example, the PU #2 or the PU #3 takes over the function of the PU #1. For example, the hardware configurations of the business server BS and the management server MS are implemented by a CPU, memory, a magnetic disk drive, a magnetic disk, a display, an interface (I/F), a keyboard, a mouse, etc.

The contents of the consistency group management table 700 will be described.

Figure 12:
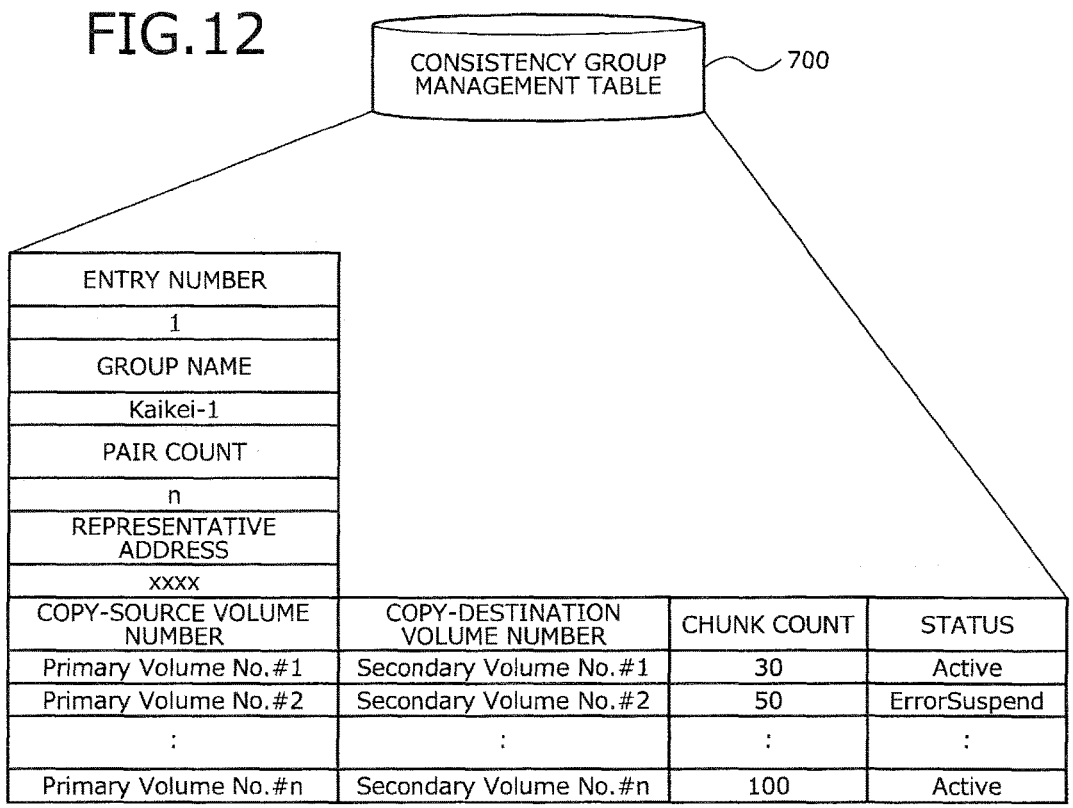
FIG. 12 is an explanatory view of an example of the contents of a consistency group management table 700.

FIG. 12 is an explanatory view of an example of the contents of the consistency group management table 700. In FIG. 12, the consistency group management table 700 indicates an entry number, a group name, a pair count, a representative address, a copy-source volume number, a copy-destination volume number, a chunk count, and a status.

The entry number is an entry number of the consistency group G. The group name is the name of the consistency group G. The pair count is the total number of pairs of the copy-source volumes P (VDISKs) and the copy-destination volumes S (VDISKS) registered in the consistency group G. The representative address is a logical IP address for remote copying assigned to the representative PU in the copy-destination storage apparatus. The representative PU and the representative address can be set arbitrarily.

The copy-source volume number is the identifier of a copy-source volume P. The copy-destination volume number is the identifier of a copy-destination volume S. The chunk count is the number of chunks completely transferred to the copy destination among copy-source data. The status indicates the state of the copy-source volume P and the copy-destination volume S. For example, the status is set to a state such as Active, Reserved, Halt, Suspend, and Error-Suspend.

Active is a state indicating that remote copying is being performed. Reserved is a state indicating that a volume is reserved for remote copying. Halt is a state indicating that remote copying is suspended because a line abnormality has occurred due to an unexpected incident, etc. Suspend is a state in which remote copying is intentionally suspended. ErrorSuspend is a state indicating that copy-source data is corrupt.

According to the consistency group management table 700, for example, the group name "Kaikei-1", the pair count "n", and the representative address "xxxx" of the consistency group G1 can be identified. A correspondence relationship can be identified between the copy-source volume P and the copy-destination volume S belonging to the consistency group G1.

An update example of the consistency group management table 700 will be described. Description will be made of the update example of the consistency group management table 700 when the PU #1 accepts a group creation instruction for the consistency group G1 of the group name "Kaikei-1". It is assumed that the volumes belonging to the consistency group G1 are volumes P1, P2, S1, and S2.

FIGS. 13 and 14 are explanatory views of an update example of the consistency group management table 700. In (i) depicted in FIG. 13, a consistency group G is not yet set in the consistency group management table 700.

In (ii) depicted in FIG. 13, the PU #1 accepts the group creation instruction for the consistency group G1 and sets the entry number "1", the group name "Kaikei-1", the pair count "0", and the representative address "xxxx" in the consistency group management table 700. The group name "Kaikei-1" and the representative address "xxxx" are specified by a user of the management server MS, for example. For the representative address "xxxx", the PU #1 may make an inquiry to the remote site (the copy-destination storage system SM).

In (iii) depicted in FIG. 13, the PU #1 registers into the consistency group management table 700, a paired copy-source volume P1 and copy-destination volume S1 for which remote copying is performed. The PU #1 increments the pair count and sets the status to "Reserved". The chunk count is "0" at this time point.

In (iv) depicted in FIG. 14, the PU #1 registers into the consistency group management table 700, a paired copy-source volume P2 and copy-destination volume S2 for which remote copying is performed. The PU #1 increments the pair count and sets the status to "Reserved". The chunk count is "0" at this time point.

In (v) depicted in FIG. 14, when a session is established between the copy-source volume P and the copy-destination volume S, the PU #1 sets the status to "Active".

In (vi) depicted in FIG. 14, each time the data transfer to the copy-destination storage apparatus is completed in units of a chunk, the PU #1 updates the chunk count.

The contents of the volume management table 710 will be described with reference to FIGS. 15 to 17. The configuration information described above corresponds to the volume management table 710, for example.

FIG. 15 is an explanatory view of an example of the contents of the volume index table 1500. In FIG. 15, the volume index table 1500 has fields for a volume number, a volume name, an operating PU number, a volume attribute, a volume size, a volume state, and a rearrangement status. By setting information in the fields, volume information 1500-1 to 1500-n is stored as records.

The volume number is an identifier of a VDISK. The volume name is the name of the VDISK. The operating PU number is the identifier of the PU in which the VDISK is operating. The volume attribute is an attribute of the VDISK. The volume size is the size (GB) of the VDISK recognized by the business server BS. The volume state indicates whether the VDISK is accessible. The rearrangement status is the rearrangement status of the VDISK.

For example, the volume information 1500-1 indicates the volume name "Vdisk1", the operating PU number "1", the volume attribute "thin provisioning volume", the volume size "500", the volume state "normal", and the rearrangement status "under rearrangement" of a VDISK 1. The volume information with the volume name of "NULL" as in the volume information 1500-n is information of an unprepared VDISK. A value of "−1", as in the operating PU number of volume number information 1500-n of an unprepared VDISK, indicates an invalid value.

Figure 16:
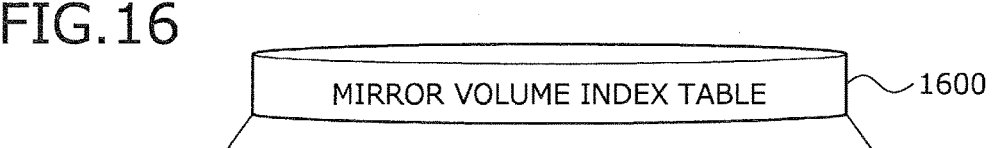
FIG. 16 is an explanatory view of an example of the contents of a mirror volume index table 1600.

FIG. 16 is an explanatory view of an example of the contents of the mirror volume index table 1600. In FIG. 16, the mirror volume index table 1600 has fields for a volume number, a mirror count, a mirror volume number 1, and a mirror volume number 2. By setting information in the fields, mirror volume information (e.g., mirror volume information 1600-1, 1600-2) is stored as records.

The volume number is an identifier of a mirror volume. The mirror count is the number of mirrored volumes for mirroring. The mirror volume numbers 1, 2 are identifiers of VDISKs that are entities of mirror volumes. For example, the mirror volume information 1600-1 indicates the mirror count "2", the mirror volume number 1 "127", and the mirror volume number 2 "128" of a VDISK 2.

FIG. 17 is an explanatory view of an example of the contents of the volume segment table 1700. In FIG. 17, the volume segment table 1700 has fields for a volume number, a segment set number, a segment number, a storage apparatus, a LUN number, a segment state, and rearrangement status. By setting information in the fields, segment information (e.g., segment information 1700-1, 1200-2) is stored as records.

The volume number is the identifier of a VDISK. The segment set number is the identifier of a segment set making up the VDISK. The segment number is the identifier of a segment making up the segment set. The storage apparatus is the identifier of the SU to which the segment belongs. The LUN number is the identifier of the LUN to which the segment is assigned. The segment state indicates whether the segment is accessible. The rearrangement status indicates the rearrangement status of the segment.

For example, the segment information 1700-1 indicates the storage apparatus "1", the LUN number "1", the segment state "enabled" or "VALID", and the rearrangement status "blank (empty)" of a segment 1 of a segment set 1 of the VDISK 1.

The contents of the rearrangement plan table 720 will be described with reference to FIG. 18.

FIG. 18 is an explanatory view of an example of the contents of the rearrangement plan table 720. In FIG. 18, the rearrangement plan table 720 has fields for a volume number, a segment set number, a segment number, a current storage apparatus, a current LUN number, a rearranged storage apparatus, a rearranged LUN number, and a rearrangement status. By setting information in the fields, rearrangement plan information (e.g., rearrangement plan information 1800-1 to 1800-5) is stored as records.

The volume number is the identifier of a VDISK. The segment set number is the identifier of a segment set making up the VDISK. The segment number is the identifier of a segment making up the segment set. The current storage apparatus is the identifier of the SU to which the segment belongs before arrangement. The current LUN number is the identifier of the LUN to which the segment is assigned before arrangement. The rearranged storage apparatus is the identifier of the SU to which the segment belongs after arrangement. The rearranged LUN number is the identifier of the LUN to which the segment is assigned after arrangement. The rearrangement status indicates the rearrangement status of the segment.

For example, the rearrangement plan information 1800-1 indicates the current storage apparatus "1", the current LUN number "1", the rearranged storage apparatus "1", the rearranged LUN number "1", and the rearrangement status "rearrangement not required" of the segment 1 of the segment set 1 of the VDISK 1.

Description will be made of a determination example of bias of assignment quantities q of segments of the LUNs included in the storage system SM. A state with bias in the assignment quantities q is the state in which the assignment state of segments is biased to the extent that rearrangement is desirable for the assigned segments. The PU #1 monitors the assignment quantities q of segments of the LUNs in the storage system SM and, if it is detected that "bias exists", the PU #1 uses the apparatus management GUI control unit to make a notification of the occurrence of bias. The monitoring is triggered, for example, when a system configuration is changed according to addition of a node, when regular monitoring time comes, or when a load amount of an SU increases.

For example, the PU #1 refers to the volume management table 710 to calculate the assignment quantities q of segments of the LUNs in the storage system SM. The PU #1 identifies a maximum assignment quantity $q_{max}$ of the LUN having the largest assignment quantity q of segments and a minimum assignment quantity $q_{min}$ of the LUN having the smallest assignment quantity q of segments among all the LUNs in the storage system SM.

If a difference d of the maximum assignment quantity $q_{max}$ and the minimum assignment quantity $q_{min}$ is greater than or equal to a predetermined proportion α of the maximum assignment quantity $q_{max}$ and the difference d is greater than or equal to a predetermined size β, the PU #1 determines that bias exists in the assignment quantities q of segments of the LUNs in the storage system SM. The predetermined proportion α and size β can be set arbitrarily. For example, the proportion α is set to a value of about 5 to 10 [%]. For example, the size β is set to a value of about 64 [GB] or 128 [GB].

For example, the assignment quantity q of segments of the LUNs can be obtained from the number of segments of volumes assigned to the LUNs. For example, if a capacity of a segment is 256 [MB] and the number of segments assigned to a given LUN is "2", the assignment quantity q of this LUN is 512 [MB]. The segment is a memory area that is a unit of management prescribed by a predetermined capacity and is managed by positional information such as a record reproduction instruction logical block address (LBA) from a host to a volume.

A rearrangement plan of volumes (VDISKs) will be described. The PU #1 develops a rearrangement plan from the assignment quantities q of segments of the LUNs making up SUs. Therefore, balanced rearrangement can be performed even if the load capacity of an SU to be added is different from the load capacity of an existing SU.

FIG. 19 is an explanatory view of an example of a volume rearrangement plan. As depicted for Item 1 in FIG. 19, it is assumed that an expansion set (SU #2) of 8.4 [TB] is added to a basic set (SU #1) of 8.4 [TB] in the consistency group G1. In this case, the PU #1 achieves distributed arrangement such that the assignment quantities q of segments of the LUNs are equalized between the SU #1 and the SU #2.

As depicted for Item 2 in FIG. 19, it is assumed that an expansion set (SU #2) of 16.8 [TB] is added to a basic set (SU #1) of 8.4 [TB]. In this case, the PU #1 achieves distributed arrangement such that the assignment quantities q of segments of the LUNs are equalized between the SU #1 and the SU #2.

As depicted for Item 3 in FIG. 19, it is assumed that an expansion set (SU #3) of 16.8 [TB] is added to a basic set (SU #1) of 8.4 [TB] and an expansion set (SU #2) of 8.4 [TB]. In this case, the PU #1 achieves distributed arrangement such that the assignment quantities q of segments of the LUNs are equalized among the SU #1, the SU #2, and the SU #3. Here, although an addition of one expansion set including a PU and SU has been described, an SU alone may be added as an expansion set.

With reference to FIG. 20, description will be made of how existing volumes are rearranged for the SU #2 added by scale-out. Although a case of automatically activating the rearrangement process after the scale-out will be described, a rearrangement instruction can be made manually from a GUI screen of the management server MS.

FIG. 20 is an explanatory view (part one) of a rearrangement example of volumes. In FIG. 20, segments A0 to A31 making up a volume 1 and segments B0 to B15 making up a volume 2 are arranged in the SU #1 (in FIG. 20, before rearrangement). In FIG. 20, columns in the SUs #1, #2 represent LUNs in the SUs #1, #2.

First, the PU #1 creates the rearrangement plan table 720 such that the assignment quantities q of segments of the LUNs are equalized between the SU #1 and the SU #2 (in FIG. 20, rearrangement draft). The arrangement positions of the segments are provisional.

The PU #1 refers to the rearrangement plan table 720 to rearrange the segments A0 to A31 of the volume 1. In this example, the segments A8 to A15 and A24 to A31 of the volume 1 are rearranged in the SU #2 (in FIG. 20, under rearrangement).

The PU #1 refers to the rearrangement plan table 720 to rearrange the segments B0 to B15 of the volume 2. In this example, the segments B8 to B15 of the volume 2 are rearranged in the SU #2 (in FIG. 20, after rearrangement). As a result, the SU #1 and the SU #2 are equalized in terms of physical capacity.

Although the usage status of the LUNs appears discontinuous, if the volumes are made up of wide-striped segments, no problem occurs in terms of performance. In other words, the discontinuity of the usage status of the LUNs has no effect on performance. Therefore, in the sense of avoiding unnecessary migration processing, the segments A16 to A23 and the segments B0 to B7 should not be migrated so that wasteful processing can be reduced for the apparatus.

The storage system SM has rearrangement process suspension and resume functions for a case when it is desired to temporarily stop the rearrangement process because of maintenance, inspection, etc. of the PUs and SUs. The storage system SM has a rearrangement process termination function. However, if a rearrangement process is terminated, the planned rearrangement plan is discarded and when the rearrangement is performed again, processes are re-executed to determine bias of the assignment quantities q of segments of the LUNs in the storage system SM as well as to create a new rearrangement plan table.

On the other hand, if the suspension function is utilized, the PU #1 retains the rearrangement plan developed for rearrangement of volumes during suspension of the rearrangement without discarding the plan. Upon receiving a resume instruction, the PU #1 refers to the volume management table 710 and the rearrangement plan table 720 and continues the rearrangement process from an entry to be resumed. This enables suspension during rearrangement and resumption from suspension.

With reference to FIGS. 21 to 24, update examples of the tables 710, 720 will be described.

Figure 21:
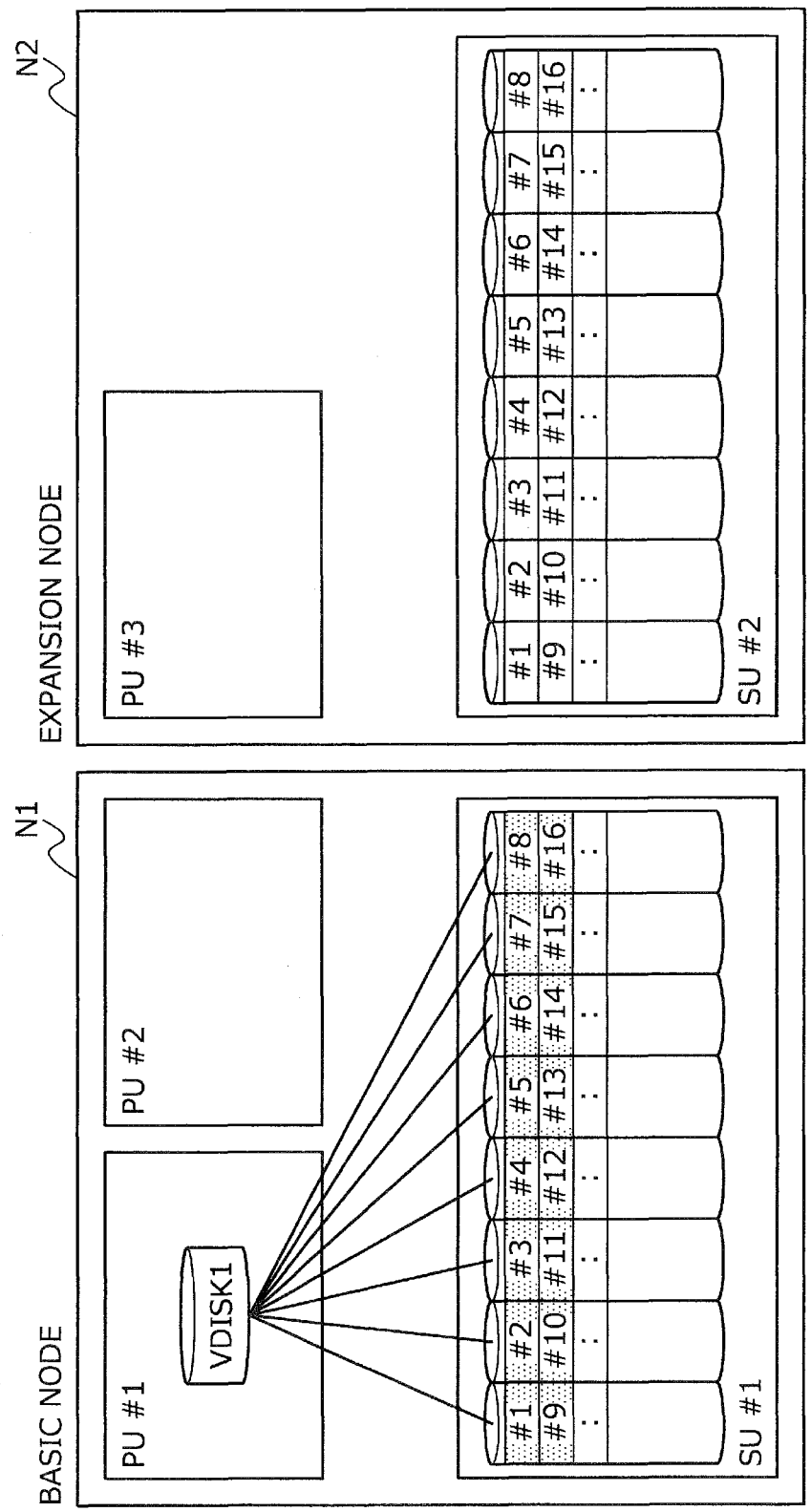
FIG. 21 is an explanatory view of an arrangement example of volumes.

FIG. 21 is an explanatory view of an arrangement example of volumes. In FIG. 21, the segments #1 to #16 making up the VDISK 1 are disposed in the SU #1. The expansion node N2 having a set of the PU #3 and the SU #2 is added to the basic node N1. In this case, bias occurs in the assignment quantities q of segments of the LUNs included in the storage system SM and therefore, the rearrangement process of the VDISK 1 is executed.

FIG. 22 is an explanatory view of an update example of the volume index table 1500. In FIG. 22, if the expansion node N2 is added to the basic node N1, the rearrangement status of volume information 2200-1 in the volume index table 1500 is updated from "awaiting rearrangement" to "under rearrangement".

FIG. 23 is an explanatory view of an update example of the volume segment table 1700. In (23-1) of FIG. 23, the volume segment table 1700 stores segment information of the VDISK 1 of the volume number "1". Eight segments making up a segment set are basically arranged in eight different LUNs in a consecutive manner (e.g., a solid line frame in FIG. 23).

However, if an already created volume exists before creating the VDISK 1, LUNs may be assigned to the VDISK 1 at the timing of deletion of LUNs assigned to the volume. In this case, if sequentially numbered LUNs are not available, LUNs for arranging segments making up a segment set may not be equalized (e.g., a dashed or dot-line frame in FIG. 23).

In (23-2) of FIG. 23, when the rearrangement plan table 720 (see FIG. 24 described later) is created, the volume manager M of the PU #1 sets the rearrangement status in the volume segment table 1700 to "under rearrangement". The volume manager M refers to the rearrangement plan table 720 to generate a rearrangement control thread for each PU and performs rearrangement for the segments having the rearrangement status set to "awaiting rearrangement".

The rearrangement control thread for each PU instructs the volume management administrator A to execute a copy process to rearrange the segments to be rearranged. When copy completion is returned from the volume management administrator A to the rearrangement control thread, the rearrangement status of the rearrangement plan table 720 is changed to "rearrangement completed" and the rearrangement status of the volume segment table 1700 is changed to "blank".

Figure 24:
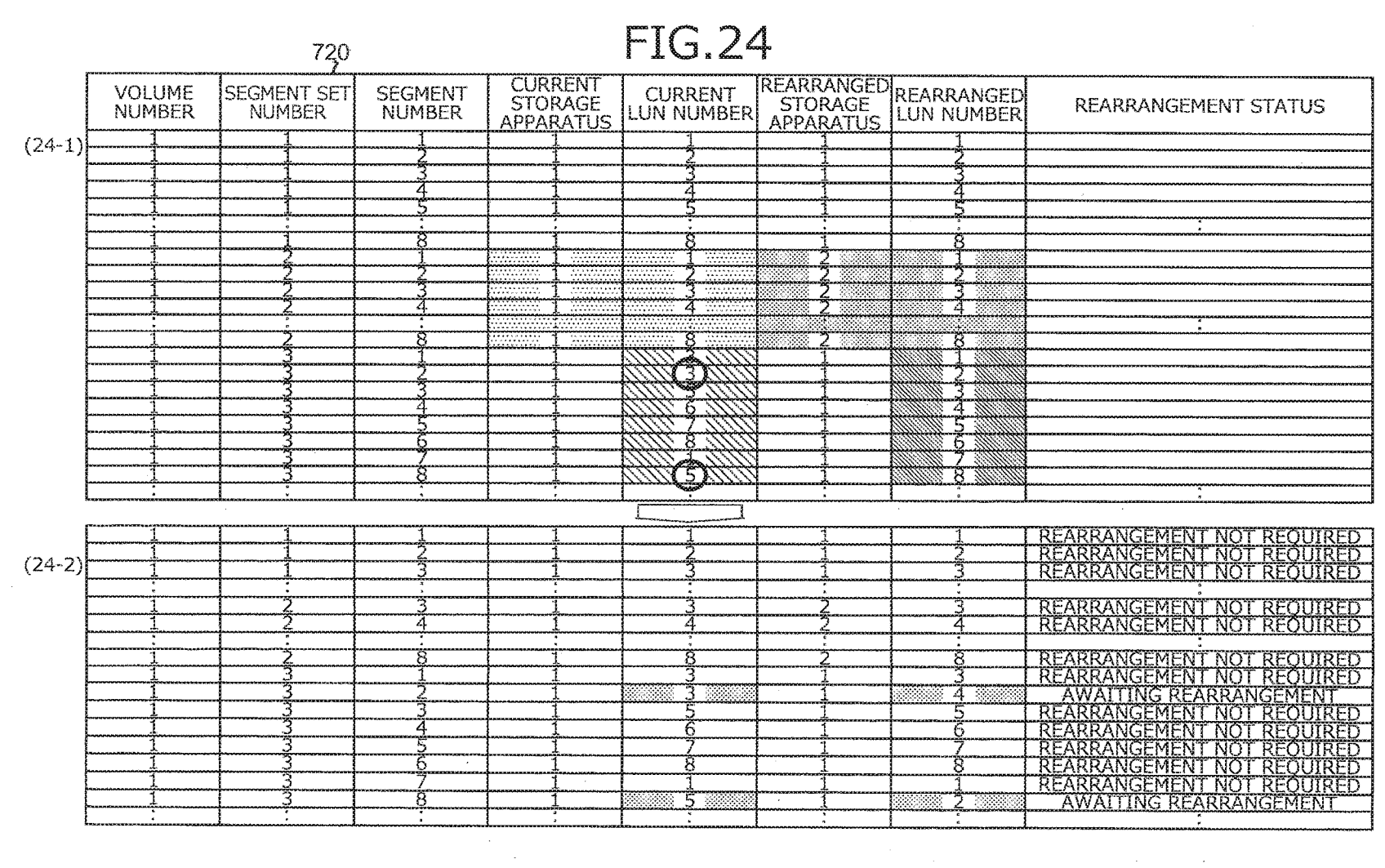

FIG. 24 is an explanatory view of an update example of the rearrangement plan table 720. In (24-1) of FIG. 24, the PU #1 performs assignment on the basis of a segment set of the VDISK 1 and assigns the segments. The PU #1 also plans the assignment in terms of the LUN numbers such that consecutive LUNs are utilized. For example, the PU #1 develops a plan such that even segments are assigned to consecutive LUNs of the SU #2. The PU #1 develops a plan such that odd segments are assigned to consecutive LUNs of the SU #1. In (24-1) of FIG. 24, for each volume of "SEGMENT SET NUMBER"=3 which is an odd segment, "REARRANGED STORAGE APPARATUS"=1 is planned to be assigned and "REARRANGED LUN NUMBER"=1 to 8 is planned to be assigned.

In (24-2) of FIG. 24, after developing the rearrangement plan as described above, the PU #1 revises the rearrangement plan such that copy processes for data migration due to the rearrangement are reduced. For example, the PU #1 compares for each segment set, the current state (current storage apparatuses and current LUN numbers) with the state after rearrangement (rearranged storage apparatuses and rearranged LUN numbers).

For example, with regard to the segment set number 3, none of the current LUN numbers are identical to the rearranged LUN numbers and, with regard to the current LUN numbers, the segments are assigned to different LUNs with the exception of two pairs of segments ("SEGMENT NUMBER"=1 and 2 as well as "SEGMENT NUMBER"=3 and 8) that are assigned to the same LUN numbers (3 and 5, respectively). Therefore, the PU #1 revises the plan such that only the two segments assigned to the same LUNs are assigned to other LUNs (it is determined that although the LUN numbers are not in order of segment, the performance is not affected if the segments are assigned to different LUNs). "CURRENT LUN NUMBER" for "SEGMENT NUMBER"=2 in "SEGMENT SET NUMBER"=3 is 3. "CURRENT LUN NUMBER"=3 is also assigned to "SEGMENT NUMBER"=1 in "SEGMENT SET NUMBER"=3. Thus, "REARRANGED LUN NUMBER"=4, which is not currently being used, is planned to be assigned to "SEGMENT NUMBER"=2 in "SEGMENT SET NUMBER"=3 (See (24-2) of FIG. 24). "CURRENT LUN NUMBER" for "SEGMENT NUMBER"=8 in "SEGMENT SET NUMBER"=3 is 5. "CURRENT LUN NUMBER"=5 is also assigned to "SEGMENT NUMBER"=3 in "SEGMENT SET NUMBER"=3. Thus, "REARRANGED LUN NUMBER"=2, which is not currently being used, is planned to be assigned to "SEGMENT NUMBER"=8 in "SEGMENT SET NUMBER"=3 (See (24-2) of FIG. 24). Duplicating current LUN numbers 3 and 5 are emphasized.

For the segments that are to be rearranged, the PU #1 sets the rearrangement status to "awaiting rearrangement" and sets the rearrangement status in the volume segment table 1700 to "under rearrangement". For the segments without the need for rearrangement, the PU #1 sets the rearrangement status of the rearrangement plan table 720 to "rearrangement not required".

A rearrangement plan for reducing copy processes for segment migration due to rearrangement in the same SU will be described. For example, a rearrangement plan in the same SU is created after the development of a rearrangement plan between SUs for equalizing the assignment quantities q of segments of the LUNs between SUs.

Figure 25:
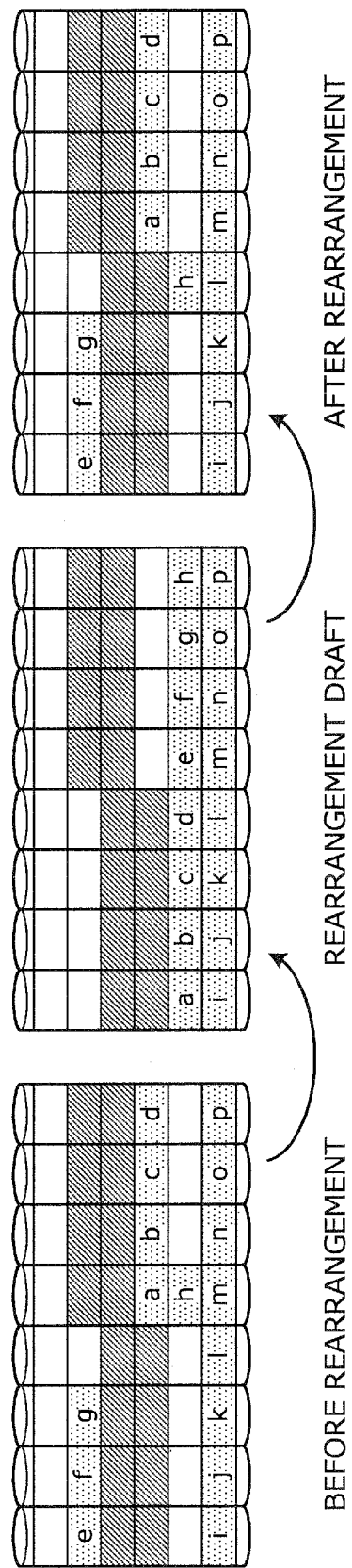
FIG. 25 is an explanatory view (part two) of a rearrangement example of volumes.
Figure 26:
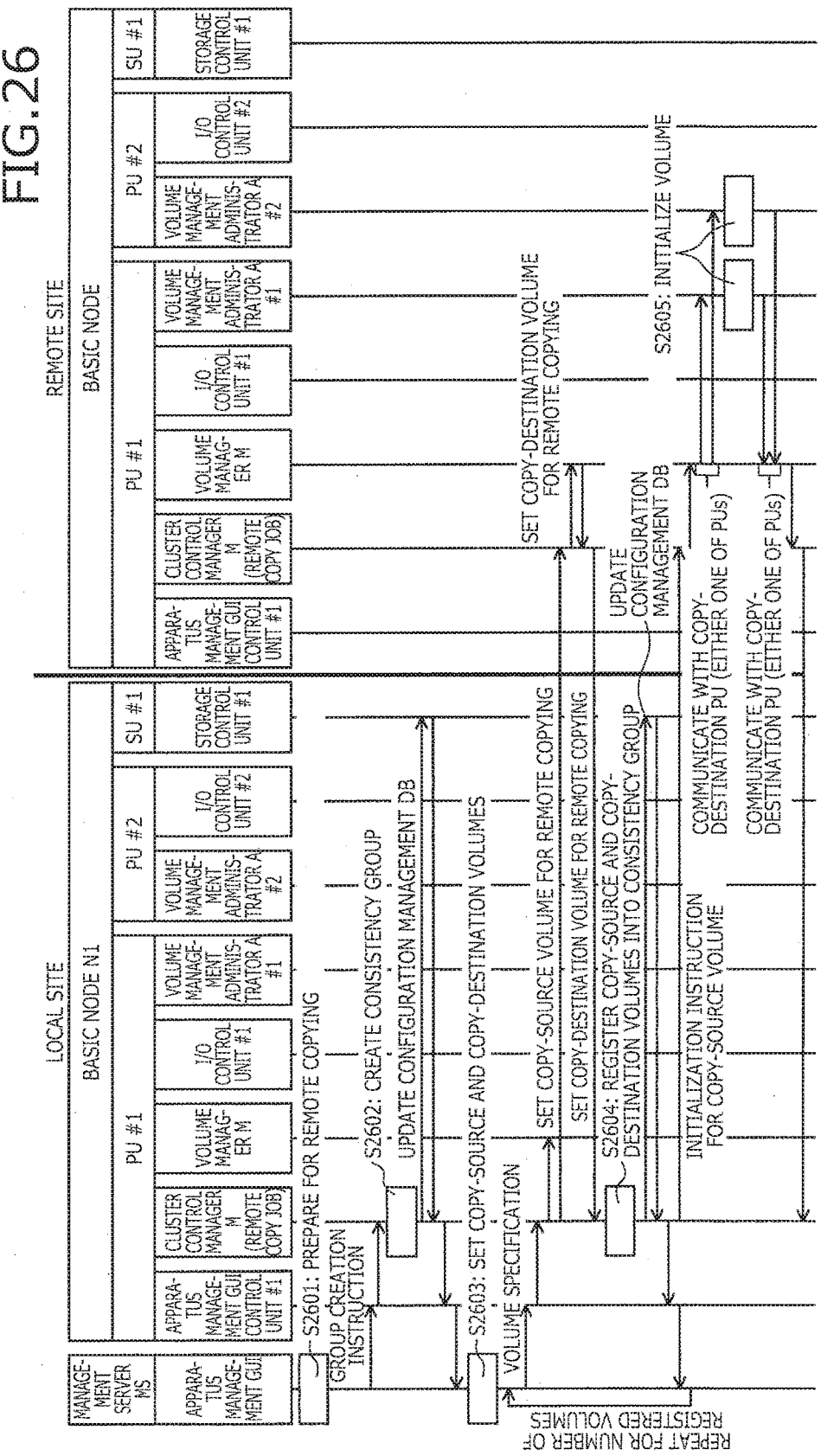
FIGS. 26, 27, 28, and 29 are sequence diagrams of an example of a remote copying process procedure between storage systems SM.

FIG. 25 is an explanatory view (part two) of a rearrangement example of volumes. In FIG. 25, it is assumed that a segment set made up of segments a to p is disposed in a given SU as depicted in "before rearrangement". In this case, for example, the PU #1 can arrange the segments a to h in sequence by utilizing unused areas of segments (in FIG. 25, white rectangles) and segments becoming available after segment migration. Black or shaded rectangles in FIG. 25 are areas of segments being used.

However, since the segments a to d and the segments e to g are already arranged in RAID groups different from each other, sufficient improvement can be made in terms of IO access performance by migrating only the segment h to another RAID group. Therefore, the PU #1 develops the rearrangement plan such that only the segment h is migrated.

As a result, as depicted in "after rearrangement", only the segment h is migrated to another LUN to equalize the segments among the LUNs. As described above, by developing the rearrangement plan such that copy processes for data migration due to the rearrangement are reduced in the same SU, the access performance can be improved while extra segment migration is suppressed. Accesses between PUs and SUs can also be reduced for rearrangement.

An example of a volume rearrangement process will be described. The PUs control the rearrangement process such that no trouble occurs with business operation consequent to the effects of the usage of internal line bandwidth and the CPU loads of the PUs due to segment migration caused by the rearrangement process.

For example, a PU (e.g., the PU #1) determines whether the number of accesses per second (IOPS: input output per second) by the business server BS reaches the maximum IOPS that can be processed by the PU. If the IOPS from the business server BS reaches the maximum IOPS, the PU gives priority to business IO without executing the rearrangement process.

On the other hand, if the IOPS from the business server BS does not reach the maximum IOPS, the PU executes the rearrangement process by utilizing available IOPS. The available IOPS is obtained by subtracting the current IOPS from the maximum IOPS. As a result, the rearrangement of volumes can be performed without interrupting business while the effect on business is minimized.

However, because of increases in the bandwidth utilization between a PU and SUs and the CPU load of a PU due to execution of the rearrangement process, it is conceivable that the IOPS of the business IO is reduced. Therefore, in addition to considering the difference between the current IOPS and the maximum IOPS of the PU, if a reduction rate of the current IOPS exceeds a predetermined proportion (e.g., 15[%]) due to the rearrangement process, the PU may cull the rearrangement process so that the IOPS of the business can be maintained.

For example, if the current IOPS is greater than or equal to 95% of the maximum IOPS, the PU may introduce a sleep (e.g., wait about one to five [seconds]) during the process so as to suppress the rearrangement process as described below. Here, x and y denote the maximum IOPS of the PU and the current IOPS, respectively. The maximum IOPS of the PU is set in advance.

$0.95x \leq y$ sleep the rearrangement process
$0.95x > y$ operate the rearrangement process If "0.85 (previous y)$\leq$(current y)" is satisfied consequent to the operation of rearrangement, the PU introduces a sleep during the rearrangement process to suppress the effect on business, for example. It is noted that "previous y" is the current IOPS immediately before the rearrangement process, for example.

Various process procedures of the storage system SM will be described. First, a remote copying process procedure of the storage system SM will be described. The remote copying between a basic node N1 (hereinafter referred to as a "local site") of the storage system SM and a basic node N1 (hereinafter referred to as a "remote site") of another storage system SM is taken as an example.

FIGS. 26, 27, 28, and 29 are sequence diagrams of an example of a remote copying process procedure between storage systems SM. In the sequence diagram of FIG. 26, an apparatus management GUI of the management server MS prepares for remote copying according to user operational input (step S2601). For example, the apparatus management GUI accepts specification of a group name of a consistency group G, a pair count, a representative address, and a PU number to which the representative address is assigned. The apparatus management GUI gives notification of a creation instruction for the consistency group G to an apparatus management GUI managing unit #1 of the PU #1 of the local site.

When accepting the group creation instruction from the apparatus management GUI of the management server MS, the cluster control manager M of the PU #1 of the local site creates the consistency group G (step S2602). For example, the cluster control manager M updates the consistency group management table 700 in the configuration management DB #1 (see, e.g., (ii) of FIG. 13).

The apparatus management GUI of the management server MS sets a paired copy-source volume P and copy-destination volume S belonging to the consistency group G according to user operational input (step S2603). For example, the apparatus management GUI accepts the volume number of the copy-source volume P and the volume number of the copy-destination volume S.

The cluster control manager M of the PU #1 of the local site registers the copy-source volume P and the copy-destination volume S into the consistency group G (step S2604). For example, the cluster control manager M of the PU #1 of the local site defines the copy-source volume P as a remote copying object and communicates with the cluster control manager M of the PU #1 of the remote site to define the copy-destination volume S as a remote copying object. The cluster control manager M of the PU #1 of the local site updates the consistency group management table 700 in the configuration management DB #1 (see, e.g., (iii) of FIG. 13). Steps S2603 and S2604 are repeated by the number of pairs registered to the consistency group G.

The volume manager M of the PU #1 of the remote site initializes the copy-destination volume S according to an initialization instruction for the cluster control manager M of the PU #1 of the local site (step S2605). The PU #1 of the remote site communicates with a copy-destination PU (either one of the PUs #1, #2) in the local site.

Figure 27:
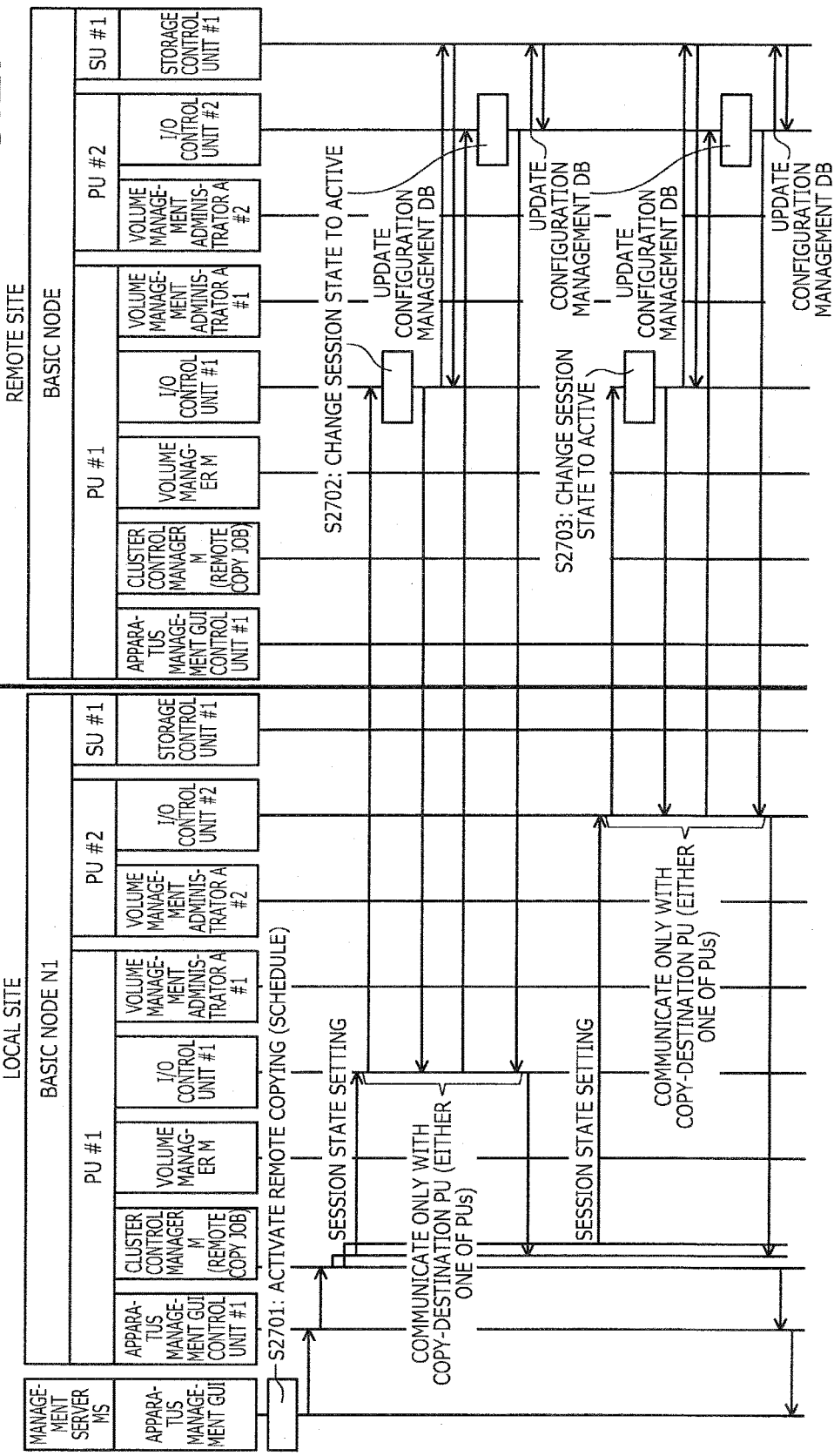

In the sequence diagram of FIG. 27, the apparatus management GUI of the management server MS activates the remote copying of the consistency group G according to user operational input (step S2701). The I/O control unit #1 of the PU #1 of the local site changes the session state (status) of the copy-source volume P and the copy-destination volume S to Active according to a session state setting instruction for the cluster control manager M of the PU #1 of the local site (step S2702). In this case, the PU #1 of the local site communicates only with the copy-destination PU (either one of the PUs #1, #2) in the remote site.

The I/O control unit #1 of the PU #1 (or the I/O control unit #2 of the PU #2) of the remote site updates the consistency group management table 700 in the configuration management DB #1 (see, e.g., (v) of FIG. 13). Similarly, the I/O control unit #1 of the PU #1 of the local site updates the consistency group management table 700 in the configuration management DB #1 (see, e.g., (v) of FIG. 13).

The I/O control unit #2 of the PU #2 of the local site changes the session state of the copy-source volume P and the copy-destination volume S to Active according to a session state setting instruction for the cluster control manager M of the PU #1 of the local site (step S2703). In this case, the PU #2 of the local site communicates only with the copy-destination PU (either one of the PUs #1, #2) in the remote site.

The I/O control unit #1 of the PU #1 (or the I/O control unit #2 of the PU #2) of the remote site updates the consistency group management table 700 in the configuration management DB #1 (see, e.g., (v) of FIG. 13). Similarly, the I/O control unit #2 of the PU #2 of the local site updates the consistency group management table 700 in the configuration management DB #1 (see, e.g., (v) of FIG. 13).

Figure 28:
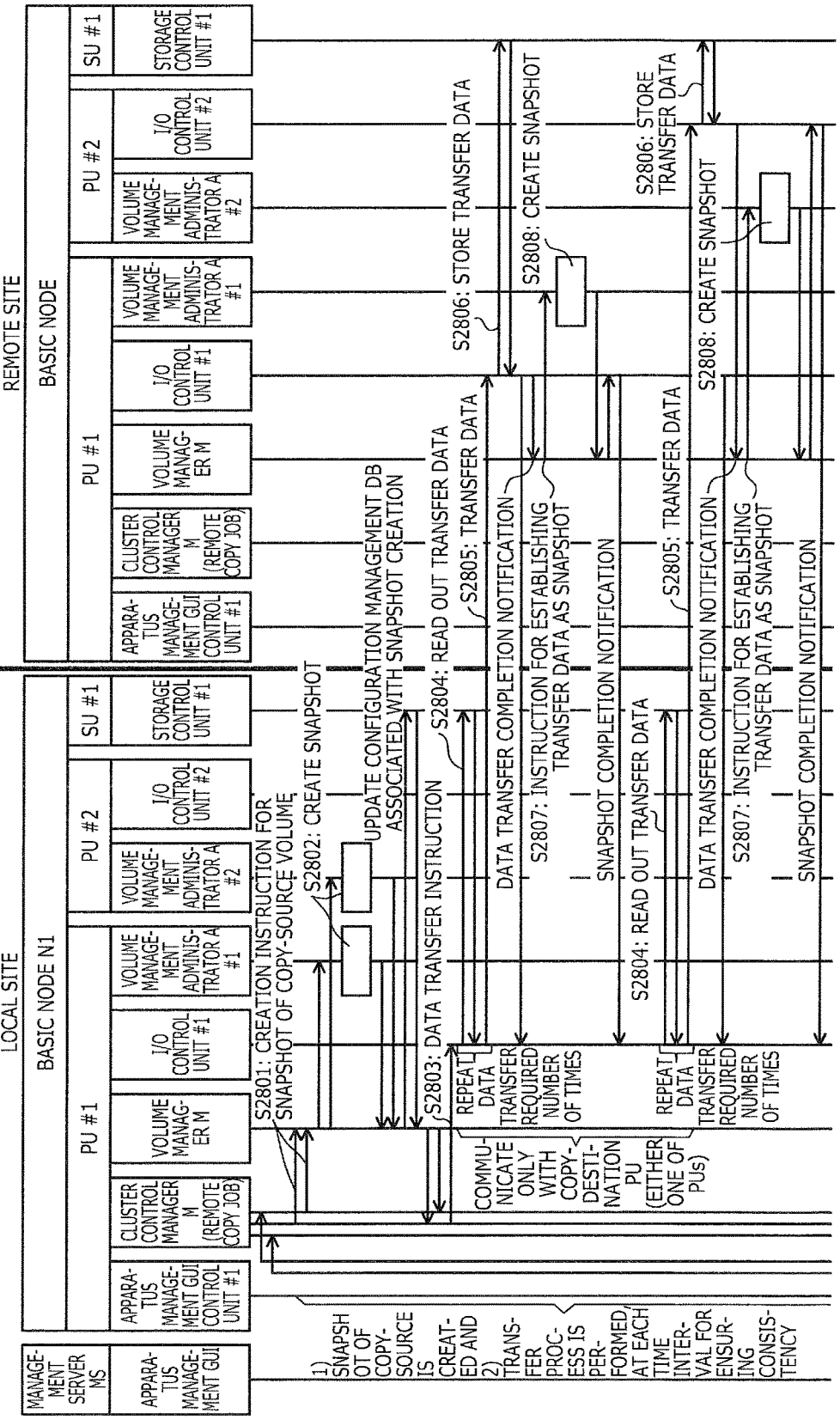

In the sequence diagram of FIG. 28, the cluster control manager M of the PU #1 of the local site gives notification of a creation instruction for a snapshot of the copy-source volume P to the volume manager M of the PU #1 of the local site (step S2801). As a result, the volume manager M of the PU #1 of the local site refers to the consistency group management table 700 and gives notification of the creation instruction for a snapshot of the copy-source volume P to the volume management administrators A #1, #2 of the PUs #1, #2 of the local site.

The volume management administrators A #1, #2 of the PUs #1, #2 of the local site create the snapshot of the copy-source volume P (step S2802). As a result, the volume manager M of the PU #1 of the local site updates the configuration management DB #1 in association with creation of the snapshot.

The cluster control manager M of the PU #1 of the local site gives notification of a data transfer process instruction for the copy-source volume P to the I/O control unit #1 of the PU #1 of the local site (step S2803). The data transfer process instruction of the first time (time t1) is an instruction for transferring to the copy-destination PU (the PU #1 or the PU #2 of the remote site), the data of the snapshot of the copy-source volume P for time t1. The data transfer process instruction of the second time or later (time tp) is an instruction for transferring to the copy-destination PU (the PU #1 or the PU #2 of the remote site), the difference data of the copy-source volume P for time tp, i.e., the data of the difference storage area A(t(p−1)) of the volume P.

The I/O control unit #1 of the PU #1 of the local site reads out the transfer data from the SU #1 according to the data transfer process instruction (step S2804) and transfers the transfer data to the copy-destination PU (the PU #1 or the PU #2 of the remote site) (step S2805). Steps S2804 and S2805 are repeated for each transfer data.

In response to receipt of the transfer data from the I/O control unit #1 of the PU #1 of the local site, the I/O control unit #1 of the PU #1 (or the I/O control unit #2 of the PU #2) of the remote site stores the received transfer data into the SU #1 (step S2806).

For example, at the time of the data transfer process of the first time (time t1), the I/O control unit #1 of the PU #1 (or the I/O control unit #2 of the PU #2) of the remote site stores the data of the snapshot of the copy-source volume P for time t1 into the copy-destination volume S. At the time of the data transfer process of the second time or later (time tp), the I/O control unit #1 of the PU #1 (or the I/O control unit #2 of the PU #2) of the remote site stores the difference data of the copy-source volume P for time tp into the difference storage area A'(t(p−1)) of the volume S.

In response to acceptance of data transfer completion notification from the I/O control unit #1 (or the I/O control unit #2 of the PU #2), the volume manager M of the PU #1 of the remote site gives notification of an instruction for establishing transfer data as a snapshot to the volume management administrator A #1 of the PU #1 (or the volume management administrator A #2 of the PU #2) of the remote site (step S2807).

The volume management administrator A #1 of the PU #1 (or the volume management administrator A #2 of the PU #2) of the remote site creates a snapshot of the copy-destination volume S (step S2808).

Figure 29:
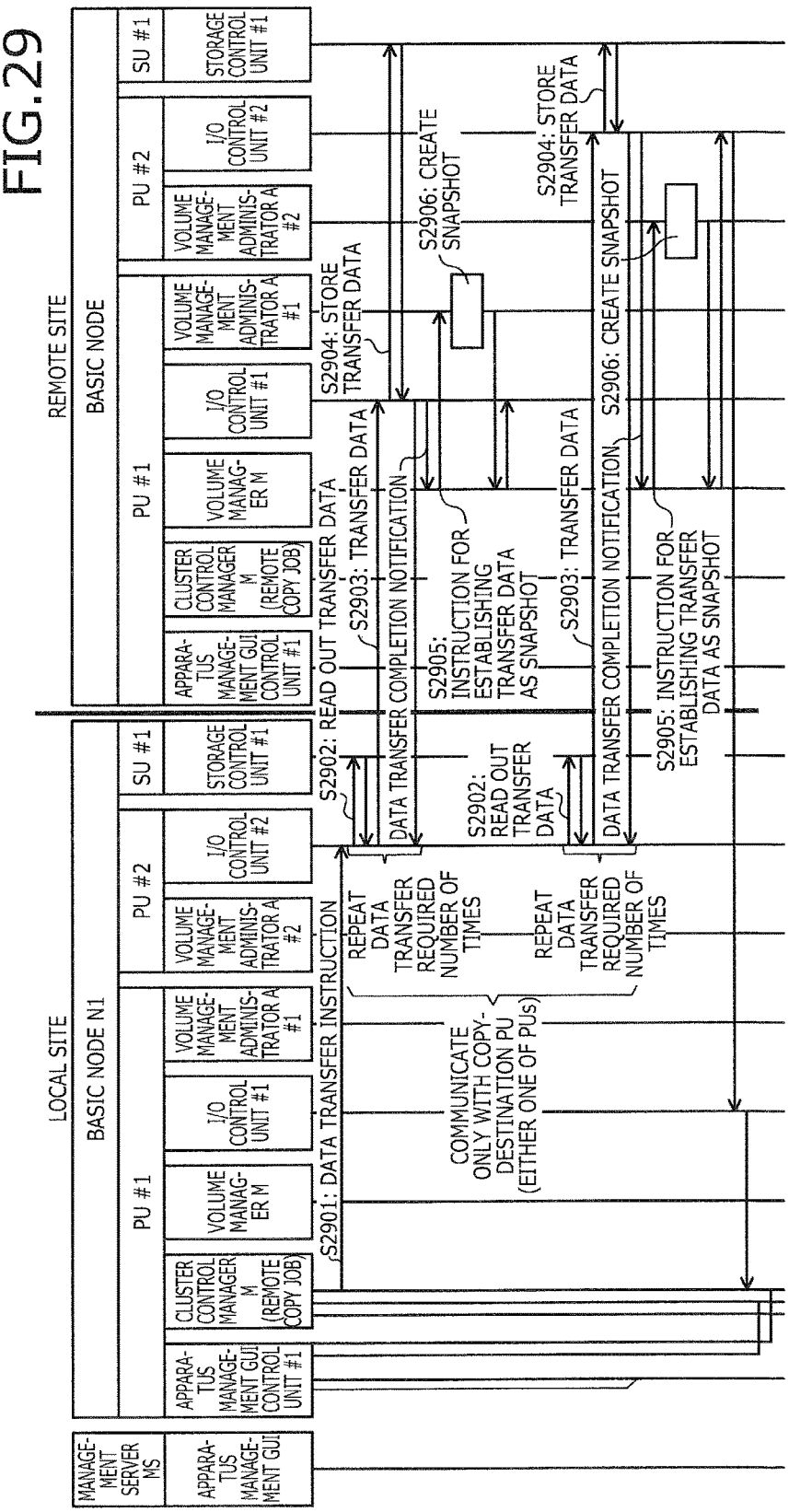

In the sequence diagram of FIG. 29, the cluster control manager M of the PU #1 of the local site gives notification of a data transfer process instruction for the copy-source volume P to the I/O control unit #2 of the PU #2 of the local site (step S2901).

The I/O control unit #2 of the PU #2 of the local site reads out the transfer data from the SU #1 according to the data transfer process instruction (step S2902) and transfers the transfer data to the copy-destination PU (the PU #1 or the PU #2 of the remote site) (step S2903). Steps S2902 and S2903 are repeated for each transfer data.

Consequent to receiving the transfer data from the I/O control unit #2 of the PU #2 of the local site, the I/O control unit #1 of the PU #1 (or the I/O control unit #2 of the PU #2) of the remote site stores the received transfer data into the SU #1 (step S2904).

In response to acceptance of data transfer completion notification from the I/O control unit #1 (or the I/O control unit #2 of the PU #2), the volume manager M of the PU #1 of the remote site gives notification of an instruction for establishing transfer data as a snapshot to the volume management administrator A #1 of the PU #1 (or the volume management administrator A #2 of the PU #2) of the remote site (step S2905).

The volume management administrator A #1 of the PU #1 (or the volume management administrator A #2 of the PU #2) of the remote site creates a snapshot of the copy-destination volume S (step S2906).

Subsequently, the cluster control manager M of the PU #1 of the local site gives notification of a creation instruction for the snapshot of the copy-source volume P to the volume manager M of the PU #1 of the local site at time intervals to ensure consistency. As a result, the operations at steps S2801 to S2808 depicted in FIG. 28 and steps S2901 to S2906 depicted in FIG. 29 are repeated at time intervals to ensure consistency.

As a result, the snapshots of the volumes P1 to PK belonging to the consistency group G can be concurrently taken periodically and the consistency of writing order of data can be maintained among volumes at constant time intervals.

Description will be made of a remote copying process procedure in the case of failover of the copy-destination volume S during execution of remote copying between storage systems SM. A case of breakdown of the PU #1 of the remote site and failover to the PU #2 of the remote site is taken as an example.

Figure 30:
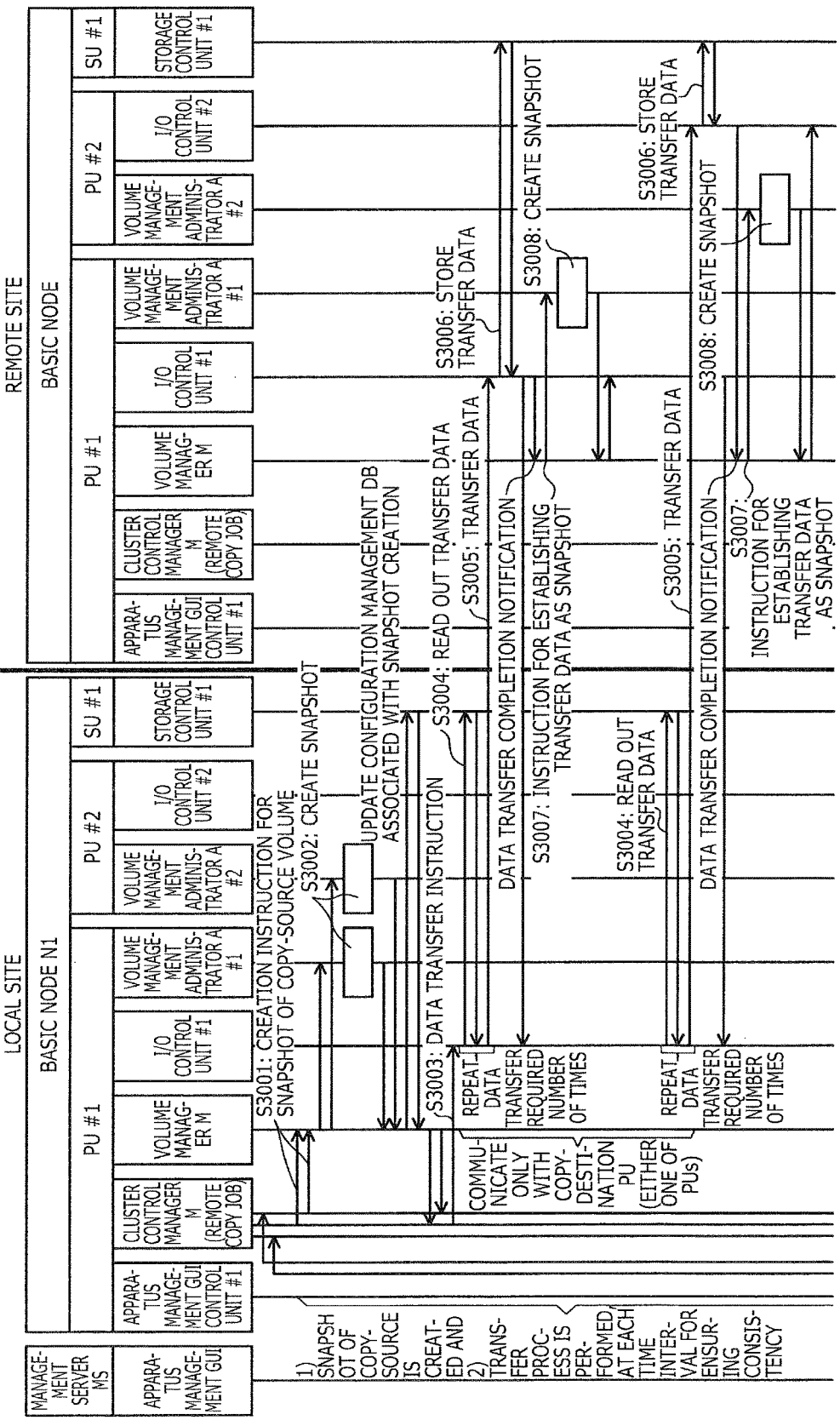
FIGS. 30 and 31 are sequence diagrams of an example of a remote copying process procedure at failover between storage systems SM.
Figure 31:
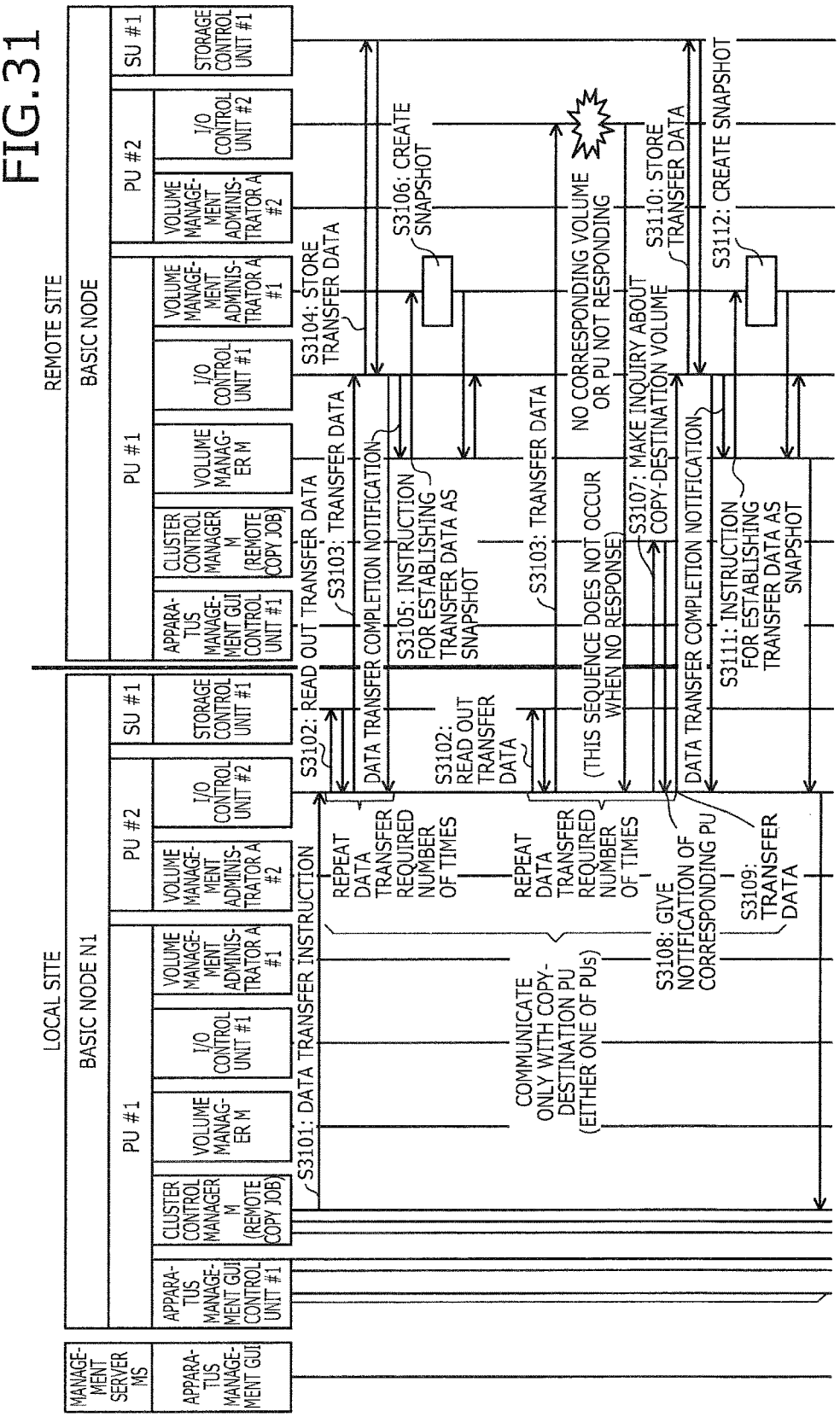

FIGS. 30 and 31 are sequence diagrams of an example of a remote copying process procedure at the failover between storage systems SM. In the sequence diagram of FIG. 30, the cluster control manager M of the PU #1 of the local site gives notification of a creation instruction for a snapshot of the copy-source volume P to the volume manager M of the PU #1 of the local site (step S3001).

The volume management administrators A #1, #2 of the PUs #1, #2 of the local site create a snapshot of the copy-source volume P (step S3002). The cluster control manager M of the PU #1 of the local site gives notification of a data transfer process instruction for the copy-source volume P to the I/O control unit #1 of the PU #1 of the local site (step S3003).

The I/O control unit #1 of the PU #1 of the local site reads out the transfer data from the SU #1 according to the data transfer process instruction (step S3004) and transfers the transfer data to the copy-destination PU (the PU #1 or the PU #2 of the remote site) (step S3005). Steps S3004 and S3005 are repeated for each transfer data.

Consequent to receiving the transfer data from the I/O control unit #1 of the PU #1 of the local site, the I/O control unit #1 of the PU #1 (or the I/O control unit #2 of the PU #2) of the remote site stores the received transfer data into the SU #1 (step S3006).

In response to acceptance of data transfer completion notification from the I/O control unit #1 of the PU #1 (or the I/O control unit #2 of the PU #2), the volume manager M of the PU #1 of the remote site gives notification of an instruction for establishing transfer data as a snapshot to the volume management administrator A #1 of the PU #1 (or the volume management administrator A #2 of the PU #2) (step S3007).

The volume management administrator A #1 of the PU #1 (or the volume management administrator A #2 of the PU #2) of the remote site creates a snapshot of the copy-destination volume S (step S3008).

It is assumed that the PU #2 of the remote site fails (or the copy-destination volume S does not reside at the PU #2).

In the sequence diagram of FIG. 31, the cluster control manager M of the PU #1 of the local site gives notification of a data transfer process instruction for the copy-source volume P, to the I/O control unit #2 of the PU #2 of the local site (step S3101).

In the case of transfer to PU #1 of the remote site, the I/O control unit #2 of the PU #2 of the local site reads out the transfer data from the SU #1 according to the data transfer process instruction (step S3102) and transfers the transfer data to the PU #1 of the remote site that is the copy destination (step S3103).

Consequent to receiving the transfer data from the I/O control unit #2 of the PU #2 of the local site, the I/O control unit #1 of the PU #1 of the remote site stores the received transfer data into the SU #1 (step S3104).

In response to acceptance of the data transfer completion notification from the I/O control unit #1, the volume manager M of the PU #1 of the remote site gives notification of an instruction for establishing transfer data as a snapshot, to the volume management administrator A #1 of the PU #1 of the remote site (step S3105). The volume management administrator A #1 of the PU #1 of the remote site creates a snapshot of the copy-destination volume S (step S3106).

In the case of transfer to PU #2 of the remote site, the I/O control unit #2 of the PU #2 of the local site reads out the transfer data from the SU #1 according to the data transfer process instruction (step S3102) and transfers the transfer data to the PU #2 of the remote site that is the copy destination (step S3103).

If communication with the PU #2 of the remote site is disabled, the I/O control unit #2 of the PU #2 of the local site uses the representative address registered in the consistency group management table 700 to make an inquiry to the representative PU (in this case, the PU #1) about the migration-destination PU of the copy-destination volume Sk (step S3107).

In response to acceptance of the inquiry about the migration-destination PU, the cluster control manager M of the representative PU (PU #1) of the remote site gives notification of the migration-destination PU #1 of the copy-destination volume Sk (step S3108). The migration-destination PU of the copy-destination volume Sk is managed by the representative PU.

The I/O control unit #2 of the PU #2 of the local site transfers the transfer data read from the SU #1, to the migration-destination PU #1 of the notification from the representative PU (PU #1) of the remote site (step S3109).

Consequent to receiving the transfer data from the I/O control unit #2 of the PU #2 of the local site, the I/O control unit #1 of the PU #1 of the remote site stores the received transfer data into the SU #1 (step S3110).

In response to acceptance of the data transfer completion notification from the I/O control unit #1, the volume manager M of the PU #1 of the remote site gives notification of an instruction for establishing transfer data as a snapshot, to the volume management administrator A #1 of the PU #1 of the remote site (step S3111). The volume management administrator A #1 of the PU #1 of the remote site creates a snapshot of the copy-destination volume S (step S3112).

As a result, when the copy-source/copy-destination session relationship is lost, the connection-destination PU can efficiently be searched for without making an inquiry to individual PUs in the copy-destination storage apparatus 102.

Various process procedures of the storage system SM according to the example will be described. A node expansion process procedure of the storage system SM will first be described. The node expansion process procedure of the storage system SM will be described by taking the case of adding the expansion node N2 to the basic node N1.

Figure 32:
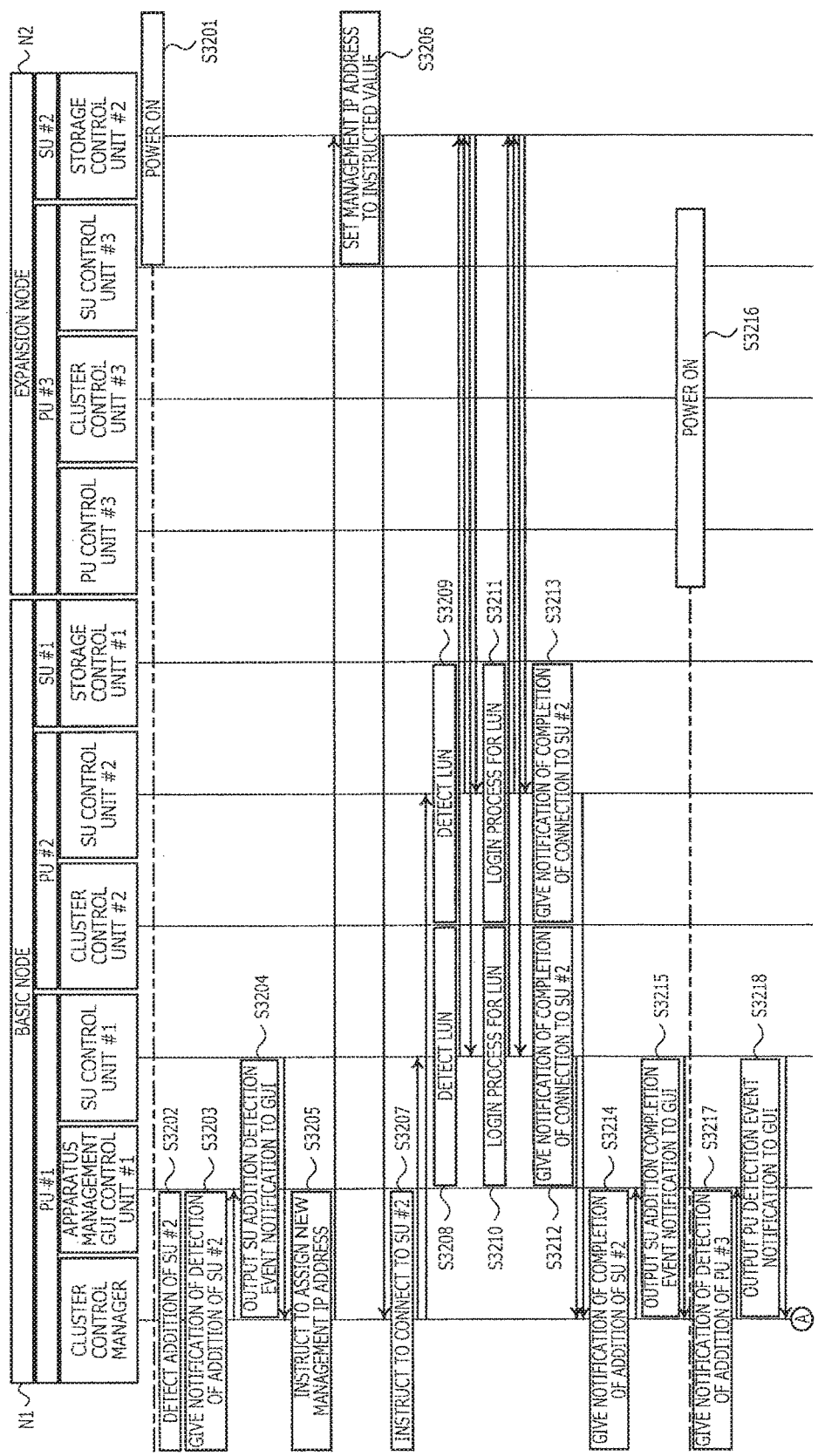
FIGS. 32 and 33 are sequence diagrams of an example of a node expansion process procedure of the storage system SM.
Figure 33:
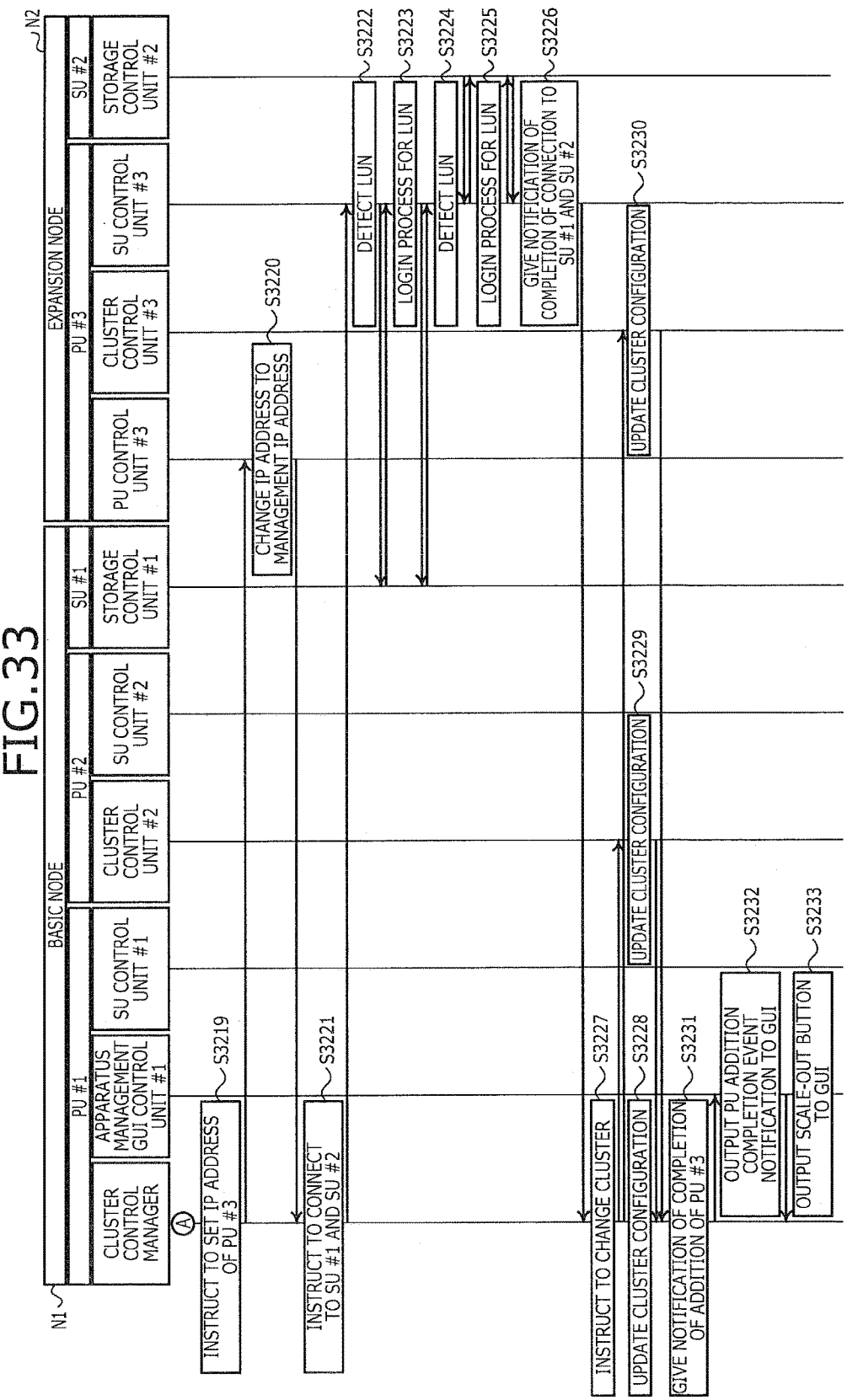
Figure 34:
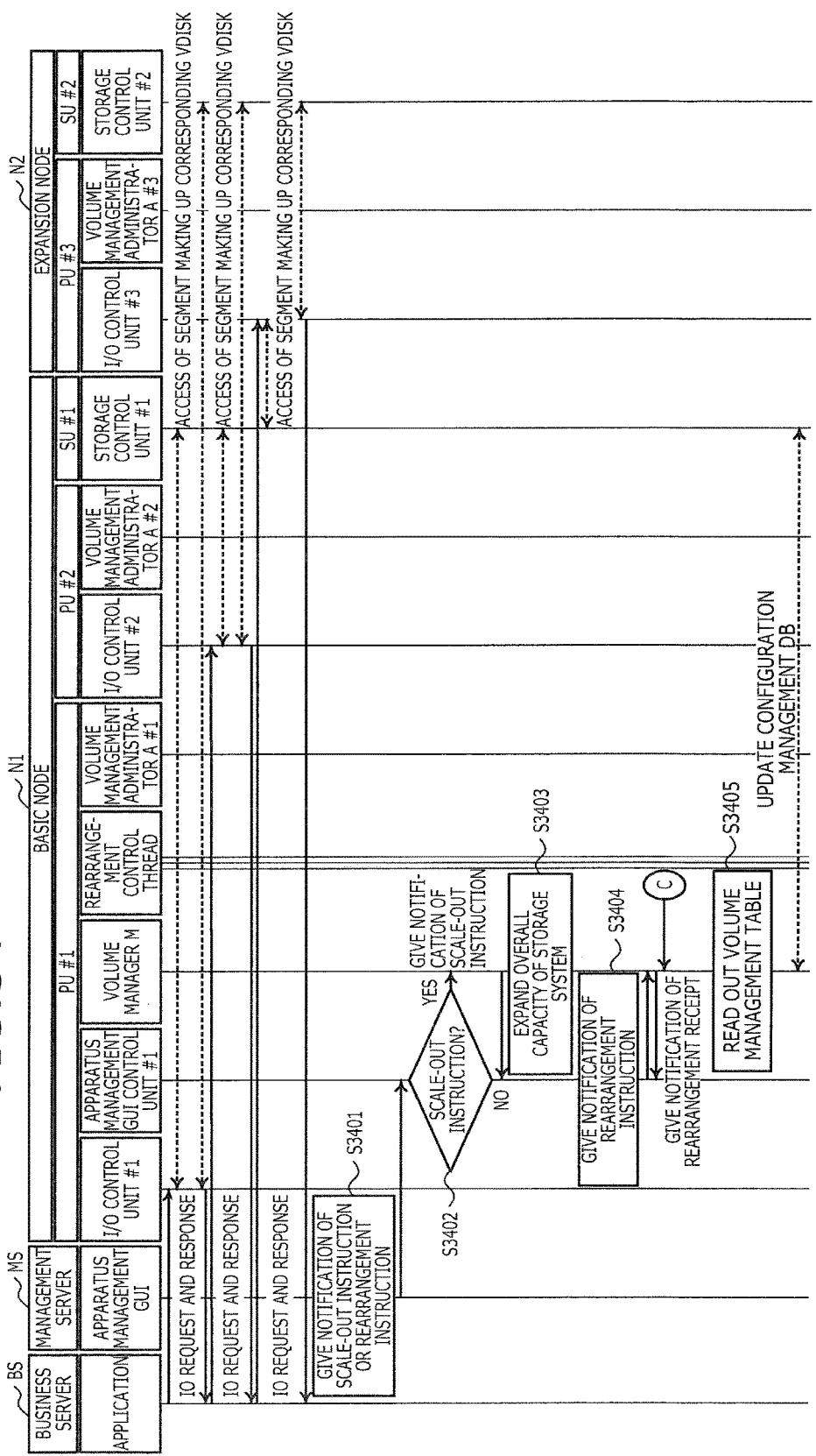
FIGS. 34, 35, 36, and 37 are sequence diagrams of an example of a rearrangement process procedure of the storage system SM.

FIGS. 32 and 33 are sequence diagrams of an example of the node expansion process procedure of the storage system SM. In the sequence diagram of FIG. 32, a customer engineer (CE) physically connects the expansion node N2 to the basic node N1 and powers on the SU #2 (step S3201).

The cluster control manager M detects the addition of the SU #2 (step S3202). The cluster control manager M notifies the apparatus management GUI control unit #1 of the detection of addition of the SU #2 (step S3203). The apparatus management GUI control unit #1 outputs SU addition detection event notification to the GUI of the management server MS (step S3204).

The cluster control manager M instructs the storage control unit #2 of the SU #2 to assign a new management IP address (step S3205). The storage control unit #2 of the SU #2 sets the management IP address to an instructed value (step S3206). The cluster control manager M instructs the SU control unit #1 of the PU #1 and the SU control unit #2 of the PU #2 to connect to the SU #2 (step S3207).

The SU control unit #1 detects a LUN for a management DB and a LUN for user data of the SU #2 (step S3208). The SU control unit #2 detects a LUN for a management DB and a LUN for user data of the SU #2 (step S3209). The SU control unit #1 executes a login process for the detected LUNs (step S3210). The SU control unit #2 executes a login process for the detected LUNs (step S3211).

The SU control unit #1 notifies the cluster control manager M of the completion of connection to the SU #2 (step S3212). The SU control unit #2 notifies the cluster control manager M of the completion of connection to the SU #2 (step S3213). The cluster control manager M notifies the apparatus management GUI control unit #1 of the completion of addition of the SU #2 (step S3214). The apparatus management GUI control unit #1 outputs SU addition completion event notification to the GUI of the management server MS (step S3215).

The CE powers on the PU #3 of the expansion node N2 (step S3216). When detecting the addition of the PU #3, the cluster control manager M notifies the apparatus management GUI control unit #1 of the detection of addition of the PU #3 (step S3217). The apparatus management GUI control unit #1 outputs PU detection event notification to the GUI of the management server MS (step S3218).

In the sequence diagram of FIG. 33, the cluster control manager M instructs the PU control unit #3 to set an IP address of the detected PU #3 (step S3219). The PU control unit #3 changes the IP address to the management IP address (step S3220). The cluster control manager M instructs the SU control unit #3 of the PU #3 to connect to the SU #1 and the SU #2 (step S3221).

The SU control unit #3 detects a LUN for a management DB and a LUN for user data of the SU #1 (step S3222). The SU control unit #3 executes a login process for the detected LUNs (step S3223). The SU control unit #3 detects a LUN for a management DB and a LUN for user data of the SU #2 (step S3224).

The SU control unit #3 executes a login process for the detected LUNs (step S3225). The SU control unit #3 notifies the cluster control manager M of the completion of connection to the SU #1 and the SU #2 (step S3226). The cluster control manager M instructs the cluster control unit #2 of the PU #2 and the cluster control unit #3 of the PU #3 to change a cluster (step S3227).

The cluster control manager M incorporates the PU #3 into cluster management information to update the cluster configuration to the PUs #1, #2, and #3 (step S3228). The cluster control unit #2 incorporates the PU #3 into cluster management information to update the cluster configuration to the PUs #1, #2, and #3 (step S3229). The cluster control unit #3 incorporates the PU #3 into cluster management information to update the cluster configuration to the PUs #1, #2, and #3 (step S3230).

The cluster control manager M notifies the apparatus management GUI control unit #1 of the completion of addition of the PU #3 (step S3231). The apparatus management GUI control unit #1 outputs a PU addition completion event notification to the GUI of the management server MS (step S3232). The apparatus management GUI control unit #1 outputs a scale-out button to the GUI of the management server MS (step S3233).

When a user clicks the "scale-out button" on the GUI of the management server MS to indicate approval of the completion of connection and internal apparatus incorporation, the expansion process is completed. As a result of the completion instruction of the scale-out, the storage capacity of the storage system SM is increased by that of the SU #2 and new data can be stored on the SU #2.

A rearrangement process procedure of the storage system SM will be described. For example, the rearrangement process is executed after the completion of scale-out of the storage system SM or when a rearrangement instruction is made from the GUI screen of the management server MS.

FIGS. 34, 35, 36, and 37 are sequence diagrams of an example of the rearrangement process procedure of the storage system SM. In the sequence diagram of FIG. 34, the apparatus management GUI of the management server MS notifies the apparatus management GUI control unit #1 of the PU #1 of a scale-out instruction or a rearrangement instruction (step S3401). The notification of the scale-out instruction is made when the "scale-out button" on the GUI screen is clicked, for example. The notification of the rearrangement instruction is made when a "rearrangement button" on the GUI screen is clicked.

The apparatus management GUI control unit #1 of the PU #1 determines whether a scale-out instruction has been received (step S3402). If a scale-out instruction has been received (step S3402: YES), the apparatus management GUI control unit #1 notifies the volume manager M of the scale-out instruction, and the volume manager M adds the capacity of the added SU #2 to expand the overall capacity of the storage system SM to make the area of the SU #2 available (step S3403).

On the other hand, if a rearrangement instruction has been received (step S3402: NO), the apparatus management GUI control unit #1 notifies the volume manager M of the rearrangement instruction (step S3404). The volume manager M reads out the volume management table 710 from the configuration management DB (step S3405).

Figure 35:
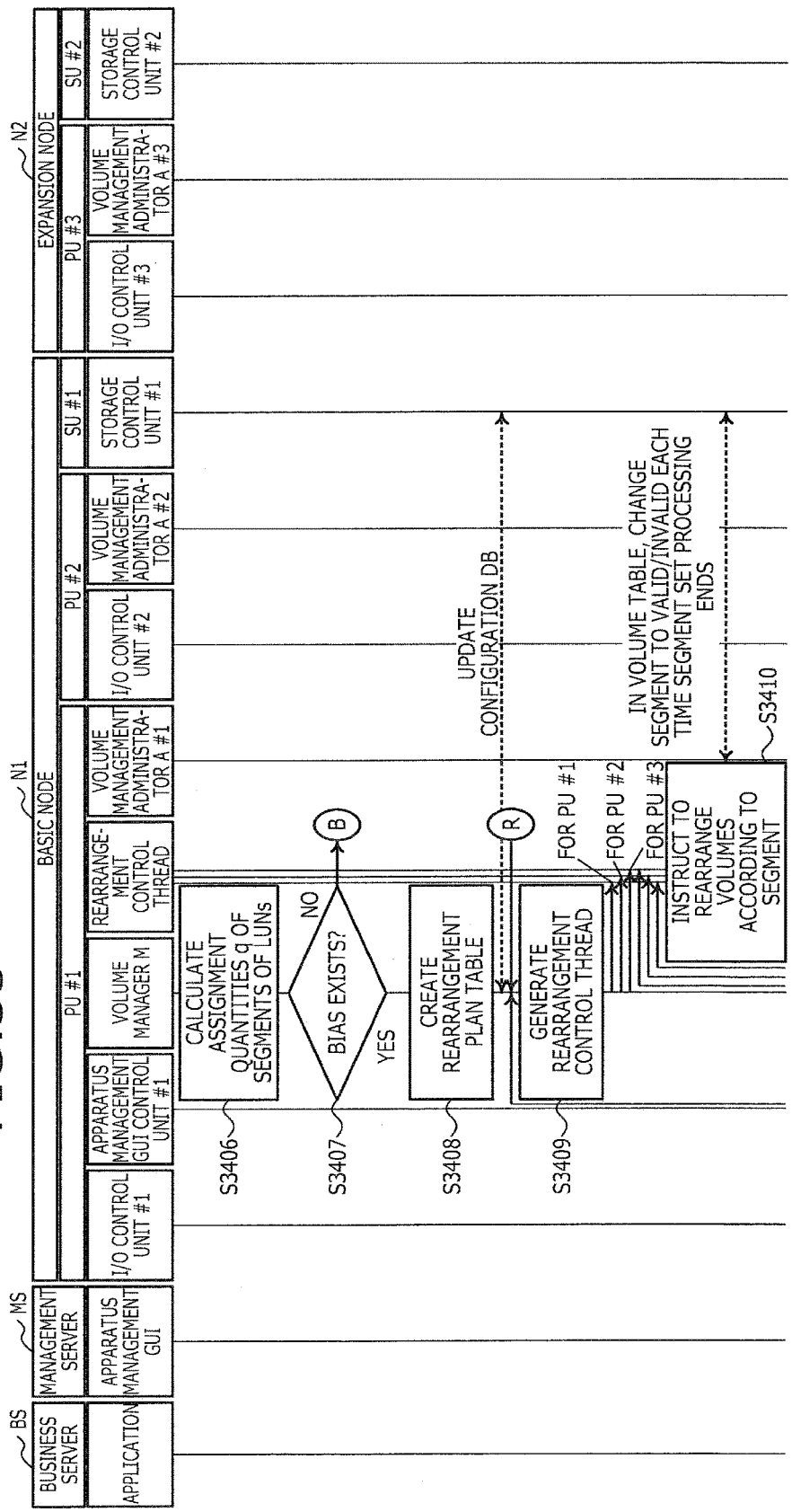

In the sequence diagram of FIG. 35, the volume manager M refers to the volume management table 710 to calculate the assignment quantities q of the segments of the LUNs in the storage system SM (step S3406). Based on the calculated assignment quantities q of the segments of the LUNs, the volume manager M determines whether bias exists in the assignment quantities q of the segments of the LUNs in the storage system SM (step S3407).

If no bias exists (step S3407: NO), the volume manager M goes to step S3419 at B of FIG. 37. On the other hand, if bias exists (step S3407: YES), the volume manager M develops a rearrangement plan to create the rearrangement plan table 720 (step S3408). In this case, the volume manager M sets the rearrangement status of a segment to be rearranged in the rearrangement plan table 720 to "awaiting rearrangement" and sets the rearrangement status in the volume segment table 1700 to "under rearrangement".

The volume manager M refers to the rearrangement plan table 720 to generate a rearrangement control thread for the PUs #1, #2, and #3 (step S3409). The rearrangement control thread for the PUs #1, #2, and #3 instructs the volume management administrators A #1, #2, and #3 of the PUs #1, #2, and #3 to rearrange volumes instructed by the volume manager M according to segment (step S3410).

For example, the rearrangement control thread for the PUs #1, #2, and #3 notifies the volume management administrators A #1, #2, and #3 of the PUs #1, #2, and #3, of the information of a disk to be rearranged (information for identifying a disk; a segment to be migrated) and the information of a migration destination.

Figure 36:
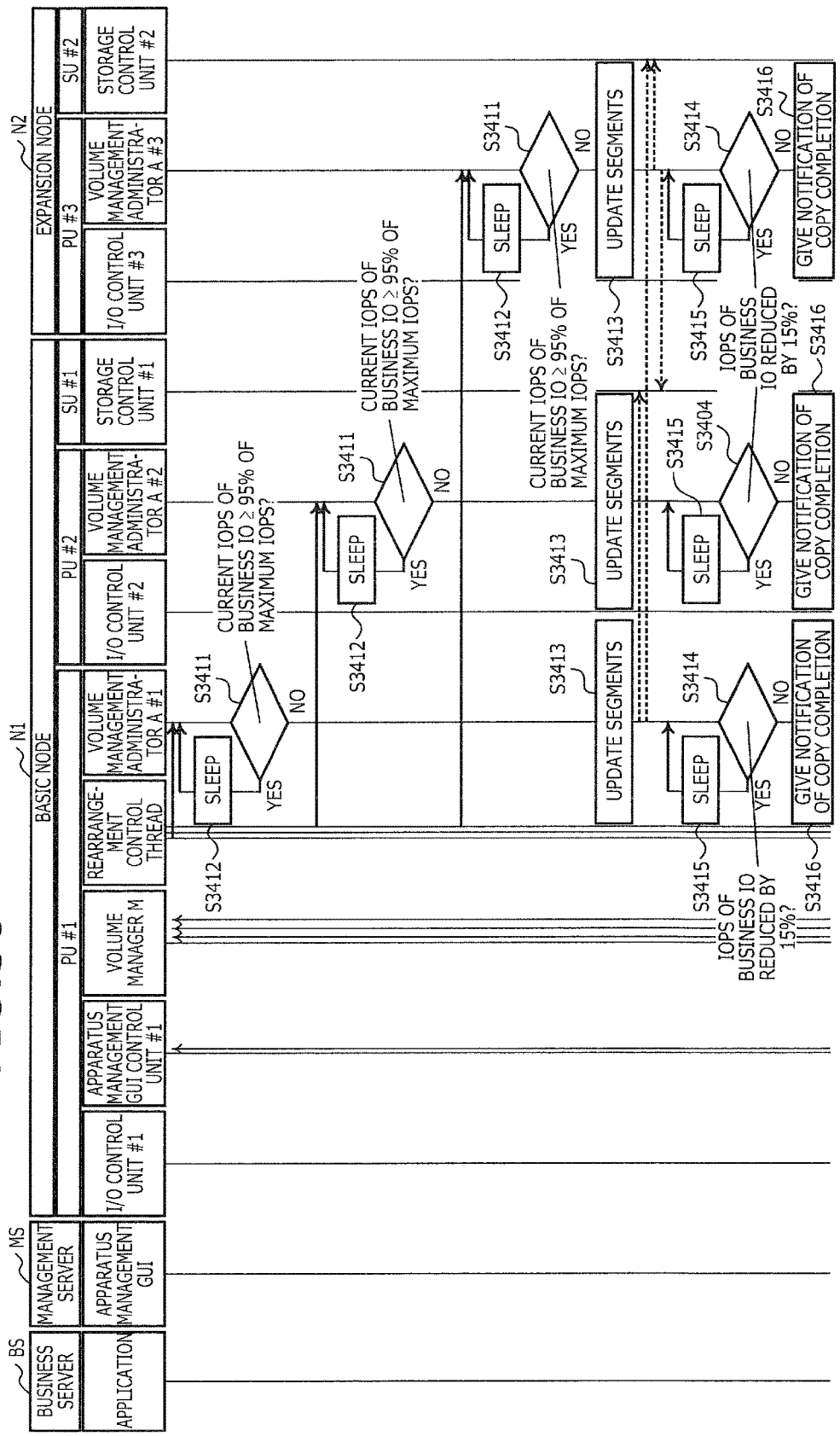

In the sequence diagram of FIG. 36, each of the volume management administrators A #1, #2, and #3 determines if the current IOPS of the business IO is greater than or equal to 95% of the maximum IOPS (step S3411). If the current IOPS is greater than or equal to 95% of the maximum IOPS (step S3411: YES), each of the volume management administrators A #1, #2, and #3 sleeps for a certain period (step S3412) and returns to step S3411.

On the other hand, if the current IOPS is less than 95% of the maximum IOPS (step S3411: NO), each of the volume management administrators A #1, #2, and #3 copies segments according to the instruction to update the instructed segments (step S3413).

Each of the volume management administrators A #1, #2, and #3 determines whether the IOPS of the business IO has been reduced by 15% (step S3414). If the IOPS has been reduced by 15% (step S3414: YES), each of the volume management administrators A #1, #2, and #3 sleeps for a certain period (step S3415) and returns to step S3414.

On the other hand, if the IOPS has not been reduced by 15% (step S3414: NO), each of the volume management administrators A #1, #2, and #3 notifies the rearrangement control thread for the PUs #1, #2, and #3 giving the instruction, of the copy completion (step S3416). The rearrangement control thread notified of the copy completion sets the rearrangement status of a segment of the copy completion in the rearrangement plan table 720 to "rearrangement completed" and sets the rearrangement status in the volume segment table 1700 to "blank".

Figure 37:
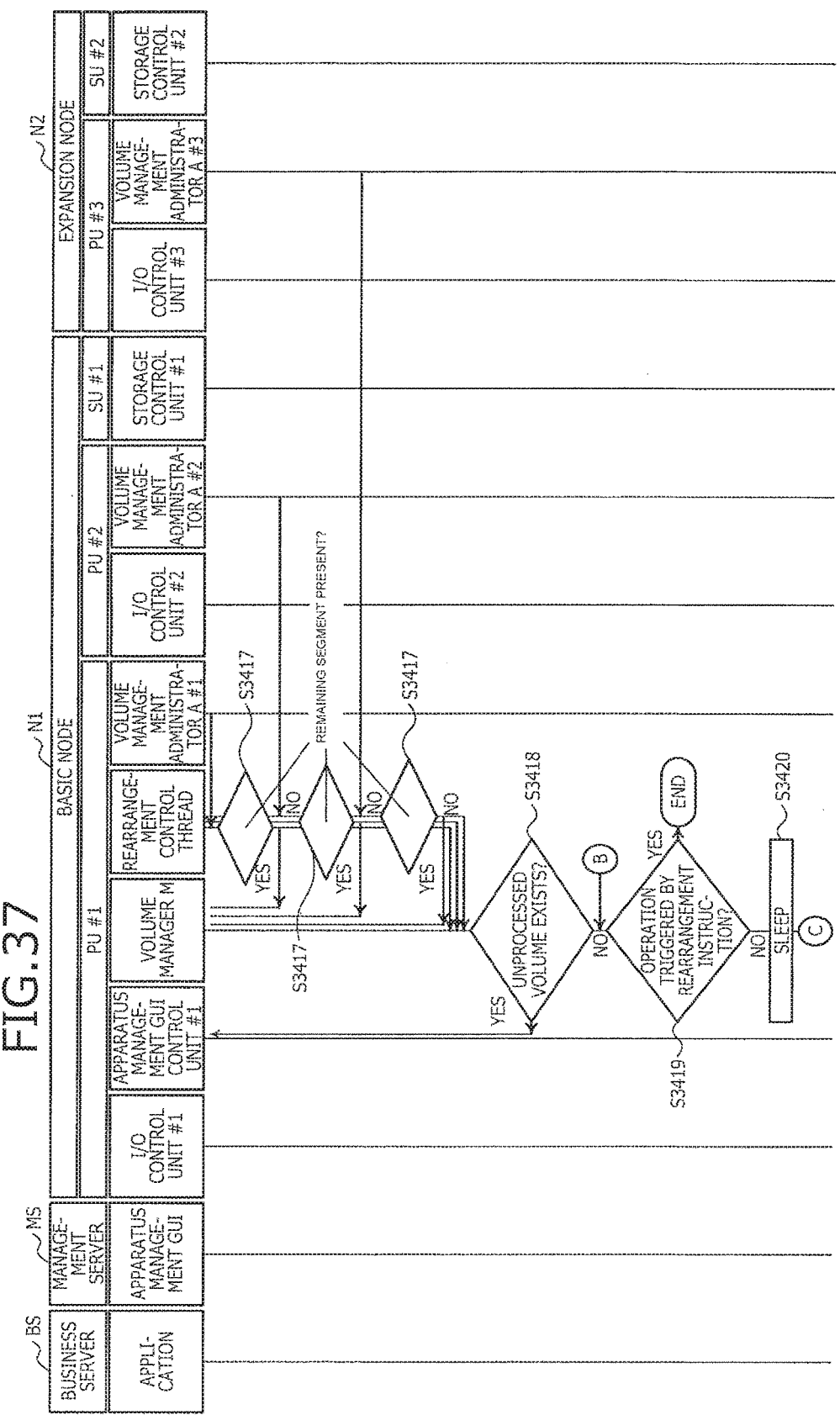

In the sequence diagram of FIG. 37, the rearrangement control thread for the PUs #1, #2, and #3 refers to the rearrangement plan table 720 to determine whether a remaining segment that has not been re-arranged is present (step S3417). If a remaining segment is present (step S3417: YES), the rearrangement control thread for the PUs #1, #2, and #3 returns to step S3410 depicted in FIG. 35.

On the other hand, if no remaining segment is present (step S3417: NO), the rearrangement control thread for the PUs #1, #2, and #3 notifies the volume manager M of the completion of volume rearrangement. The volume manager M refers to the rearrangement plan table 720 to determine whether an unprocessed volume exists (step S3418).

If an unprocessed volume exists (step S3418: YES), the volume manager M returns to step S3409 at R depicted in FIG. 35. On the other hand, if no unprocessed volume is present (step S3418: NO), the volume manager M determines whether the operation was triggered by a rearrangement instruction (step S3419).

If the operation was triggered by a rearrangement instruction (step S3419: YES), the storage system SM terminates a series of operations. On the other hand, if the operation was triggered by a scale-out instruction (step S3419: NO), the volume manager M sleeps for a certain period (step S3420) and returns to step S3405 at C depicted in FIG. 34.

As a result, the volumes can be rearranged so as to equalize the assignment quantities q of segments of the LUNs between SUs belonging to the consistency groups G. If the operation was triggered by the scale-out instruction, determination can regularly be made on whether bias exists in the assignment quantities q of segments of the LUNs included in the storage system SM, so as to rearrange the volumes.

A rearrangement stop process procedure of the storage system SM will be described. First, description will be made of the rearrangement stop process procedure in a case where a user of the management server MS gives a stop instruction for the rearrangement process.

Figure 38:
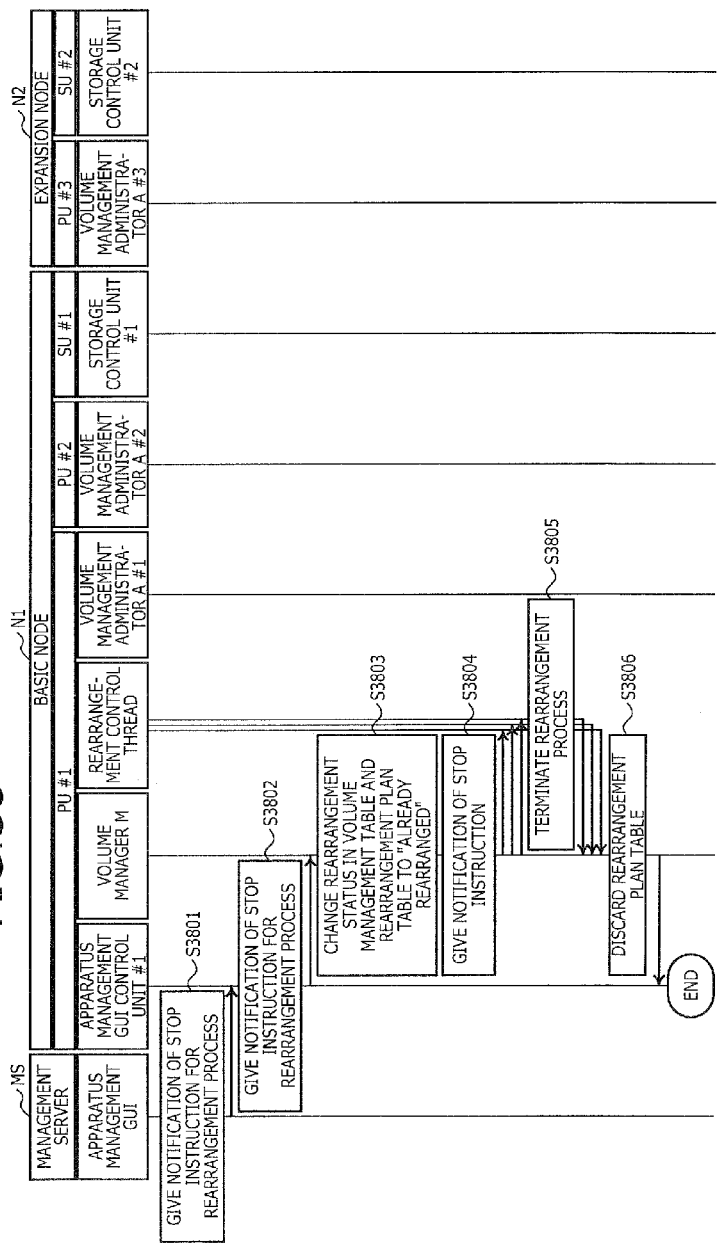
FIG. 38 is a sequence diagram of an example of a first rearrangement stop process procedure of the storage system SM.

FIG. 38 is a sequence diagram of an example of a first rearrangement stop process procedure of the storage system SM. In the sequence diagram of FIG. 38, upon receiving a stop instruction for the rearrangement process, the apparatus management GUI of the management server MS notifies the apparatus management GUI control unit #1 of the PU #1 of the stop instruction for the rearrangement process (step S3801).

Upon receiving the stop instruction for the rearrangement process, the apparatus management GUI control unit #1 notifies the volume manager M of the stop instruction for the rearrangement process (step S3802). The volume manager M changes the rearrangement status in the volume management table 710 and the rearrangement plan table 720 to "already rearranged" (step S3803).

The volume manager M notifies the rearrangement control thread for the PUs #1, #2, and #3 executing the rearrangement process, of the stop instruction (step S3804). The rearrangement control thread for the PUs #1, #2, and #3 terminates the rearrangement process under progress (step S3805). The volume manager M discards the rearrangement plan table 720 (step S3806) and the storage system SM terminates a series of operations. This enables the user of the management server MS to terminate the rearrangement process being executed, at an arbitrary timing.

Description will be made of the rearrangement stop process procedure of the storage system SM in a case of occurrence of a rearrangement stop event. The rearrangement stop event may be, for example, an execution of new scale-out, lock-out of a RAID group, and deletion of a LUN in an SU.

Figure 39:
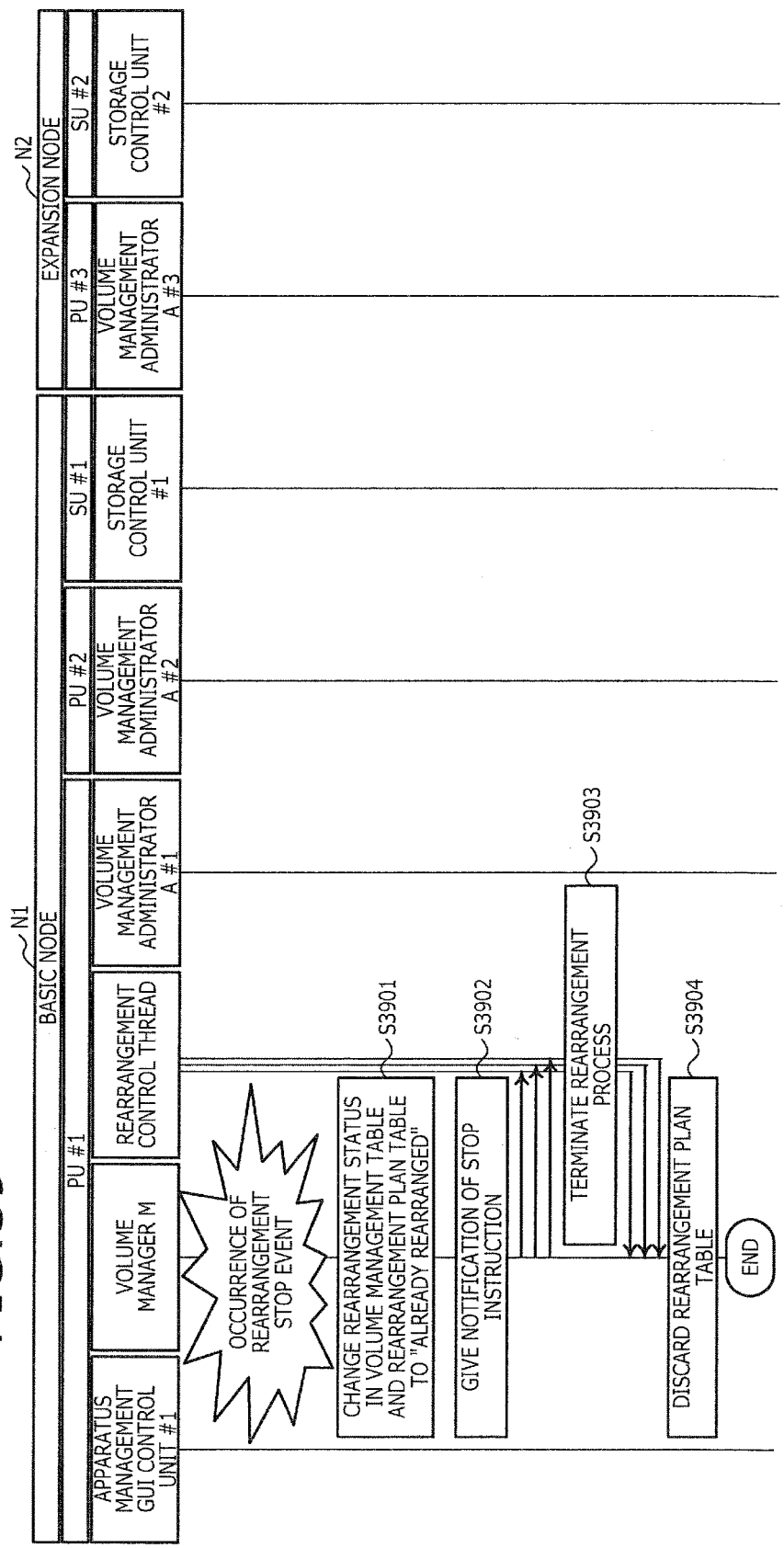
FIG. 39 is a sequence diagram of an example of a second rearrangement stop process procedure of the storage system SM.

FIG. 39 is a sequence diagram of an example of a second rearrangement stop process procedure of the storage system SM. In the sequence diagram of FIG. 39, when a rearrangement stop event occurs, the volume manager M changes the rearrangement status in the volume management table 710 and the rearrangement plan table 720 to "already rearranged" (step S3901).

The volume manager M notifies the rearrangement control thread for the PUs #1, #2, and #3 executing the rearrangement process, of the stop instruction (step S3902). The rearrangement control thread for the PUs #1, #2, and #3 terminates the rearrangement process under progress (step S3903). The volume manager M discards the rearrangement plan table 720 (step S3904) and the storage system SM terminates a series of operations. As a result, when a rearrangement stop event occurs, the rearrangement process being executed can be terminated.

A rearrangement suspension process procedure of the storage system SM will be described. For example, the rearrangement suspension process is executed if it is desirable to temporarily stop the rearrangement process because of maintenance, inspection, etc. of the PUs and SUs.

Figure 40:
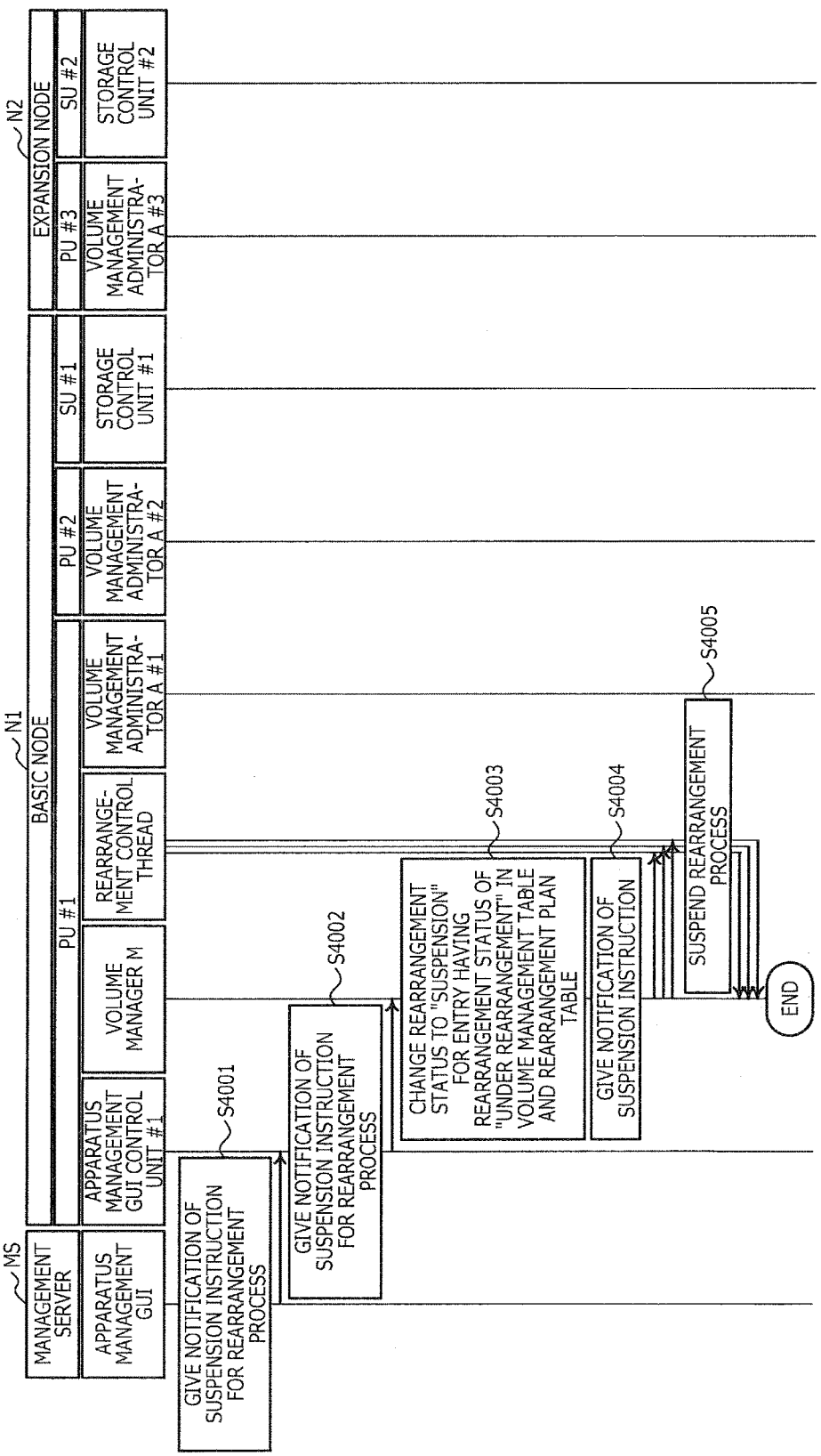
FIG. 40 is a sequence diagram of an example of a rearrangement suspension process procedure of the storage system SM.

FIG. 40 is a sequence diagram of an example of the rearrangement suspension process procedure of the storage system SM. In the sequence diagram of FIG. 40, upon receiving a suspension instruction for the rearrangement process, the apparatus management GUI of the management server MS notifies the apparatus management GUI control unit #1 of the PU #1, of the suspension instruction for the rearrangement process (step S4001).

Upon receiving the suspension instruction for the rearrangement process, the apparatus management GUI control unit #1 notifies the volume manager M of the suspension instruction (step S4002). The volume manager M changes the rearrangement status to "suspension" for an entry having the rearrangement status of "under rearrangement" in the volume management table 710 and the rearrangement plan table 720 (step S4003).

The volume manager M notifies the rearrangement control thread for the PUs #1, #2, and #3 executing the rearrangement process, of the suspension instruction (step S4004). The rearrangement control thread for the PUs #1, #2, and #3 temporarily suspends or terminates the rearrangement process under progress (step S4005) and the storage system SM suspends a series of operations. This enables the user of the management server MS to suspend the rearrangement process being executed, at an arbitrary timing.

A rearrangement resumption process procedure of the storage system SM will be described. For example, the rearrangement resumption process is executed if rearrangement is resumed after the rearrangement process is temporarily stopped because of maintenance, inspection, etc. of the PUs and SUs.

Figure 41:
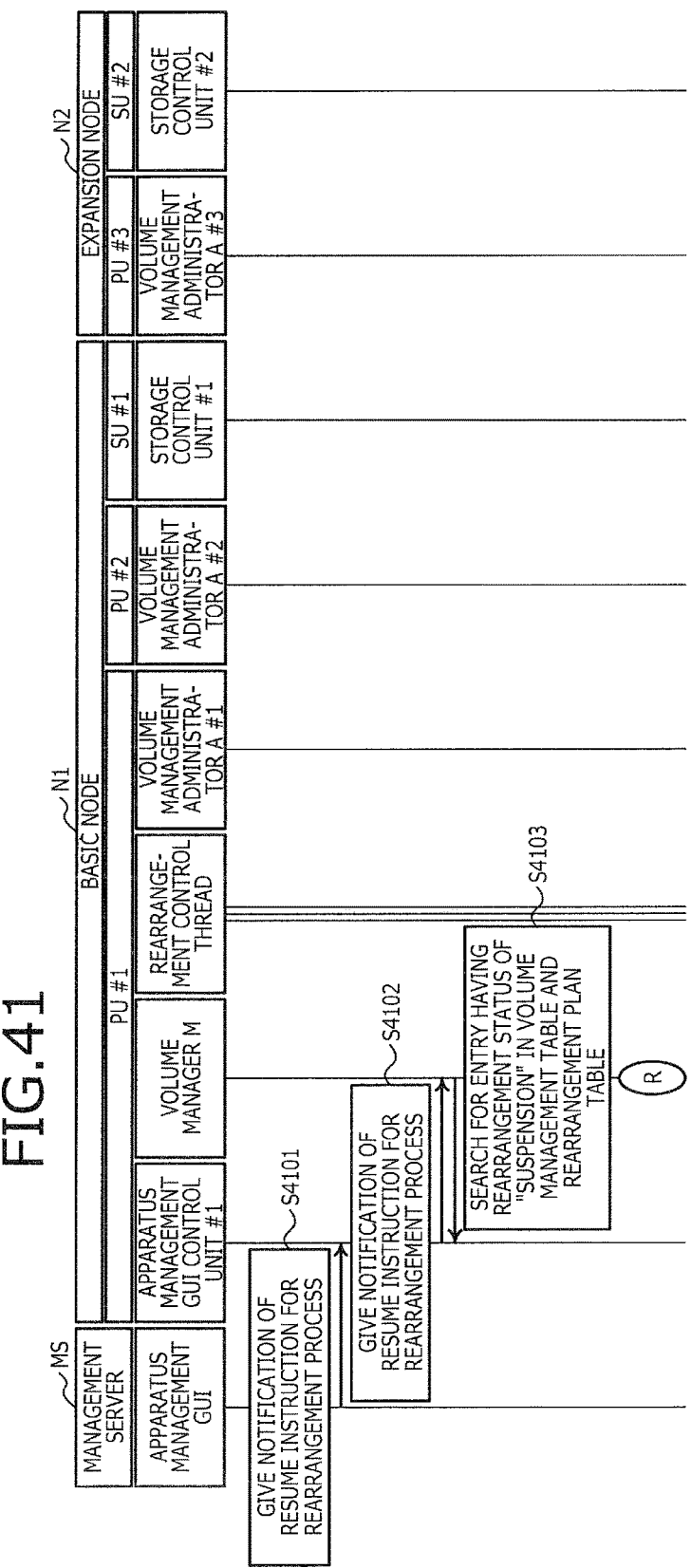
FIG. 41 is a sequence diagram of an example of a rearrangement resumption process procedure of the storage system SM.

FIG. 41 is a sequence diagram of an example of the rearrangement resumption process procedure of the storage system SM. In the sequence diagram of FIG. 41, upon receiving a resume instruction for the rearrangement process, the apparatus management GUI of the management server MS notifies the apparatus management GUI control unit #1 of the PU #1, of the resume instruction for the rearrangement process (step S4101).

Upon receiving the resume instruction for the rearrangement process, the apparatus management GUI control unit #1 notifies the volume manager M of the resume instruction for the rearrangement process (step S4102). The volume manager M searches for an entry having the rearrangement status of "suspension" in the volume management table 710 and the rearrangement plan table 720 (step S4103) and goes to step S3409 at R depicted in FIG. 35. This enables the user of the management server MS to resume the suspended rearrangement process at arbitrary timing.

As described, the storage system SM according to the examples can efficiently perform remote copying while the consistency of writing order of data is maintained between volumes included in the consistency group G. The storage system SM can reassign the data stored before scale-out to all the SUs in the storage system SM. This enables an improvement in access performance corresponding to the potential of the storage system SM after scale-out.

The control method described in the present embodiment may be implemented by executing a prepared program on a computer such as a personal computer and a workstation. The program is stored on a non-transitory, computer-readable recording medium such as a hard disk, a flexible disk, a compact disc-read only memory (CD-ROM), a magneto-optical (MO) disk, and a digital versatile disk (DVD), read out from the computer-readable medium, and executed by the computer. The program may be distributed through a network such as the Internet.

An aspect of the embodiment produces an effect that remote copying can be performed efficiently while consistency of the writing order of data is maintained between volumes.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus configured to control storage units in a storage apparatus, the storage control apparatus comprising:
    a memory unit configured to store group information identifying a copy-source volume group belonging to a consistency group; and
    a processor configured to create, based on the group information, first snapshots of respective volumes of the copy-source volume group at a first time point; create a plurality of first storage areas to respectively store first update data for the respective volumes updated after the first time point; and transfer to a copy-destination storage apparatus, data of the first snapshots of the respective volumes, wherein
    the processor is further configured to create second snapshots of the respective volumes at a second time point after the first time point; create a plurality of second storage areas to respectively store second update data for the respective volumes updated after the second time point; and transfer to the copy-destination storage apparatus, the first update data for the respective volumes updated after the first time point, and
    the processor is further configured to inhibit input/output from outside of the storage apparatus to the respective volumes at the first time point and resume input/output from outside of the storage apparatus to the respective volumes after the first snapshots have been created and after the plurality of first storage areas have been created.

2. The storage control apparatus according to claim 1, wherein
    the processor creates the second snapshots of the respective volumes at a plurality of second time points after the first time point; creates the plurality of second storage areas to respectively store the second update data for the respective volumes updated after the plurality of second time points; and transfers to the copy-destination storage apparatus, the first data of the respective volumes updated from the first time point to the plurality of second time points.

3. The storage control apparatus according to claim 1, wherein
    the processor, consequent to receiving data of a snapshot of a copy-source volume from another storage apparatus, stores the received data into a copy-destination volume; and consequent to receiving the first update data of the copy-source volume, creates a third storage area to store the first update data for the copy-destination volume, stores the received first update data into the third storage area, and creates a snapshot of the copy-destination volume.

4. The storage control apparatus according to claim 1, wherein
    the processor, consequent to receiving data of a snapshot of a copy-source volume, stores the received data into a copy-destination volume; creates a third storage area to store update data for the copy-destination volume, and creates a snapshot of the copy-destination volume.

5. The storage control apparatus according to claim 1, wherein
    the processor makes an inquiry about a migration-destination storage control apparatus of a copy-destination volume to a given storage control apparatus of a storage control apparatus group in the copy-destination storage apparatus, when communication is disabled with a storage control apparatus that is among the storage control apparatus group and has the copy-destination volume of the respective volumes.

6. The storage control apparatus according to claim 1, wherein
    the processor, when an arbitrary volume of the copy-source volume group resides in another storage control apparatus that is in the storage apparatus and is different from the storage control apparatus of the processor, notifies the other storage control apparatus of a creation instruction for a snapshot of the arbitrary volume at the first time point; and consequent to notifying the other storage control apparatus of the creation instruction for the snapshot of the arbitrary volume at the first time point, creates snapshots of volumes residing in the storage control apparatus of the processor, among the copy-source volume group at the first time point; creates a plurality of first storage areas to respectively store first update data for the volumes residing in the storage control apparatus of the processor after the first time point; and transfers to the copy-destination storage apparatus, data of the snapshots of the volumes residing in the storage control apparatus of the processor, and
    the processor notifies the other storage control apparatus of a creation instruction for a snapshot of the arbitrary volume at the second time point after the first time point; and consequent to notifying the other storage control apparatus of the creation instruction for the snapshot of the arbitrary volume at the second time point, creates snapshots of the volumes residing in the storage control apparatus of the processor at the second time point; creates a plurality of second storage areas to respectively store second update data for the volumes residing in the storage control apparatus of the processor after the second time point; and transfers to the copy-destination storage apparatus, the first update data for the volumes residing in the storage control apparatus of the processor updated after the first time point.

7. The storage control apparatus according to claim 6, wherein the processor, consequent to accepting from the other storage apparatus, a creation instruction for snapshots of volumes that reside in the storage control apparatus of the processor and are among the copy-source volume group at the first time point, creates snapshots of the volumes residing in the storage control apparatus of the processor for the first time point; creates a plurality of first storage areas to respectively store first update data for the volumes residing in the storage control apparatus of the processor after the first time point; and transfers to the copy-destination storage apparatus, data of the snapshots of the volumes residing in the storage control apparatus of the processor; and the processor, consequent to accepting from the other storage control apparatus, a creation instruction for snapshots of volumes at the second time point after the first time point, creates snapshots of the volumes residing in the storage control apparatus of the processor for the second time point; creates a plurality of second storage areas to respectively store second update data for the volumes residing in the storage control apparatus of the processor after the second time point; and transfers to the copy-destination storage apparatus, the first update data for the volumes residing in the storage control apparatus of the processor updated after the first time point.

8. A control method executed by a storage control apparatus configured to control storage units in a storage apparatus, the control method comprising:

creating, based on group information identifying a copy-source volume group belonging to a consistency group stored by a memory unit, first snapshots of respective volumes of the copy-source volume group for a first time point;

creating a plurality of first storage areas to respectively store first update data for the respective volumes after the first time point;

transferring, to a copy-destination storage apparatus, data of the first snapshots of the respective volumes;

creating second snapshots of the respective volumes at a second time point after the first time point;

creating a plurality of second storage areas to respectively store second update data for the respective volumes after the second time point;

transferring, to the copy-destination storage apparatus, the first update data for the respective volumes updated after the first time point; and inhibiting input/output from outside of the storage apparatus to the respective volumes at the first time point and resuming input/output from outside of the storage apparatus to the respective volumes after the first snapshots have been created and after the plurality of first storage areas have been created.

9. A non-transitory, computer-readable recording medium storing a control program that causes a storage control apparatus configured to control storage units in a storage apparatus to execute a process comprising:

creating, based on group information identifying a copy-source volume group belonging to a consistency group stored by a memory unit, first snapshots of respective volumes of the copy-source volume group for a first time point;

creating a plurality of first storage areas to respectively store first update data for the respective volumes after the first time point;

transferring, to a copy-destination storage apparatus, data of the first snapshots of the respective volumes;

creating second snapshots of the respective volumes at a second time point after the first time point;

creating a plurality of second storage areas to respectively store second update data for the respective volumes after the second time point; and transferring, to the copy-destination storage apparatus, the first update data for the respective volumes updated after the first time point; and inhibiting input/output from outside of the storage apparatus to the respective volumes at the first time point and resuming input/output from outside of the storage apparatus to the respective volumes after the first snapshots have been created and after the plurality of first storage areas have been created.

* * * * *